(12) United States Patent
Solanki et al.

(10) Patent No.: US 12,113,773 B2
(45) Date of Patent: Oct. 8, 2024

(54) DYNAMIC PATH SELECTION OF VPN ENDPOINT

(71) Applicant: VMware LLC, Palo Alto, CA (US)

(72) Inventors: Deepika Solanki, Pune (IN); Awan Kumar Sharma, Pune (IN); Yong Wang, Sunnyvale, CA (US); Sourabh Bhattacharya, Pune (IN); Sarthak Ray, Pune (IN)

(73) Assignee: VMware LLC, Palo Alto, CA (US)

( * ) Notice: Subject to any disclaimer, the term of this patent is extended or adjusted under 35 U.S.C. 154(b) by 339 days.

(21) Appl. No.: 17/570,364

(22) Filed: Jan. 6, 2022

(65) Prior Publication Data

US 2022/0394016 A1 Dec. 8, 2022

(30) Foreign Application Priority Data

Jun. 7, 2021 (IN) .............................. 202141025317
Jun. 7, 2021 (IN) .............................. 202141025327

(51) Int. Cl.
*H04L 9/40* (2022.01)
*H04L 12/46* (2006.01)
*H04L 45/24* (2022.01)

(52) U.S. Cl.
CPC ...... *H04L 63/0272* (2013.01); *H04L 12/4641* (2013.01); *H04L 63/0428* (2013.01); *H04L 45/24* (2013.01)

(58) Field of Classification Search
CPC .......................... H04L 63/0272; H04L 63/048
See application file for complete search history.

(56) References Cited

U.S. PATENT DOCUMENTS

| 6,330,562 | B1 | 12/2001 | Boden et al. |
| 6,968,441 | B1 | 11/2005 | Schnee |
| 7,003,118 | B1 | 2/2006 | Yang et al. |
| 7,243,225 | B2 | 7/2007 | Poeluev et al. |

(Continued)

FOREIGN PATENT DOCUMENTS

| CA | 2870048 A1 | 11/2013 |
| CN | 102801695 A | 11/2012 |

(Continued)

OTHER PUBLICATIONS

Non-Published Commonly Owned U.S. Appl. No. 17/827,889 (F582.C1), filed May 30, 2022, 42 pages, VMware, Inc.

(Continued)

*Primary Examiner* — Esther B. Henderson
(74) *Attorney, Agent, or Firm* — Quarles & Brady LLP

(57) ABSTRACT

Some embodiments provide a method that identifies multiple paths between a first site and a second site. A security association (SA) is established for transmitting encrypted payload from the first site to the second site in a virtual private network (VPN) session. The method selects a path based on metrics that are obtained for the paths. The selected path is defined by a first endpoint address of the first site and a second endpoint address of the second site. The method sends a message from the first site to the second site to update the SA to switch from using an original path to using the selected path. The message indicates the first and second endpoint addresses. The method transmits a packet including a payload that is encrypted according to the updated SA.

20 Claims, 35 Drawing Sheets

(56) References Cited

U.S. PATENT DOCUMENTS

| | | | |
|---|---|---|---|
| 7,284,111 B1 | 10/2007 | Sae-Koe | |
| 7,373,660 B1 | 5/2008 | Guichard et al. | |
| 7,383,353 B2 | 6/2008 | Valdevit et al. | |
| 7,555,544 B1 | 6/2009 | Rattner et al. | |
| 7,814,310 B2 | 10/2010 | Bouchard et al. | |
| 7,962,358 B1 | 6/2011 | Fernandez et al. | |
| 8,566,452 B1 | 10/2013 | Goodwin, III et al. | |
| 9,483,286 B2 | 11/2016 | Basavaiah et al. | |
| 9,535,750 B1 | 1/2017 | Wilkes et al. | |
| 9,588,813 B1 | 3/2017 | Dubey et al. | |
| 9,755,972 B1 | 9/2017 | Mao et al. | |
| 9,813,379 B1 | 11/2017 | Shevade et al. | |
| 9,929,970 B1 | 3/2018 | Matthews et al. | |
| 10,020,984 B1 | 7/2018 | Jork et al. | |
| 10,257,167 B1 | 4/2019 | Matthews et al. | |
| 10,491,466 B1 | 11/2019 | Hira et al. | |
| 10,498,529 B1 | 12/2019 | Hashmi et al. | |
| 10,498,708 B2 | 12/2019 | Wang et al. | |
| 10,601,779 B1 | 3/2020 | Matthews et al. | |
| 10,623,372 B2 | 4/2020 | Wang et al. | |
| 10,701,107 B2 | 6/2020 | Gopal et al. | |
| 11,075,888 B2 | 7/2021 | Jain et al. | |
| 11,095,617 B2 | 8/2021 | Jain et al. | |
| 11,277,343 B2 | 3/2022 | Wang et al. | |
| 11,303,619 B2 | 4/2022 | Wang et al. | |
| 11,336,629 B2 | 5/2022 | Wang et al. | |
| 11,347,561 B1 | 5/2022 | Kumar et al. | |
| 11,729,153 B2 | 8/2023 | Jain et al. | |
| 2002/0010866 A1 | 1/2002 | McCullough et al. | |
| 2002/0097724 A1 | 7/2002 | Halme et al. | |
| 2003/0088787 A1 | 5/2003 | Egevang | |
| 2004/0143734 A1 | 7/2004 | Buer et al. | |
| 2005/0165953 A1 | 7/2005 | Oba et al. | |
| 2005/0198531 A1 | 9/2005 | Kaniz et al. | |
| 2005/0213603 A1 | 9/2005 | Karighattam et al. | |
| 2006/0002388 A1 | 1/2006 | Grebus et al. | |
| 2006/0029278 A1 | 2/2006 | Alasia et al. | |
| 2006/0227807 A1 | 10/2006 | Jakubik et al. | |
| 2008/0123593 A1 | 5/2008 | Fujita et al. | |
| 2008/0144625 A1 | 6/2008 | Wu et al. | |
| 2008/0165964 A1 | 7/2008 | Lewis et al. | |
| 2008/0307024 A1 | 12/2008 | Michaels et al. | |
| 2009/0122990 A1 | 5/2009 | Gundavelli et al. | |
| 2009/0231999 A1 | 9/2009 | Verma et al. | |
| 2010/0097992 A1* | 4/2010 | Velev | H04L 12/66 370/328 |
| 2010/0138560 A1 | 6/2010 | Kivinen et al. | |
| 2010/0191958 A1 | 7/2010 | Chen | |
| 2010/0217949 A1 | 8/2010 | Schopp et al. | |
| 2011/0035740 A1 | 2/2011 | Powell et al. | |
| 2011/0113236 A1 | 5/2011 | Chenard et al. | |
| 2012/0027002 A1 | 2/2012 | Jones et al. | |
| 2012/0027314 A1 | 2/2012 | Lee et al. | |
| 2012/0102278 A1 | 4/2012 | Joffray et al. | |
| 2012/0124591 A1 | 5/2012 | Cadambi et al. | |
| 2012/0170459 A1 | 7/2012 | Olesinski et al. | |
| 2012/0303949 A1 | 11/2012 | Liu et al. | |
| 2014/0089480 A1 | 3/2014 | Zhu | |
| 2014/0108665 A1 | 4/2014 | Arora et al. | |
| 2014/0313932 A1 | 10/2014 | Saltsidis | |
| 2015/0052525 A1 | 2/2015 | Raghu | |
| 2015/0195138 A1 | 7/2015 | Horman | |
| 2015/0288660 A1* | 10/2015 | Chen | G06F 21/602 713/153 |
| 2015/0363240 A1 | 12/2015 | Koizumi | |
| 2016/0057108 A1 | 2/2016 | Hu | |
| 2016/0088072 A1 | 3/2016 | Likhtarov et al. | |
| 2016/0135074 A1 | 5/2016 | Welin et al. | |
| 2016/0182509 A1 | 6/2016 | Kantecki et al. | |
| 2016/0212098 A1 | 7/2016 | Roch | |
| 2016/0226815 A1 | 8/2016 | Wan et al. | |
| 2016/0277478 A1 | 9/2016 | Narasimhamurthy | |
| 2016/0352628 A1 | 12/2016 | Reddy et al. | |
| 2017/0024293 A1 | 1/2017 | Bell et al. | |
| 2017/0054603 A1 | 2/2017 | Kulkarni et al. | |
| 2017/0063787 A1 | 3/2017 | Kwok et al. | |
| 2017/0063979 A1 | 3/2017 | Saeki | |
| 2017/0093811 A1* | 3/2017 | Dolev | H04L 45/1287 |
| 2017/0331724 A1 | 11/2017 | Carney | |
| 2017/0331794 A1* | 11/2017 | Lokman | H04L 63/0428 |
| 2017/0374025 A1 | 12/2017 | Pan | |
| 2018/0054458 A1 | 2/2018 | Marck et al. | |
| 2018/0062875 A1 | 3/2018 | Tumuluru | |
| 2018/0067786 A1 | 3/2018 | Trung et al. | |
| 2018/0131521 A1 | 5/2018 | Yang et al. | |
| 2018/0176124 A1 | 6/2018 | Kancherla et al. | |
| 2018/0241655 A1 | 8/2018 | Tsirkin | |
| 2019/0114206 A1 | 4/2019 | Murugesan et al. | |
| 2019/0173850 A1 | 6/2019 | Jain et al. | |
| 2019/0173851 A1 | 6/2019 | Jain et al. | |
| 2019/0190892 A1 | 6/2019 | Menachem et al. | |
| 2019/0266217 A1 | 8/2019 | Arakawa et al. | |
| 2019/0306086 A1 | 10/2019 | Boutros et al. | |
| 2019/0372936 A1 | 12/2019 | Sullenberger et al. | |
| 2020/0059457 A1 | 2/2020 | Raza et al. | |
| 2020/0099670 A1 | 3/2020 | Kessler et al. | |
| 2020/0186507 A1 | 6/2020 | Dhanabalan et al. | |
| 2020/0351254 A1 | 11/2020 | Xiong et al. | |
| 2020/0403922 A1 | 12/2020 | Yu et al. | |
| 2021/0021523 A1 | 1/2021 | Wang et al. | |
| 2021/0136049 A1 | 5/2021 | Wang et al. | |
| 2021/0185025 A1 | 6/2021 | Wang et al. | |
| 2021/0377232 A1 | 12/2021 | Jain et al. | |
| 2021/0385203 A1 | 12/2021 | Wang et al. | |
| 2021/0392121 A1 | 12/2021 | Thangapandi et al. | |
| 2021/0400029 A1 | 12/2021 | Wang et al. | |
| 2022/0191139 A1 | 6/2022 | Dutta | |
| 2022/0191145 A1 | 6/2022 | Duraj et al. | |
| 2022/0231993 A1 | 7/2022 | Sharma et al. | |
| 2022/0291970 A1 | 9/2022 | Kumar et al. | |
| 2022/0393967 A1 | 12/2022 | Solanki et al. | |
| 2022/0393981 A1 | 12/2022 | Solanki et al. | |
| 2022/0394014 A1 | 12/2022 | Wang et al. | |
| 2022/0394017 A1 | 12/2022 | Solanki et al. | |
| 2023/0028529 A1 | 1/2023 | Puvvada et al. | |
| 2023/0118718 A1 | 4/2023 | Solanki et al. | |
| 2023/0231826 A1 | 7/2023 | Pawar | |

FOREIGN PATENT DOCUMENTS

| | | |
|---|---|---|
| CN | 110677426 A | 1/2020 |
| KR | 20030013496 A | 2/2003 |
| WO | 2016020727 A1 | 2/2016 |
| WO | 2016049609 A1 | 3/2016 |
| WO | 2022260711 A1 | 12/2022 |

OTHER PUBLICATIONS

Non-Published Commonly Owned U.S. Appl. No. 18/224,558 (N558.01.D1.C1), filed Jul. 20, 2023, 51 pages, Nicira, Inc.

Barker, Elaine, et al., "Guide to IPsec VPNs," NIST SP 800-77 Rev. 1, Jun. 30, 2020, 166 pages, retrieved from https://csrc.nist.gov/publications/detail/sp/800-77/rev-1/final.

Kim, Joongi, et al., "NBA (Network Balancing Act): A High-performance Packet Processing Framework for Heterogeneous Processors," EuroSys '15, Apr. 21-24, 2015, 14 pages, ACM, Bordeaux, France.

Muramatsu, Shin, et al., "VSE: Virtual Switch Extension for Adaptive CPU Core Assignment in softirq," 2014 IEEE 6th International Conference on Cloud Computing Technology and Science, Dec. 15-18, 2014, 6 pages, IEEE, Singapore.

Non-Published Commonly Owned Related International Patent Application PCT/US2022/011726 with similar specification, filed Jan. 7, 2022, 84 pages, VMware, Inc.

Non-Published Commonly Owned U.S. Appl. No. 16/016,360, filed Jun. 22, 2018, 36 pages, VMware, Inc.

Non-Published Commonly Owned Related U.S. Appl. No. 17/570,362 with similar specification, filed Jan. 6, 2022, 85 pages, VMware, Inc.

Non-Published Commonly Owned Related U.S. Appl. No. 17/570,363 with similar specification, filed Jan. 6, 2022, 87 pages, VMware, Inc.

(56) References Cited

OTHER PUBLICATIONS

Non-Published Commonly Owned Related U.S. Appl. No. 17/570,365 with similar specification, filed Jan. 6, 2022, 85 pages, VMware, Inc.

Non-Published Commonly Owned Related U.S. Appl. No. 17/570,366 with similar specification, filed Jan. 6, 2022, 86 pages, VMware, Inc.

PCT International Search Report and Written Opinion of Commonly Owned International Patent Application PCT/US2022/011726, mailing date Apr. 8, 2022, 15 pages, International Searching Authority (EPO).

Son, Jeongseok, et al., "Protego: Cloud-Scale Multitenant IPsec Gateway," Proceedings of the 2017 USENIX Annual Technical Conference (USENIX ATC '17), Jul. 12-14, 2017, 15 pages, USENIX Association, Santa Clara, CA.

\* cited by examiner

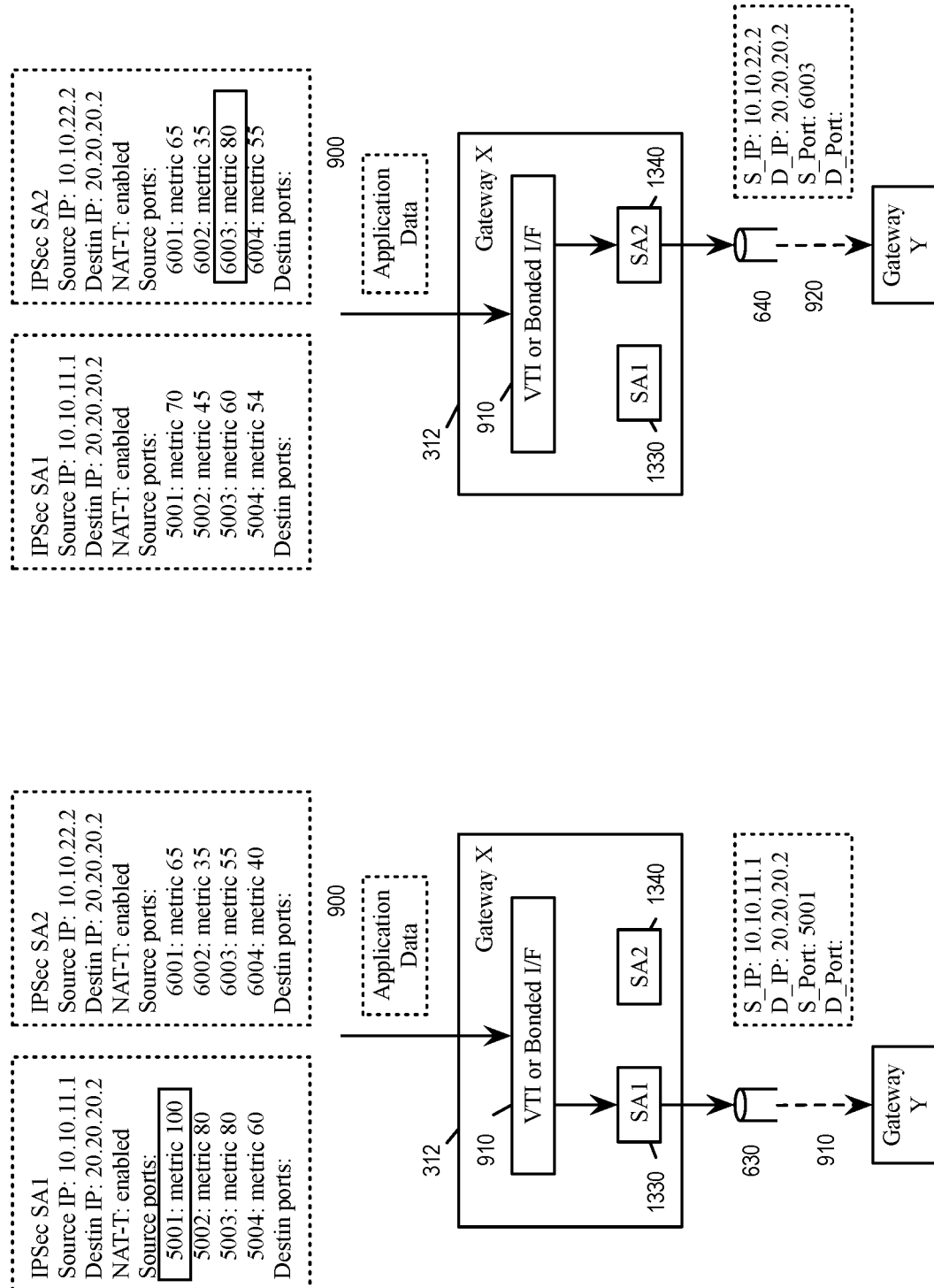

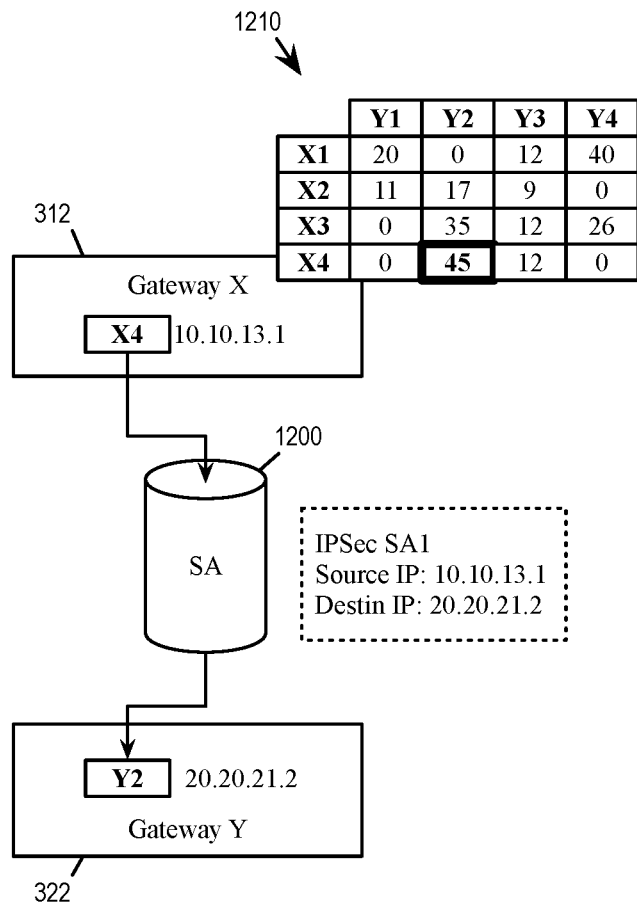
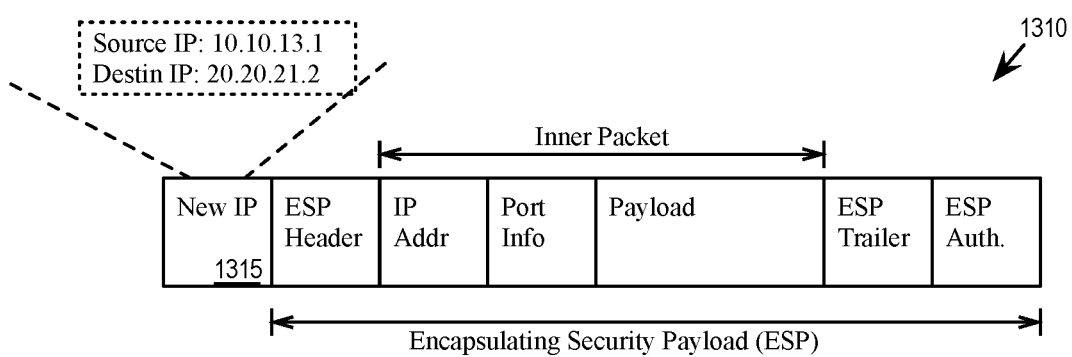
FIG. 13C

DYNAMIC PATH SELECTION OF VPN ENDPOINT

BACKGROUND

Internet Protocol Secure (IPsec) is a group of protocols that are used together to set up encrypted connections between devices such that private data can be securely sent over public networks. IPsec is often used to set up Virtual Private Networks (VPNs) by encrypting IP packets and authenticating the source of the packets. IPsec VPN is widely used by enterprises to interconnect their geographical dispersed branch office locations across the Wide Area Network (WAN) or the Internet, especially in the Software-Defined-WAN (SD-WAN) era. IPsec is also used by cloud providers to encrypt IP traffic traversing datacenter interconnect WAN so as to meet the security and compliance requirements, especially in financial cloud and governmental cloud environments.

Internet Key Exchange (IKE) is the protocol used to set up a secure and authenticated communications channel between two parties. IKE typically uses public key infrastructure certificates for authentication and the key exchange protocol to set up a shared session secret. IKE is part of the IPsec, which is responsible for negotiating security associations (SAs), which are a set of mutually agreed-upon keys and algorithms to be used by both parties trying to establish a VPN connection/tunnel.

Modern datacenter networks or WAN networks include redundant paths between endpoints. Leveraging multiple links or paths for better performance, better reliability, faster adaptation to route outage or misconfiguration, etc. is important for modern-day cloud workloads.

Equal-cost multi-path routing (ECMP) is a routing strategy where packet forwarding to a single destination can occur over multiple best paths with equal routing priority. ECMP is a decision made per-hop independently at each router. It can substantially increase bandwidth by load-balancing traffic over multiple paths.

BRIEF SUMMARY

Some embodiments of the disclosure provide method for using a best path among a number of available network paths to send IPsec packets of a security association (SA) is provided. A gateway establishes a security association (SA) for transmitting encrypted payload from the first site to the second site in a VPN session. The gateway identifies multiple paths between the first site and the second site. The gateway obtains metrics for the multiple paths. The gateway selects a best performing path from the identified paths based on the obtained metrics, the selected path defined by a first endpoint address of the first site and a second endpoint address of the second site. The gateway sends a message from the first site to the second sites to update the SA to switch from using an original path to using the selected path, the message indicating the first and second endpoint addresses. The gateway encrypts a payload according to the updated SA. The gateway transmits a packet comprising the encrypted payload.

In some embodiments, only one path in one link is active at a time, and the only one active path has a best path metric among the multiple paths. The gateway sending the message to update the SA to use the selected path does not interrupt or re-establish the SA. In some embodiments, outer addresses of the packet are updated according to the first and second endpoint addresses while addresses and other traffic selectors used for routing the packet inside a VPN tunnel remain unchanged. In some embodiments, equal-cost multi-path (ECMP) routing is performed based on the first and second endpoint addresses that define the selected path.

In some embodiments, the gateway sends probe messages and receiving responses to the probe messages, and the obtained metrics for the identified paths are determined based on the received responses to the probe messages. The metric of a path is determined based on at least one of connectivity, latency, drop rate, jitter of the path. In some embodiments, the gateway exchanges a first list of endpoint addresses of the first site and a second list of endpoint addresses of the second site for the SA. The first list of endpoint addresses includes the first endpoint address, and the second list of endpoint addresses includes the second endpoint address, and the obtained metrics are stored in a path matrix that is specified based on the first and second lists of endpoint addresses.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIGS. 9A-B illustrates the gateway using aggregated path information to select a best path from multiple different VPN tunnels.

FIGS. 13A-E conceptually illustrate the gateway using MOBIKE protocol to change source and destination IP addresses of a SA in order to select the best path.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

When delivering a specific flow of packets across a network having multiple paths to a same destination, the underlying physical network infrastructure (or the underlay) typically rely on ECMP to choose a path for the flow. This involves the hashing of flow-related data in the packet header, such as the 5-tuple of source and destination IP, source and destination port, and protocol. However, when deploying IPsec VPN over the network, ECMP is limited to hashing two tuples (outer IP pairs) for choosing a path, as inner packets are encrypted for IPsec ESP tunnel traffic. When the two-tuple hashes are constant (e.g., always the IP addresses of the corresponding TEPs in the IPsec header), only one path can be selected at each endpoint side. As a result, there can situations in which the best route is over a particular path, but routing choose another one.

Some embodiments provide a path-aware IPsec gateway that chooses a path at run time for sending packets through a particular IPsec tunnel (or security association) based on path quality information collected from probing different paths of the network. In some embodiments, the collected information includes connectivity, latency, drop rate, jitter, and/or other metrics indicating the dynamic quality of the different paths. The selected path is indicated by e.g., a corresponding port identifier in an UDP header encapsulating the packet. As such, the Path-aware IPsec gateway probes path quality dynamics and chooses the best path at the run time for IPsec session. The control to select and switch paths are driven by IPsec VPN with no dependency on routing.

Figure 1:
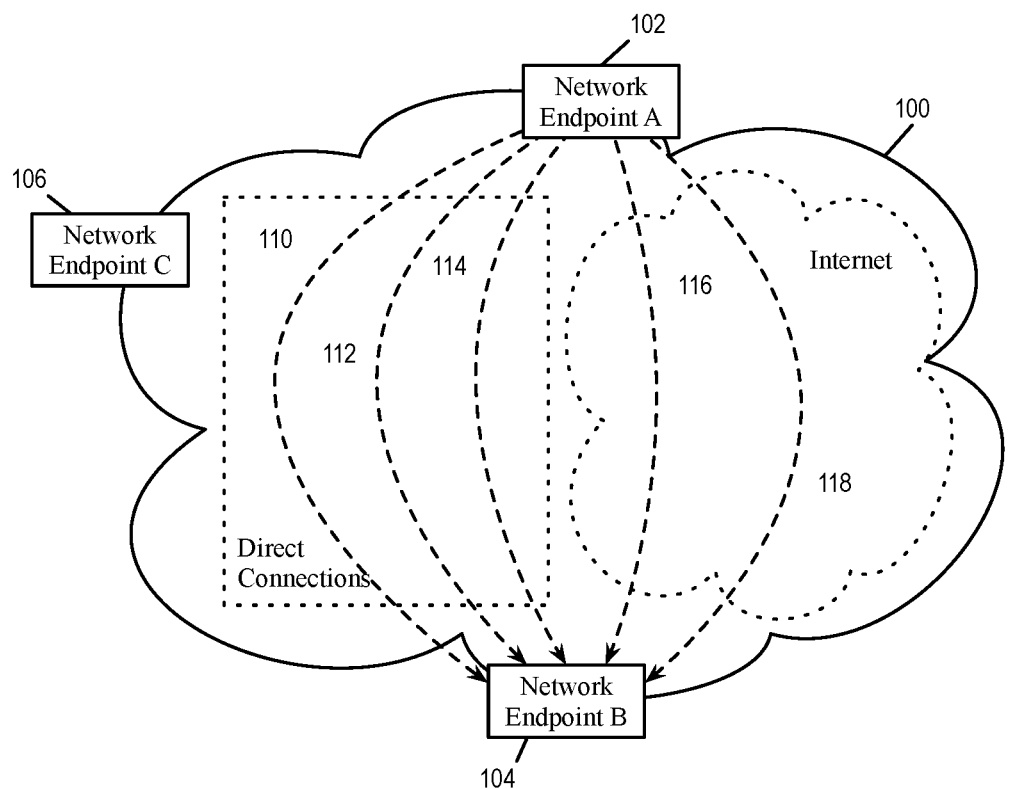
FIG. 1 conceptually illustrates a network in which multiple paths exists between network endpoints.

FIG. 1 conceptually illustrates a network 100 in which multiple paths exists between network endpoints, such that multiple paths can be used by IPsec to transport data from a source endpoint and a destination endpoint in a VPN session. The network 100 interconnects network endpoints 102, 104, and 106, which may refer to physical machines or virtual machines capable of originating and/or receiving data packet traffic through the network 100. The network 100 is implemented by an underlying physical infrastructure of wired and/or wireless communications mediums, routers, switches, etc. The network 100 may include the Internet, as well as any direct connections between some of the network endpoints 102, 104, and 106. The direct connections may refer to interconnections between network endpoints within a same datacenter and/or a same physical device, or other proprietary network connection interconnecting the endpoints 102 and 104 behind a gateway or firewall.

As illustrated, data traffic from the network endpoint 102 can reach the network endpoint 104 by any of multiple network paths 110, 112, 114, 116, and 118. The paths 110, 112, and 114 are paths that are direct connections between the network endpoints 102 and 104 without going through the Internet, while the network paths 116, and 118 are network paths through the Internet.

Figure 2:
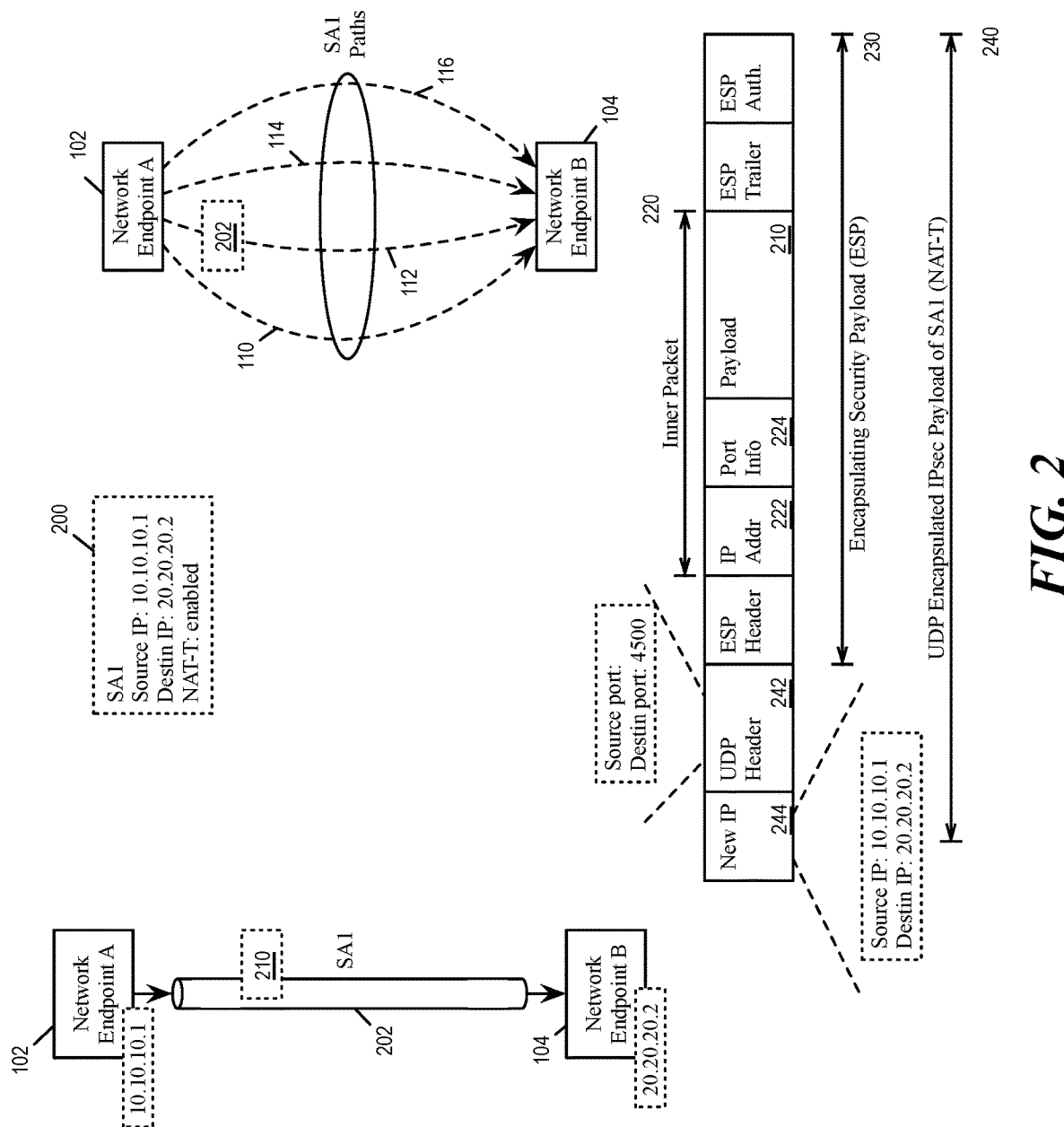
FIG. 2 conceptually illustrates sending IPsec data from one endpoint to another through multiple paths.

FIG. 2 conceptually illustrates sending IPsec data from one endpoint to another through multiple paths. In the example, the IPsec data is based on a security association (SA) 200 (labeled as "SA1"), which is defined for the addresses of the endpoints 102 and 104. As illustrated, an IPsec tunnel 202 has been established for sending data 210 from the endpoint 102 to the endpoint 104. Multiple paths may be used to deliver packet traffic for the SA 200, including paths 110, 112, 114, and 116.

A security association is the establishment of shared security attributes between two network entities (e.g., between the network endpoints 102 and 104, or between two gateways of two different datacenters) to support secure communication. A SA may correspond to a one-way or simplex connection. A SA may include attributes such as cryptographic algorithm and mode, traffic encryption key, and parameters for the network data to be passed over the connection. A SA is a form of contract between the two network entities detailing how to exchange and protect information among each other, including indicating how to encrypt/decrypt data. Each SA may include a mutually agreed-upon key, one or more secure protocols, and a security parameter index (SPI) value identifying the SA, among other data.

The data 210 is the payload of an inner packet 220 having inner IP address 222 and inner port info 224. The inner packet 220 is encrypted according to the SA 200 as IPsec authenticated data in an encapsulating security payload (ESP) 230. Since the inner IP address 222 is encrypted along with the inner packet 220 and cannot be used to route the packet, a new IP field 244 is appended to the ESP 230 to specify outer source and destination IP addresses. The outer source and destination IP addresses are unencrypted and can be used to route the packet. In the example, the outer source and destination IP addresses 10.10.10.1 and 20.20.20.2 are used by the security association 200 ("SA1") to route the packet. In some embodiments, the source and/or destination IP addresses together with the security parameter index (SPI) of the packet are used to identify an SA. (SPI is a unique identifier for the SA.)

The authenticated data 230 may be further encapsulated as a user datagram protocol (UDP) encapsulated packet 240 by a UDP header 242. In some embodiments, this UDP encapsulation is performed if network address translation (NAT) is enabled in the paths used by the SA 200 and if NAT traversal (NAT-T) is used to deliver the IPsec authenticated data 230. The UDP header 242 may specify a set of outer source and destination ports (or UDP ports). In some embodiments, NAT-T is not enabled and the packet 220 does not include the UDP header 242.

Figure 3:
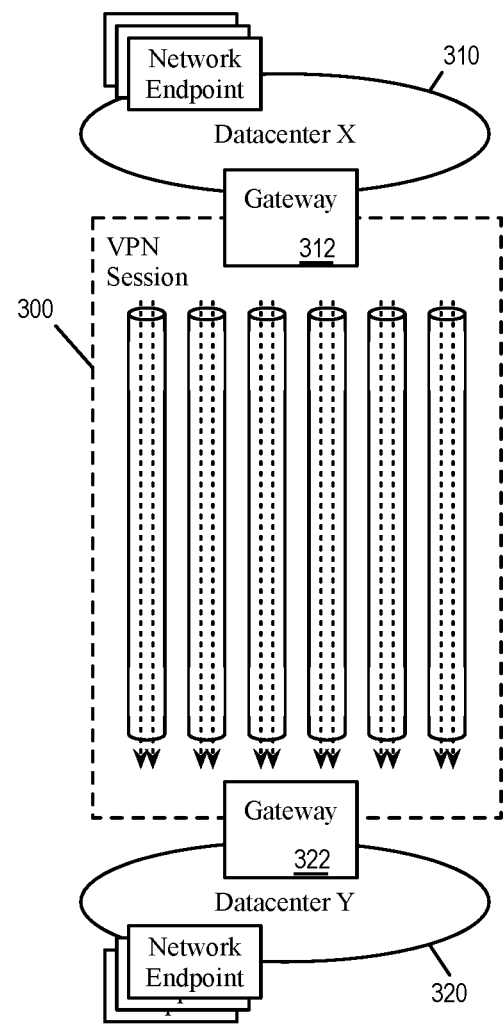
FIG. 3 conceptually illustrates a VPN session that is established to securely transport or migrate data from a first datacenter to a second datacenter.

In some embodiments, a gateway of a first datacenter may establish a VPN session to securely transport data to a second datacenter across multiple paths, either through direct connections or through the Internet. FIG. 3 conceptually illustrates a VPN session 300 that is established to securely transport or migrate data from a first datacenter 310 to a second datacenter 320. The datacenter 310 has a gateway 312 for managing the datacenter's traffic with external networks, including any direct connection to the second datacenter 320 or the Internet. The VPN session 300 may use multiple IPsec tunnels and establish multiple SAs, and the gateway 312 manages the VPN session 300 and the multiple IPsec tunnels. The gateway 312 may use the VPN session to transport IPsec data on behalf of network endpoints of the first datacenter. In some embodiments, the gateway 312 may also use multiple addresses of local endpoints to establish the multiple SAs or IPsec tunnels. For the VPN session 300, the gateway 312 of the first datacenter is the VPN client and a gateway 322 of the second datacenter is the VPN server. The paths connecting the two datacenters may support one or more active uplinks from the VPN client to the VPN server.

Rather than relying on simple ECMP to perform path selection based on fixed outer IP addresses, the gateway 312 uses path quality information to identify the best performing or the most suitable path. In some embodiments, the gateway 312 obtains the path quality information by collecting metrics by sending probe messages to the different paths and receiving responses to the probe messages.

Figure 4:
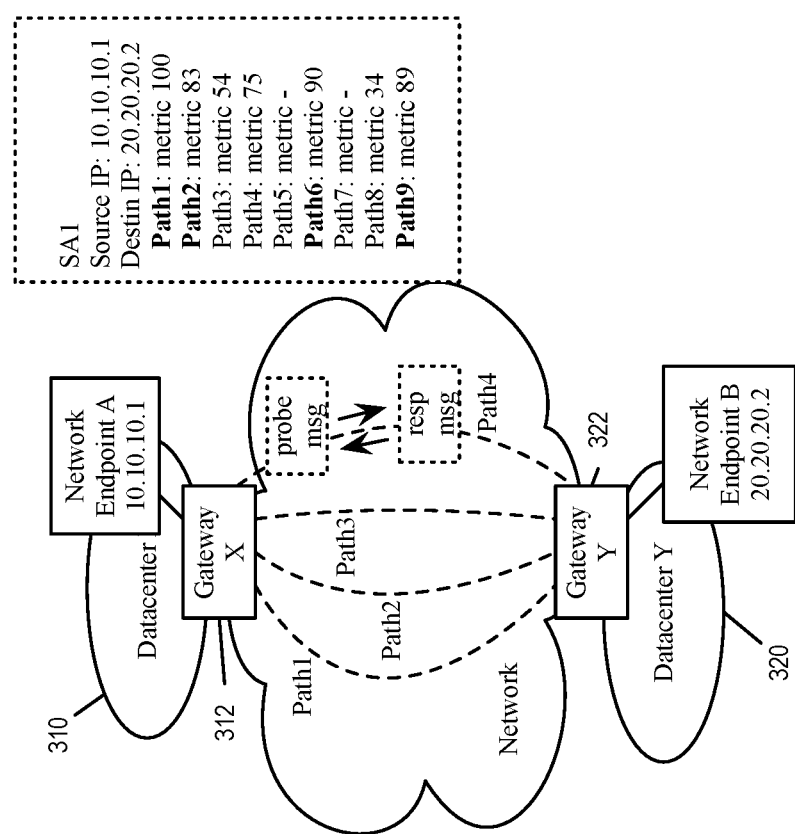
FIG. 4 conceptually illustrates a gateway collecting path quality information in order to perform path selection for sending IPsec data.

FIG. 4 conceptually illustrates a gateway collecting path quality information in order to perform path selection for sending IPsec data. The gateway 312 of the datacenter 310 periodically sends out probe messages to individual paths that can reach the datacenter 320. These probe messages can be used to obtain dynamic or real-time measurements or metrics regarding connectivity, latency, drop rate, jitter, etc. of the paths. For example, the gateway may send a probe message to ping a path to measure the latency of the path or to determine the liveliness of the path. The gateway 312 tabulates the performance metrics of the different paths and periodically update the metrics. The gateway may also maintain a pool of paths that have performance metrics above a certain threshold that can be used for sending the IPsec data.

In the example, the gateway 312 send probe messages to paths that are identified by the pair of source and destination IP addresses 10.10.10.1 and 20.20.20.2, which defines a security association "SA1". The gateway 312 then uses the metrics obtained for those paths to identify the best performing path for the given security association. The gateway 312 may indicate the selected path to the routing layer. In some embodiments, different paths are associated with different source and/or destination ports, and the gateway 312 indicates the selected path in the UDP header (e.g., 242) by setting the source and/or destination port to a value that correspond to the selected path. Probing paths to obtain path performance metrics is also described in commonly owned U.S. patent application Ser. No. 17/016,596, entitled "PATH SELECTION FOR DATA PACKETS ENCRYPTED BASED ON AN IPSEC PROTOCOL," filed on Sep. 10, 2020. U.S. patent application Ser. No. 17/016,596 is incorporated herein by reference in its entirety.

In some embodiments, the gateway 312 keeps multiple active paths for a given security association, and load balancing is performed by distributing outgoing IPsec packets of the given security association among the multiple active paths. The multiple active paths may concurrently transmit packets for the security association. In some embodiments, the gateway identifies any path that can be used to send packets to the VPN peer as an active path for load balancing. In some embodiments, the gateway identifies paths having performance metrics above certain threshold as active paths or best performing paths for load balancing. In the example of FIG. 4, paths having performance metric above 80 are identified by the gateway 312 as active paths, so path1 (metric 100), path2 (metric 83), path6 (metric 90), and path9 (metric 89) are used as multiple active paths for load balancing for security association SA1, while other paths are not used for load balancing.

Figure 5:
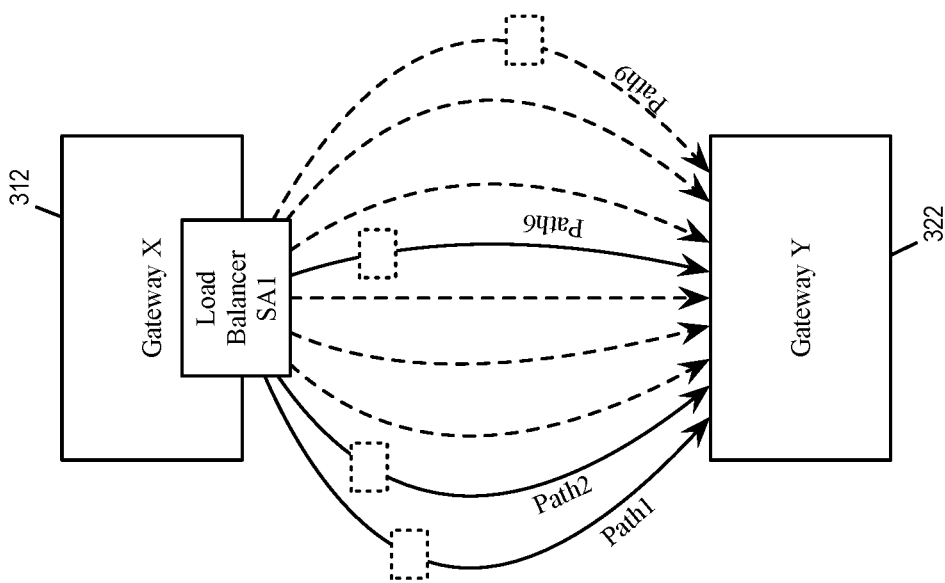
FIG. 5 conceptually illustrates load balancing across multiple active paths for a security association SA1.

FIG. 5 conceptually illustrates load balancing across multiple active paths for a security association SA1. As illustrated, the gateway 312 dispatches packets for delivery to the gateway 322 as the VPN peer. A load balancer module 500 of the gateway distributes the dispatched packets among these paths that are identified as active paths or best performing paths for sending IPsec packets for SA1, and these active paths (path1, path2, path6, and path9 in the example) may concurrently be active in delivering packets to the gateway 322.

The load balancer 500 may select a path among the multiple active paths based on a hash value that is derived from specific fields of the inner payload, e.g., port number, source IP address, destination IP addresses, protocol identifier, etc. A hash value may be computed based on the 5-tuple included in the inner L3/L4 header. The 5-tuple may include a source IP address, a destination IP address, a source port identifier, a destination port identifier, and a protocol identifier. In some of these embodiments, the gateway may direct the load balancer to select a particular path by setting a specific field of the packet to a value that correspond to the particular path.

It should be noted that while certain embodiments are described for communication between gateways, the techniques may similarly be applicable to communication between any suitable computing machines (e.g., virtual computing instances, physical computing devices, etc.).

In some embodiments, when multiple tunnels in different uplinks (e.g., one uplink through direct connection and one uplink through Internet) have the same reachability (i.e., can all be used to reach a VPN server from a VPN client), the information generated by path probing is used to select a best path among the different tunnels in the different uplinks. The different uplinks may be used to send data for different security associations.

Figure 6:
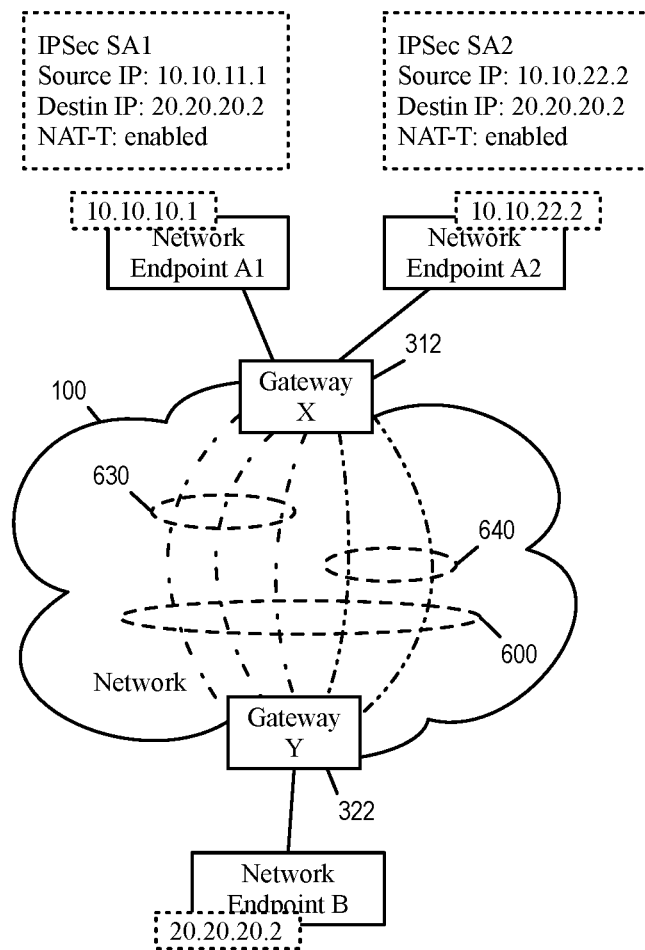
FIG. 6 conceptually illustrates a VPN client using multiple paths in multiple uplinks or tunnels to send IPsec data to a VPN server across the network.

FIG. 6 conceptually illustrates a VPN client using multiple paths in multiple uplinks or tunnels to send IPsec data to a VPN server across the network 100. As illustrated, the gateway 312 has established a VPN session 600 as a VPN client with the gateway 322 as a VPN server. The VPN session uses two security associations, SA1 and SA2 to send IPsec data across the network 100. The security association SA1 has several paths with source IP 10.10.10.1 and destination IP 20.20.20.2. The security association SA2 has several paths with source IP 10.10.22.2 and destination IP 20.20.20.2. The SA1 is used to encrypt and authenticate IPsec data for a VPN tunnel (or uplink) 630 and the SA2 is used to encrypt and authenticate IPsec data for a VPN tunnel (or uplink) 640. Specifically, any flows communicated from endpoints in the first datacenter to endpoints in the second datacenter may be encrypted at the first datacenter using SA1 and sent over the VPN tunnel 630 or using SA2 and sent over the VPN tunnel 640.

In some embodiments, the gateway 312 is configured with a Virtual Tunnel Interface (VTI) to handle data traffic to and from a VPN tunnel. A VTI is a logical routing layer interface configured at an end of a VPN tunnel to support route-based VPN with IPsec profiles attached to the end of the tunnel. Egressing traffic from the VTI is encrypted and sent to the VPN peer, and the SA associated with the tunnel decrypts the ingress traffic to the VTI.

In some embodiments, one single VTI is configured at the source gateway for a bundle of multiple different SAs. The destination gateway is similarly configured with a single corresponding VTI for the bundle of different SAs. Each SA has a different SPI value associated therewith, and the tuples of header values of packets communicated across the different VPN tunnels may hash to different CPUs at the destination gateway for processing.

As there is a single VTI interface, routes are installed for the single VTI interface, thereby avoiding ECMP based load distribution asymmetric routing due to multiple interfaces for multiple SAs. All packets that are routed over the VTI are load distributed across the bundle of SAs that are setup for the VTI. The load distribution for packets over SA may be done using simple hash over 5 tuples in packet or with an agreed algorithm between the peer and the gateway.

Figure 7:
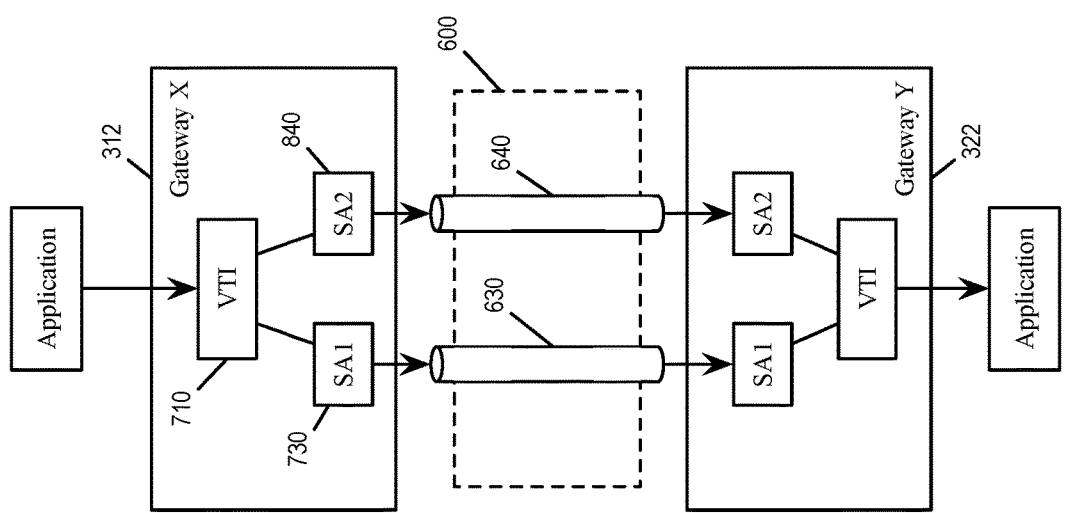
FIG. 7 conceptually illustrates one single VTI that is associated with different SAs for IPsec encryption.

FIG. 7 conceptually illustrates one single VTI that is associated with different SAs for IPsec encryption. As illustrated, the gateway 312 implements a VTI 710 at its application layer. The VTI 710 receives both data traffic to be encrypted by SA1 and data traffic to be encrypted by SA2. IPsec traffic of SA1 uses the first VPN tunnel 630 and the IPsec traffic of SA2 uses the second VPN tunnel 640.

In some embodiments, multiple VTIs may be configured at the source gateway, where each VTI is associated with a different SA for encryption. The destination gateway is similarly configured with multiple corresponding VTIs, each associated with the same corresponding different SA for decryption. This way, the source and destination gateways implement multiple VPN tunnels, each of which corresponds to a different VTI, and each of which is associated with a different SA. Each SA has a different SPI value associated therewith, and the tuples of header values of packets communicated across the different VPN tunnels may hash to different CPUs at the destination gateway for processing.

In some embodiments, from the perspective of the application layer (e.g., L7 of the OSI), the gateway for the VPN traffic implements a single teaming interface or device (or a bonded VTI) for the VPN session 600. However, from the routing layer (L3 of the OSI) perspective, the gateway implements multiple VTIs that correspond to multiple VPN tunnels or SAs. The single teaming interface or bonded VTI logically combines the different VTI tunnels into one IPsec VPN tunnel. As long as at least one of the VPN tunnels is available to the teaming interface, the VPN traffic may be forwarded to a remote gateway, and the upper layer protocol traffic may proceed without interruptions. In some embodiments, all information regarding the different paths and VTIs are transparent to the administrator. In some embodiments, the different VTIs are visible to the administrator of the datacenter, allowing different firewall or MTU configuration be applied to different tunnels, giving more flexibility to the administrator. Teaming multiple VTIs as one bonded VTI is further described in commonly owned U.S. patent application Ser. No. 16/514,647, entitled "USING VTI TEAMING TO ACHIEVE LOAD BALANCE AND REDUNDANCY," filed on Jul. 17, 2019. U.S. patent application Ser. No. 16/514,647 is published as U.S. Patent Publication No. 2021/0021523 on Jan. 21, 2021, which is incorporated herein by reference in its entirety.

Figure 8:
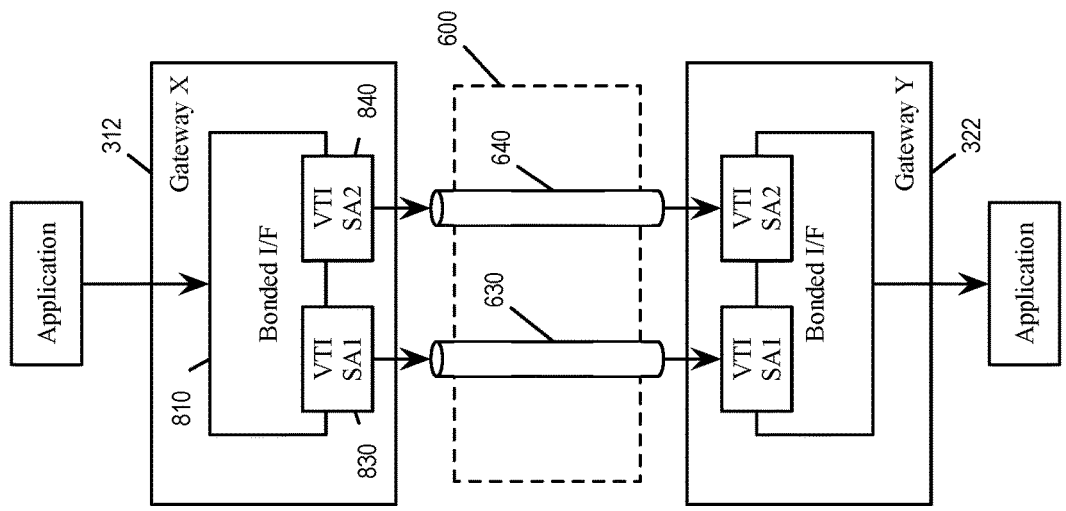
FIG. 8 conceptually illustrates multiple VTIs that are associated with different SAs for encryption logically combined into bonded VTI.

FIG. 8 conceptually illustrates multiple VTIs that are associated with different SAs for encryption logically combined into a bonded VTI. As illustrated, the gateway 312 implements a bonded VTI 810 at its application layer. The bonded VTI 810 has two L3 slave VTIs: a first slave VTI 830 to the VPN tunnel 630 using SA1 and a second slave VTI 840 to the VPN tunnel 640 using SA2. Likewise, the gateway 322 implements a bonded VTI 815 having a first slave VTI 835 for receiving IPsec data from the VPN tunnel 630 and a second slave VTI 845 for receiving IPsec data from the VPN tunnel 640.

In some embodiments, the gateway 312 aggregates path information for paths used by both VPN tunnels 620 and 630 (as well as any other paths used by the VPN session 600). Specifically, the gateway sends out probe messages to paths of different VPN tunnels and different SAs to obtain dynamic qualities of those different paths. For each packet to be delivered using the VPN session 600, the gateway 312 selects a best path from among the paths of the different VPN tunnels based on the aggregated path information.

FIGS. 9A-B illustrates the gateway using aggregated path information to select a best path from multiple different VPN tunnels. The gateway 312 receives application data 900 at a virtual interface 910 (e.g., the single VTI 710 or the bonded VTI 810) to be transmitted to the gateway 312 through either VPN tunnel 630 or VPN tunnel 640. In the example, the gateway 312 has sent probe messages to paths of the VPN tunnel 630 and VPN tunnel 640 and obtained a set of path quality metrics. The gateway 312 maintains a pool of paths from both VPN tunnels by identifying paths that have performance metrics above a certain threshold. The path performance metrics may be updated in real time so the gateway 312 selects the best path based on dynamic, real-time information.

FIG. 9A illustrates the gateway 312 selecting a path 910 that correspond to source port 5001, which is a path used by the VPN tunnel 630 for SA1. The path 910 has the best performing metric among all paths used by SA1 and SA2. Since this path is one of the paths used by the VPN tunnel 630, the gateway 312 encrypts the received application data 900 according to SA1 and encapsulate the encrypted data with a UDP header. The UDP header indicates a port number (source port 5001) that corresponds to the selected path 910. The routing layer in turn performs ECMP and hash the UDP header to use the path 910. In some embodiments, the path 910 is one of several active paths that can used to transmit packet for SA1 or the VPN tunnel 630.

FIG. 9B illustrates the gateway 312 selecting a path 920 that correspond to source port 6003, which is a path used by the VPN tunnel 640 for SA2. The path 920 has the best performing metric among all paths used by SA1 and SA2. Since the path 920 is one of the paths used by the VPN tunnel 640, the gateway 312 encrypts the received application data 900 according to SA2 and encapsulate the encrypted data with a UDP header. The UDP header indicates a port number (source port 6003) that corresponds to the selected path 920. The routing layer in turn performs ECMP and hash the UDP header to use the path 920. In some embodiments, the path 920 is one of several active paths that can used to transmit packet for SA2 or the VPN tunnel 640.

Figure 10:
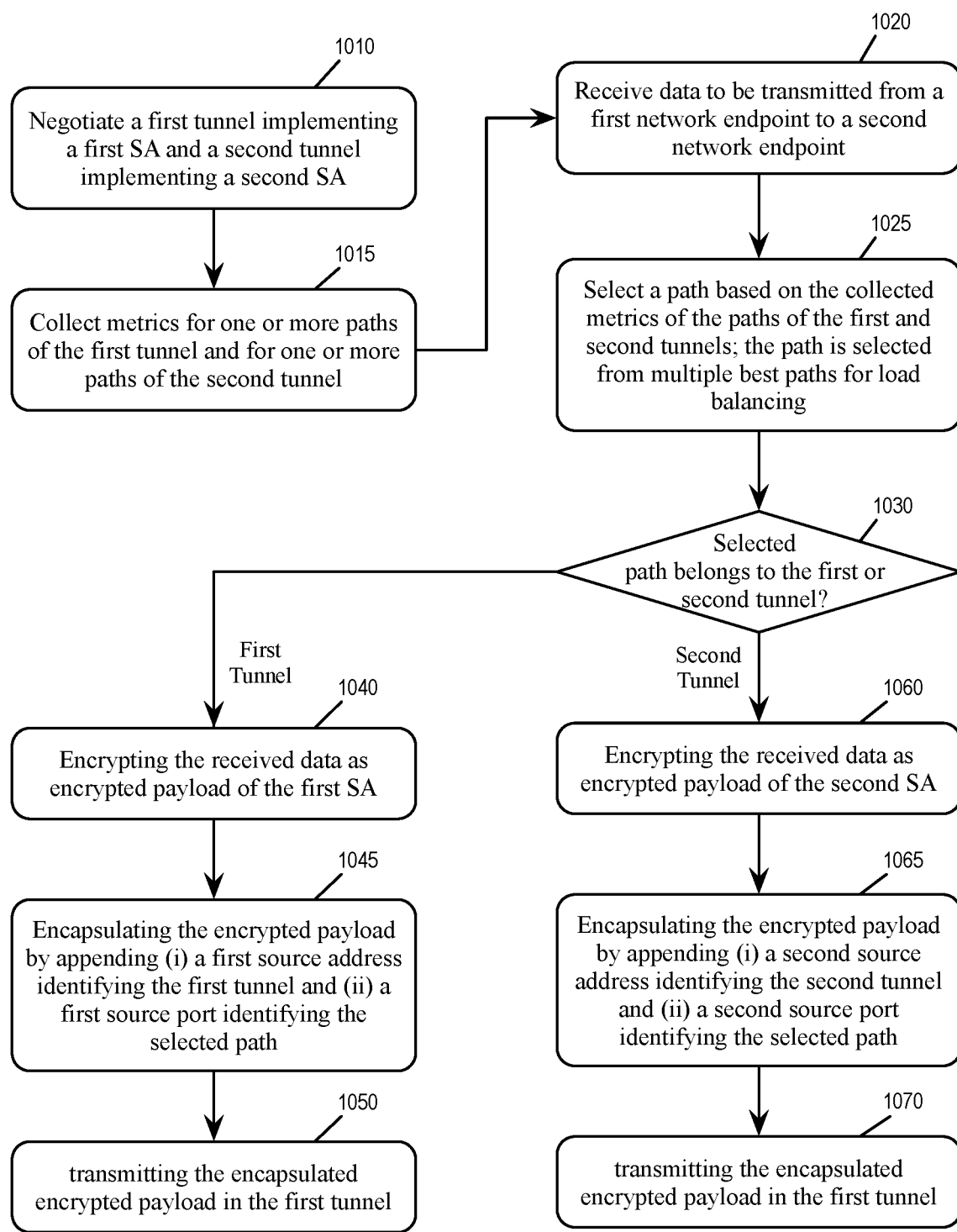
FIG. 10 conceptually illustrates a process for using multiple paths in multiple different SAs to transmit IPsec data.

For some embodiments, FIG. 10 conceptually illustrates a process 1000 for using multiple paths in multiple different SAs to transmit IPsec data. In some embodiments, one or more processing units (e.g., processor) of a computing device implementing the gateway 312 perform the process 1000 by executing instructions stored in a computer readable medium.

In some embodiments, the process 1000 starts when the gateway negotiates (at 1010) a first (VPN) tunnel implementing a first SA and a second (VPN) tunnel implementing a second SA. The first and second SAs and tunnels are established as part of a VPN session, for which the gateway is a VPN client and a remote gateway is a VPN server. One tunnel may include paths through the Internet, while the other tunnel does not include paths through the Internet, or include only direct connections within a datacenter or between two datacenters.

The gateway collects (at 1015) metrics for one or more paths of the first tunnel and for one or more paths of the second tunnel. In some embodiments, the gateway sends probe messages and receives responses to the probe messages. The collected metrics for the one or more paths of the first and second tunnels are determined based on the received responses to the probe messages. In some embodiments, the metric of a path includes at least one of connectivity, latency, drop rate, jitter of the path.

The gateway receives (at 1020) data to be transmitted from a first network endpoint to a second network endpoint. In some embodiments, the first network endpoint is hosted by a first datacenter and the second network endpoint is hosted by a second datacenter. The gateway is an edge appliance of the first datacenter. The VPN server is a gateway or edge appliance of the second datacenter. In some embodiments, the data is received at a single routing layer interface (or VTI) for encryption and transmission in the first tunnel using the first SA and in the second tunnel using the second SA. In some embodiments, the data is received at a bonded interface at an application layer from an application, and the bonded interface logically combines a first routing layer interface for encrypting and encapsulating the received data for transmission in the first tunnel using the first SA and a second routing layer interface for encrypting and encapsulating the received data for transmission in the second tunnel using the second SA. The gateway selects (at 1025) a path based on the collected metrics of the paths of the first and second tunnels. In some embodiments, the collected metrics of the paths are used to identify a pool of best performing paths, and the gateway selects a path from the pool of best performing paths for load balancing.

The gateway determines (at 1030) whether the selected path belongs to the first tunnel or the second tunnel (or another tunnel established for the VPN session). If the selected path belongs to the first tunnel, the process proceeds to 1040. If the selected path belongs to the second tunnel, the process proceeds to 1060.

At 1040, the gateway encrypts the received data as encrypted payload of the first SA. The gateway encapsulates (at 1045) the encrypted payload by appending (i) a first source address identifying the first tunnel and (ii) a first source port identifying the selected path. In some embodiments, the encapsulation includes a UDP header that stores the first source port. The gateway transmits (at 1050) the encapsulated encrypted payload in the first tunnel. The process may return to 1015 for the gateway to continue collect path performance metrics and select paths for delivering subsequent IPsec data.

At 1060 (when the selected path belongs to the second tunnel), the gateway encrypts the received data as encrypted payload of the second SA. The gateway encapsulates (at 1065) the encrypted payload by appending (i) a second source address identifying the second tunnel and (ii) a second source port identifying the selected path. In some embodiments, the encapsulation includes a UDP header that stores the second source port. The gateway transmits (at 1070) the encapsulated encrypted payload in the second tunnel. The process may return to 1015 for the gateway to continue to collect path performance metrics and select paths for delivering subsequent IPsec data.

Figure 11:
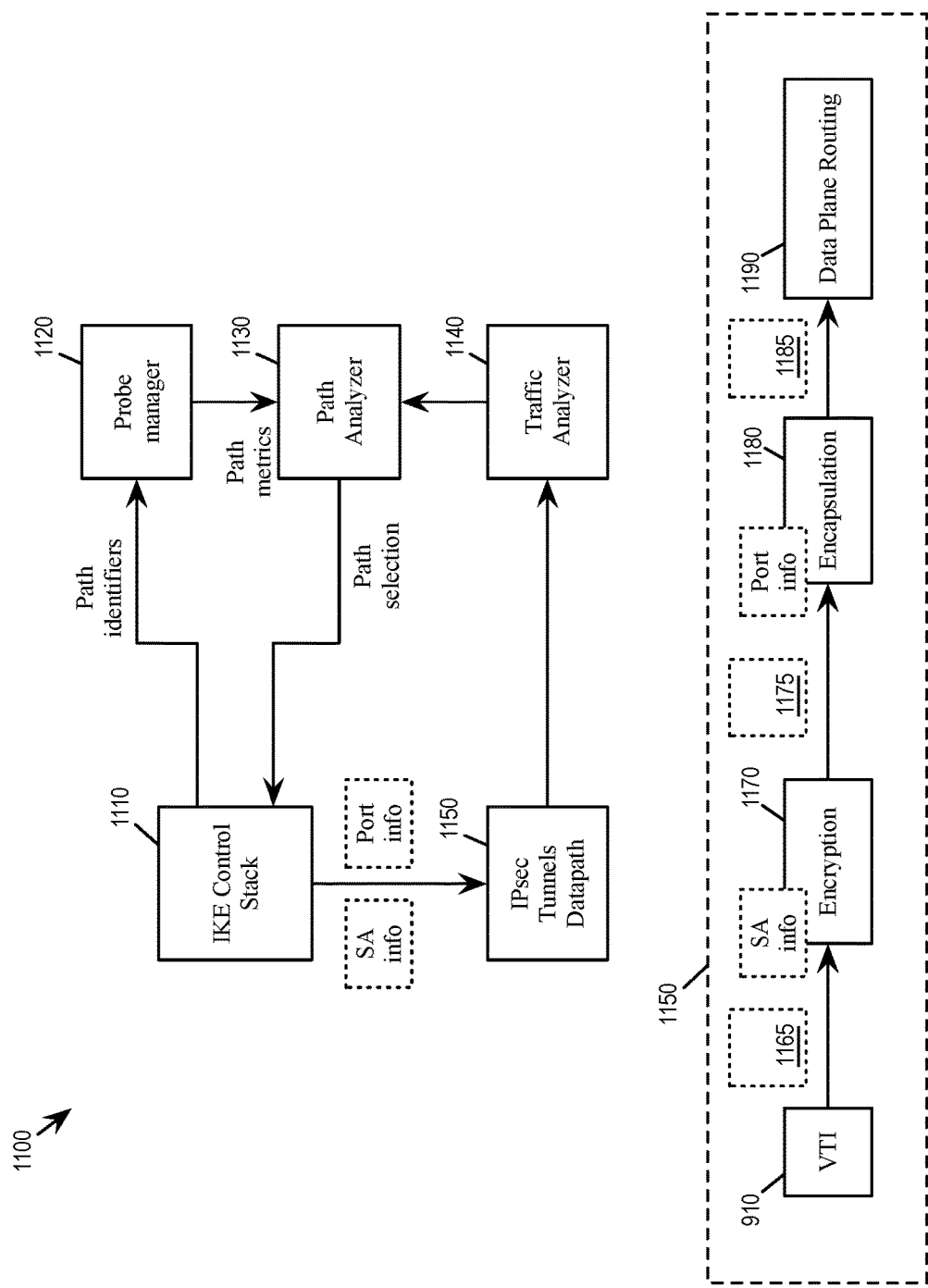
FIG. 11 illustrates a block diagram of a system that probes multiple paths to find a best path and updates IP addresses of a SA to use the best path.

FIG. 11 illustrates a block diagram of a system 1100 that probes multiple paths to find a best path and updates IP addresses of a SA to use the best path. In some embodiments, the system 1100 is implemented in a gateway or edge appliance of a datacenter, such as the gateway 312. The system 1100 may be implemented by a bare metal computing device or a host machine running virtualization software that operates the gateway in one or more virtual machines. In some embodiments, the system 1100 represents VPN control plane.

As illustrated, the system 1100 implements an IKE-control stack 1110, a probe manager 1120, a path analyzer 1130, a traffic analyzer 1140, and IPsec tunnels datapath 1150. In some embodiments, the modules 1110-1140 are submodules of the VPN control plane, while the module 1150 represents the VPN dataplane. In some embodiments, the modules 1110-1150 are modules of software instructions being executed by one or more processing units (e.g., a processor) of a computing device. In some embodiments, the modules 1110-1150 are modules of hardware circuits implemented by one or more integrated circuits (ICs) of an electronic apparatus. Though the modules 1110, 1120, 1130, 1140, and 1150 are illustrated as being separate modules, some of the modules can be combined into a single module.

The IKE control stack 1110 controls the operations of IPsec, including establishing and maintaining VPN session and SAs. The IKE control stack provides the necessary authentication key data to IPsec tunnels datapath 1150 for authenticating and encrypting payloads. The IKE control stack 1110 also identifies the paths that are determined to be available to reach the VPN server and maps those paths to UDP port identifiers. The list of available paths, or the identifiers of the UDP port identifiers, are provided to the probe manager 1120 to probe those paths.

The probe manager 1120 periodically probes all the available paths to calculate metrics for different paths. In some embodiments, the probe manager 1120 is configured with the number of probe packets per path. The path metrics are provided to the path analyzer 1130. As the probe manager 1120 generates the packets to probe the paths and to compute and update the path metrics according to the probe results, the path analyzer 1130 identifies the best path among all paths based on the path metrics.

The path analyzer 1130 drives the selection of the best path from different paths across different SAs. The path analyzer 1130 can also take into consideration the link throughput, run time, traffic load, liveliness, route optimization, RTT, load balancing, and path MTU when determining a new path. The path analyzer 1130 also uses input from the traffic analyzer 1140 to influence path change decision based on traffic characteristics. Once the selection of the best path is made, the IKE control stack 1110 provides the corresponding SA information and the UDP information to the IPsec tunnels datapath 1150. In some embodiments, the path analyzer 1130 may trigger path switch based on traffic characteristics (provided by the traffic analyzer 1140) or the QoS requirement.

The IPsec tunnels datapath 1150 performs the operations of the individual VPN tunnels and provides traffic statistics of the tunnels to the traffic analyzer 1140. In some embodiments, The IPsec tunnels datapath 1150 may include various VPN data plane modules. The IPsec tunnels datapath 1150 also performs encryption and authentication of payload based on the SA information provided by the IKE control stack 1110. The IPsec tunnels datapath also encapsulates the encrypted payload in a UDP header that includes the UDP port numbers to identify the selected best path.

When an application uses the gateway to send certain application data in the VPN session 600, the IPsec tunnels datapath 1150 receives the application data at the routing interface VTI 910. The application data is packaged as an inner packet 1165. An encryption module 1170 encrypts the inner packet into an IPsec encrypted packet 1175 according to the encryption parameters of the SA information (specified by the IKE control stack 1110 to select either SA1 or SA2). The encryption module 1170 also append other IPsec related fields based on the SA information (e.g., ESP header, ESP trailer, ESP authentication, new IP, etc.). An encapsulation module 1180 encapsulates the IPsec encrypted packet 1175 as UDP encapsulated packet 1185 with a UDP encapsulation header, which may include UDP port number that is used to indicate the selected path. A data plane routing module 1190 then sends the UDP encapsulated packet 1185.

In some embodiments, a security association (SA) can be configured to use different paths by changing source and destination addresses. As a gateway establishes a SA with a VPN server for a VPN session to send IPsec data from a first site to a second site (e.g., from the datacenter 310 to the datacenter 320), a particular source address and destination address pair are used by the SA to route IPsec packets (SPI is used to identify the SA). In addition, the gateway associates each path that can be used to reach the VPN server with a different pair of source and destination addresses. In some embodiments, as the information generated by path probing is used to select a best performing path, the gateway may indicate the selected path by notifying the VPN server that the source and destination address pair of the SA has changed to one that is associated with the selected path.

In some embodiments, the VPN client and the VPN server are respectively configured with lists of multiple local endpoint addresses. These local endpoints can be routed over single uplink or multiple uplinks. The VPN client exchanges its list of local endpoint addresses with the list of local endpoint addresses of the VPN server, and pairing the addresses of the VPN client and the addresses of the VPN server are used as source and destination addresses to identify the possible paths for the SA to be probed. For example, if a first site as a VPN client has n IP addresses and a second site B as a VPN server has m IP addresses, the total number of paths to be probed are n*m. As a further example, if the first site has n links and each link has m IP addresses, and the second site has p links and each link has q IP addresses, a total (n*m)*(p*q) paths will be probed and be available to be selected as the best path. Thus, the gateway keeps a dynamic pool of local endpoints or loopback Ips in order to have ECMP entropy on the IPSec network path used to reach the VPN peer. The individual paths in the pool are also monitored regularly for their qualities (e.g., latency, drop count).

Figure 12:
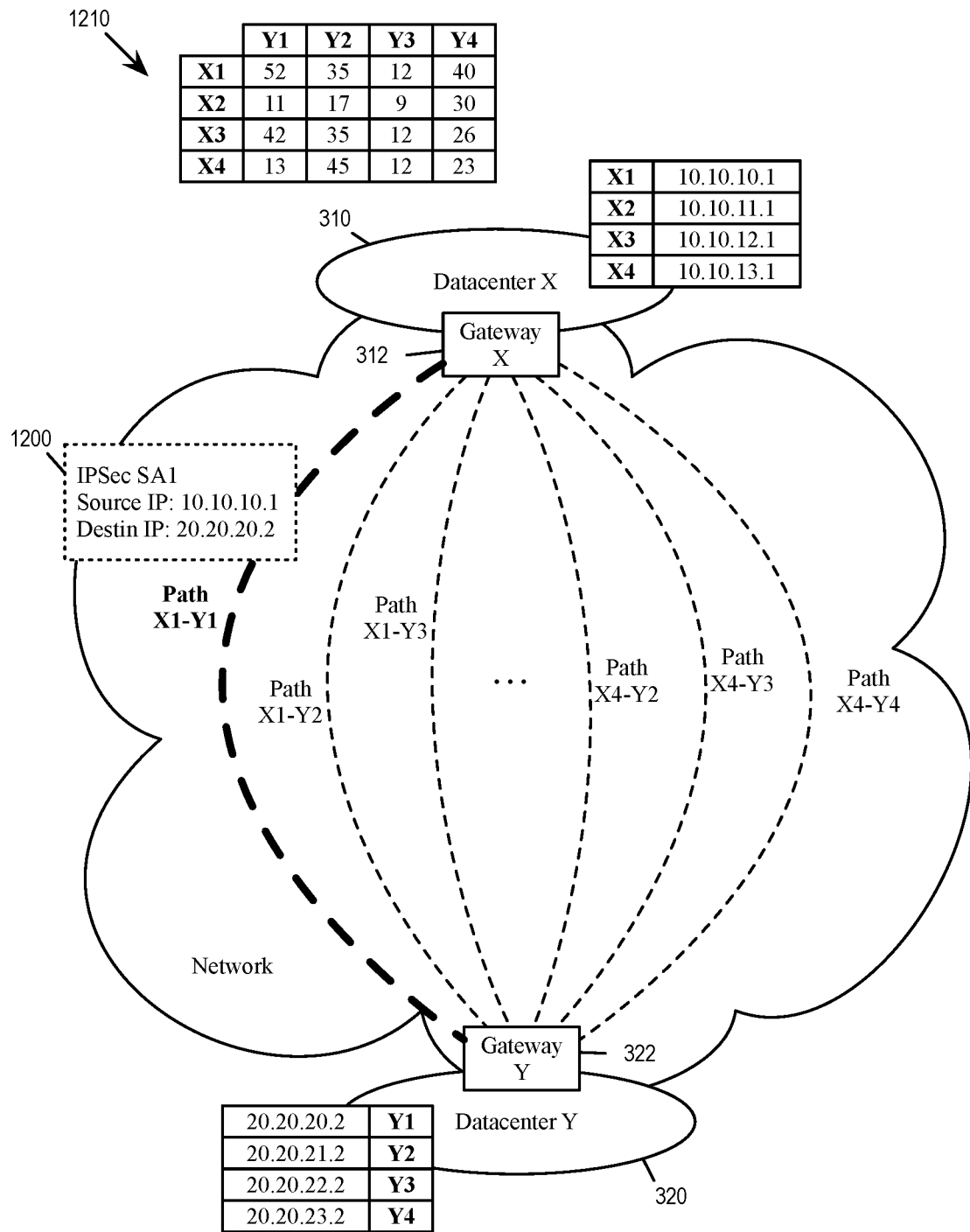
FIG. 12 illustrates a VPN session in which the SA can be configured to use different paths by changing source and destination addresses.

FIG. 12 illustrates a VPN session in which the SA can be configured to use different paths by changing source and destination addresses. As illustrated, for a VPN session, the gateway 312 has established a SA 1200 as a VPN client with the gateway 322 as a VPN server. The SA 1200 is currently configured to have source IP 10.10.10.1 and destination IP 20.20.20.2, which hashes to a value that corresponds to a path labeled "X1-Y1" from the gateway 312 to the gateway 322.

In addition to the path "X1-Y1", there are other paths that can be used by the VPN client 312 to send IPsec traffic to the VPN server 322 but are not currently used by the SA 1200. These different paths correspond to different pairings of local endpoint addresses used by the gateway 312 and the gateway 322. In the example, the gateway 312 is configured to have local addresses 10.10.10.1 (labeled "X1"), 10.10.11.1 (labeled "X2"), 10.10.12.1 (labeled "X3"), and 10.10.13.1 (labeled "X4"), while the gateway 322 is configured to have local addresses 20.20.20.2 (labeled "Y1"), 20.20.21.2 (labeled "Y2"), 20.20.22.2 (labeled "Y3"), and 20.20.23.2 (labeled "Y4"). Each pairing of a local address of the gateway 312 (as source address) and a local address of the gateway 322 (as destination address) hashes to a value that correspond to a different path (labeled as "X1-Y1", "X1-Y2", "X4-Y4", etc.) In some embodiments, some of the endpoint addresses may be a loopback IP addresses that are introduced to enhance ECMP entropy.

The gateway 312 also sends out probe messages to obtain path performance metrics about the different paths. In some embodiments, the gateway uses liveliness probes to check the reachability of the available network addresses. These same messages are used to obtain path performance metrics about the different paths. In some embodiments, the performance metrics of a path may include at least one of round-trip time (RTT), link throughput/bandwidth, traffic load, load balancing, path maximum transmission unit (MTU), path optimization, packet loss per path, etc. The metrics of the different paths are aggregated and tabulated for the different pairings of source and destination addresses in a path matrix 1210, in which each entry correspond to a path. The path matrix 1210 can also be referred to as a probe matrix, as the entries of the matrix 1210 are filled and updated by metrics that are determined by probing the different paths. The matrix may be maintained by the gateway 312, or else in the datacenter 310 as a VPN site.

The gateway may select a best path based on the content of the path matrix 1210, then modify the source and destination address of the SA 1200 to correspond to the selected best path. In some embodiments, the gateway 312 uses the IKEv2 Mobility and Multihoming Protocol (MOBIKE) to communicate with the VPN server 322 to change the addresses of the SA without interrupting the operations of the SA, so that the SA need not be re-established due to the change of address. Prior to using MOBIKE to change the IP addresses of a SA, the two sides of the SA exchange their respective lists of local endpoint addresses using MOBIKE. After the lists of local endpoint addresses are exchanged using MOBIKE, both the peers/ends of the SA knows the available paths based on the IP addresses exchanged by using MOBIKE.

In some embodiments, the probe messages being sent to collect path performance metrics are MOBIKE reachability/liveliness probes. This allows the probing mechanism to be interoperable with any IPSec peer that supports MOBIKE. In MOBIKE, these probe messages are used for liveliness check for the paths. In some embodiments, the probe messages are used on regular intervals. In some embodiments, bidirectional latency information and drop count per path based on these liveliness probes are maintained by the gateway.

The gateway 312 may perform path or address selection based on policies that apply weighting to different paths according to predefined settings. The weight applied to a specific path can also be based on some traffic characteristics or quality of service (QoS) requirement of the VPN Session. For example, real time traffic may require a higher level of bandwidth, and with the address/path selection policy may select a path which has more bandwidth/throughput along with faster RTT.

Figure 13B:
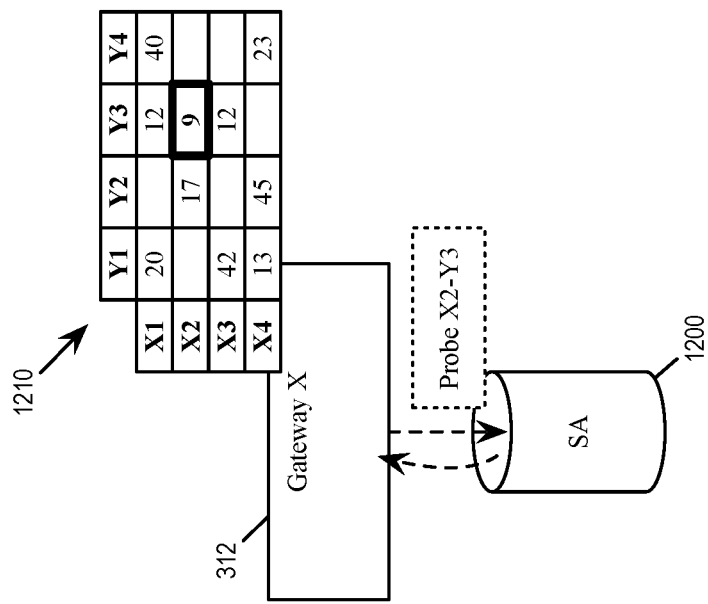
Figure 13A:
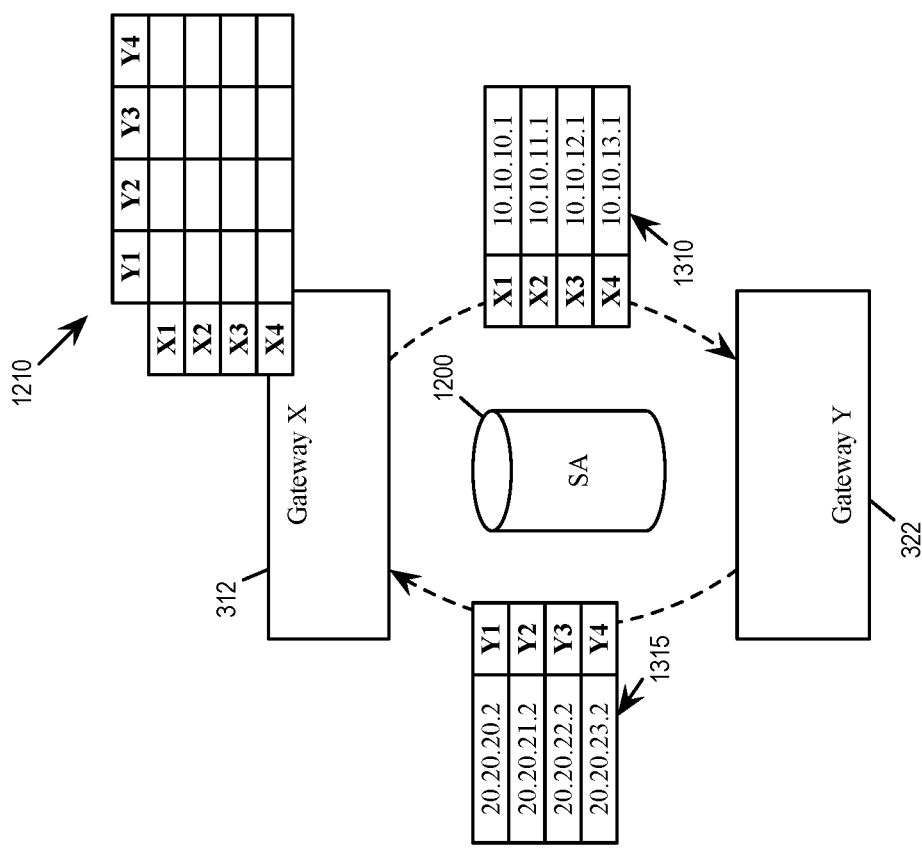

FIGS. 13A-E conceptually illustrate the gateway 312 using the MOBIKE protocol to change the source and destination IP addresses of a SA in order to select the best path. FIG. 13A shows the VPN client gateway 312 sends its list of local addresses 1310 to the VPN server gateway 322, and the VPN server gateway 322 sends its list of local addresses 1315 to the VPN client gateway 312. Based on the exchange of the lists of local addresses, the VPN client 312 generates a matrix 1320 (4×4 in this example) whose entries correspond to paths that are defined by pairings of addresses from the list 1310 and the list 1315. FIG. 13B shows the gateway 312 sending probes to the different paths and filling the corresponding entries in the matrix 1320. FIG. 13C shows the gateway 312 using a path (X4-Y2) that has the best performance metrics (45) according to the matrix 1320. The figure also shows the content of an IPsec packet 1310 that uses the path X4-Y2. Specifically, the new IP field 1315 of the packet specifies that the source IP address is endpoint X4 (10.10.13.1) and the destination IP address is endpoint Y2 (20.20.21.2).

Figure 13D:
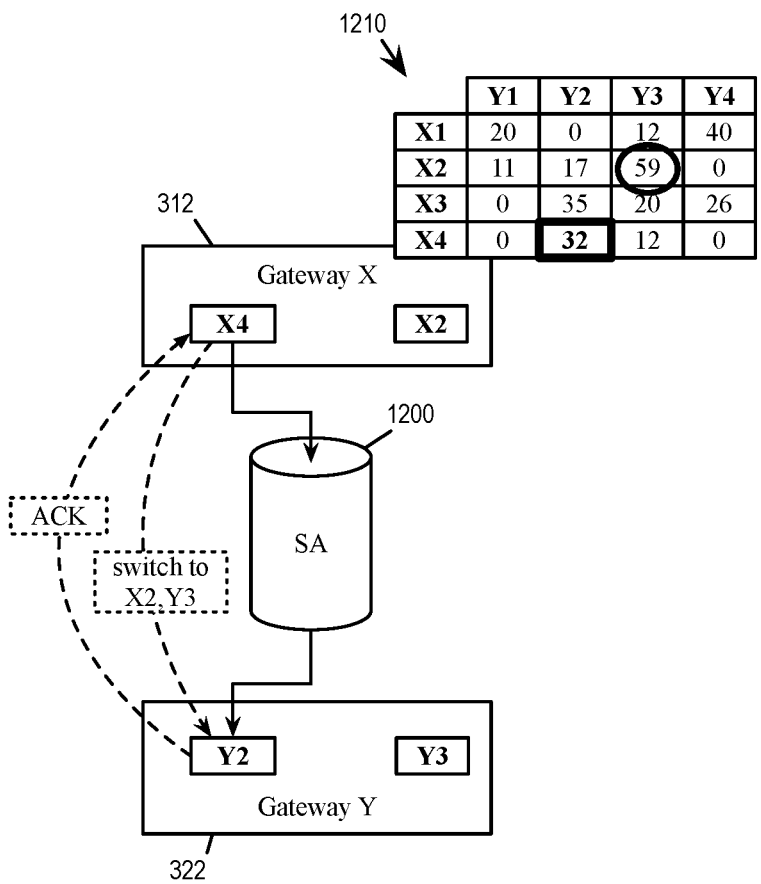
Figure 13E:
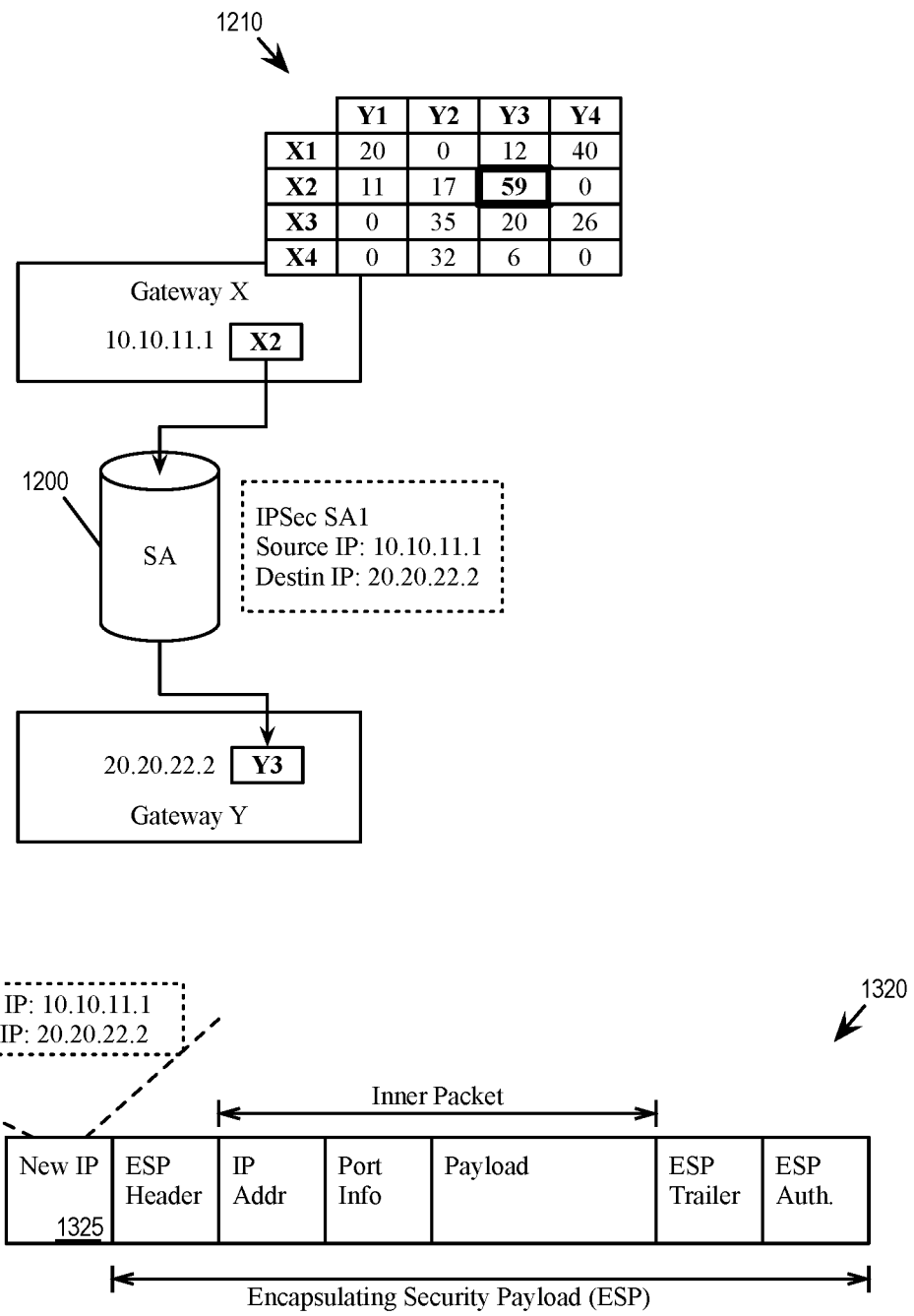

As the gateway 312 continues to probe the paths and updates the matrix 1320, the gateway monitors the matrix 1320. FIG. 13D shows the gateway 1320 monitoring the matrix 1320 to detect that another path (X2-Y3) now has the best performance metric (59). While still using the path X4-Y2, the gateway 312 communicate with the VPN server gateway 322 to change to using the new best performing path X2-Y3. Specifically, the VPN client gateway 312 uses the MOBIKE protocol to change the source and destination IPs of the SA 1200 from (X4,Y2) to (X2,Y3). FIG. 13E shows the VPN client gateway 312 using the path X2-Y3 to send IPsec data to the VPN server gateway 322 using SA 1200. Even though the IP addresses of the SA 1200 has changed, the SA is not interrupted and does not need to be re-established. The figure also shows the content of an IPsec packet 1320 that uses the path X2-Y3. Specifically, the new IP field 1325 of the packet specifies that the source IP address is endpoint X2 (10.10.11.1) and the destination IP address is endpoint Y3 (20.20.22.2).

Figure 14:
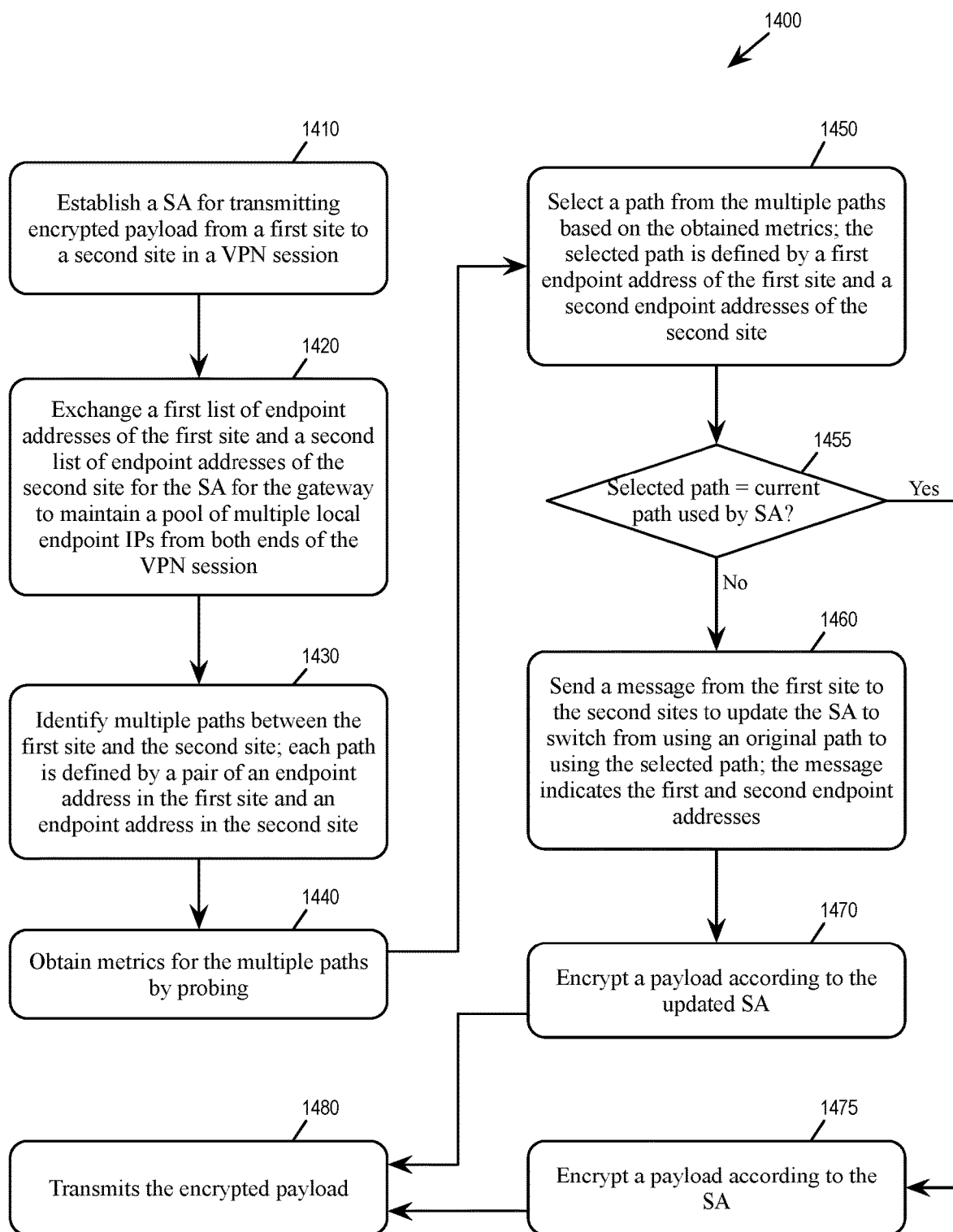
FIG. 14 conceptually illustrates a process for using multiple paths to transmit IPsec data by changing IP addresses of a SA.

For some embodiments, FIG. 14 conceptually illustrates a process 1400 for using multiple paths to transmit IPsec data by changing IP addresses of a SA. Specifically, a gateway of a first site performs the process 1400 for sending IPsec data to a second site. In some embodiments, one or more processing units (e.g., processor) of a computing device implementing the gateway 312 perform the process 1400 by executing instructions stored in a computer readable medium.

The process 1400 begins when the gateway establishes (at 1410) a security association (SA) for transmitting encrypted payload from the first site to the second site in a VPN session. The gateway of the first site is therefore the VPN client of the VPN session, and a gateway of the second site is the VPN server of the VPN session. In some embodiments, there may only be one path in one uplink that is active at a time for the VPN session, and the only one active path has a best path metric among the multiple paths.

The gateway (of the first site) exchanges (at 1420) a first list of endpoint addresses of the first site for a second list of endpoint addresses of the second site for the VPN session with a gateway of the second site. The gateway in turn maintains a pool of multiple local endpoint addresses from both ends of the VPN session so as to have underlay ECMP entropy. The gateway identifies (at 1430) multiple paths between the first site and the second site for the VPN session. Each path is defined by a pair of an endpoint address in the first site and an endpoint address in the second site.

The gateway obtains (at 1440) metrics for the multiple identified paths by e.g., sending probe messages. The metric of a path may be determined based on at least one of connectivity, latency, drop rate, jitter of the path. The metric of a path may also include at least one of round-trip time (RTT), link throughput/bandwidth, traffic load, load balancing, path maximum transmission unit (MTU), path optimization, packet loss per path, etc. In some embodiments, the gateway sends probe messages and receives responses to the probe messages. The obtained metrics for the identified paths are determined based on the received responses to the probe messages. In some embodiments, the obtained metrics are stored in a path matrix (e.g., the path matrix 1210) that is specified based on the first and second lists of endpoint addresses.

The gateway selects (at 1450) a path from the multiple paths based on the obtained metrics. The selected path is defined by a first endpoint address in the first site and a second endpoint addresses in the second site and is the best performing path among the multiple paths. The first endpoint address is identified in the first list of endpoint addresses and the second endpoint address is identified in the second list of endpoint addresses. The gateway then determines (at 1455) whether the selected path is the path currently used by the SA. If so, the process proceeds to 1475. If the selected path is not the path currently used by the SA, the process proceeds 1460.

The gateway sends (at 1460) a message from the first site to the second site to update the SA to switch from using an original path to using the selected path. The message indicates the first and second endpoint addresses. In some embodiments, the message sent to the second site to update the SA using the MOBIKE protocol and updating the SA to use the selected path does not interrupt or re-establish the SA. The gateway encrypts (at 1470) a payload according to the updated SA. The process then proceeds to 1480.

At 1475, the gateway encrypts the payload according to the SA without updating the addresses that indicates the selected path. The gateway transmits (at 1480) a packet comprising the encrypted payload. ECMP routing will be performed based on the first and second endpoint addresses that define the selected path. The outer (tunnel header) addresses of the packet are updated according to the first and second endpoint addresses, while addresses and other traffic selectors used for routing the packet inside a VPN tunnel remain unchanged. The process may return to 1440 to continue probing paths and obtaining path metrics.

Figure 15:
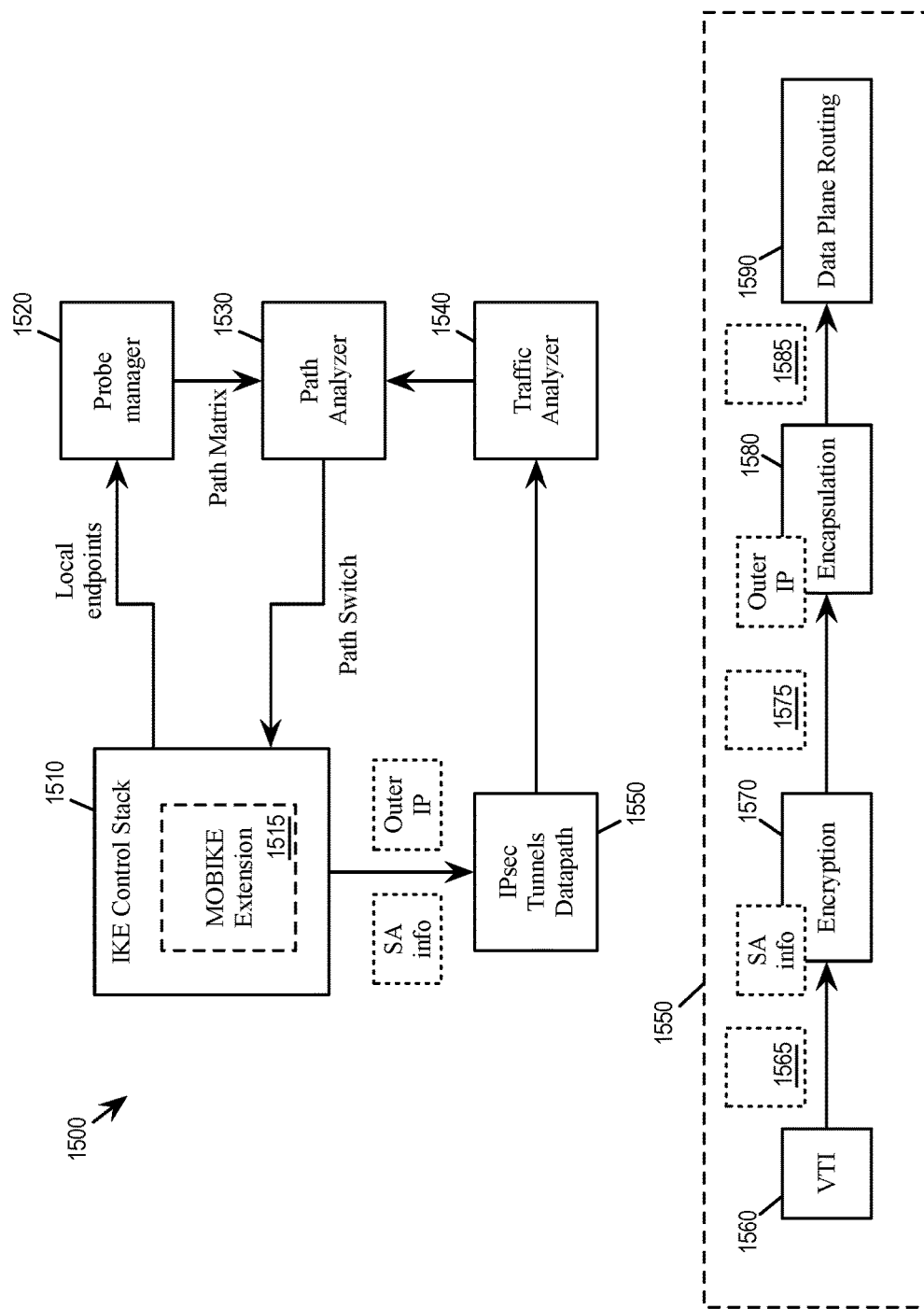
FIG. 15 illustrates a block diagram of a system that probes multiple paths to find a best path and updates IP addresses of a SA to use the best path.

FIG. 15 illustrates a block diagram of a system 1500 that probes multiple paths to find a best path and updates IP addresses of a SA to use the best path. In some embodiments, the system 1500 is implemented in a gateway or edge appliance of a datacenter, such as the gateway 312. In some embodiments, the system 1500 represents VPN control plane. The system 1500 may be implemented by a bare metal computing device or a host machine running virtualization software that operates the gateway in one or more virtual machines.

As illustrated, the system 1500 implements an IKE-control stack 1510, a probe manager 1520, a path analyzer 1530, a traffic analyzer 1540, and IPsec tunnels manager 1550. In some embodiments, the modules 1510-1540 are submodules of the VPN control plane, while the module 1550 represents the VPN dataplane. In some embodiments, the modules 1510-1550 are modules of software instructions being executed by one or more processing units (e.g., a processor) of a computing device. In some embodiments, the modules 1510-1550 are modules of hardware circuits implemented by one or more integrated circuits (ICs) of an electronic apparatus. Though the modules 1510, 1520, 1530, 1540, and 1550 are illustrated as being separate modules, some of the modules can be combined into a single module.

The IKE control stack 1510 controls the operations of IPsec, including establishing and maintaining VPN session and SAs. The IKE control stack 1510 also includes a MOBIKE extension, which drives the communication in MOBIKE protocol with the VPN server. The IKE control stack provides the necessary authentication key data to IPsec tunnels manager 1550 to authenticating and encrypting payloads. The IKE control stack 1510 also identifies a list of available local endpoint addresses and uses its MOBIKE extension 1515 to communicate those addresses to the VPN server. The IKE control stack 1510 receives a list of endpoint addresses from the VPN server in exchange. The lists of endpoint addresses are provided to the probe manager 1520 for probing those paths. The MOBIKE extension 1515 is also used to communicate with the VPN server to change the IP addresses of the SA when the path analyzer 1530 selects a new path.

The probe manager 1520 is initialized based on the endpoint address information exchanged between the VPN client and the VPN server using MOBIKE. The probe manager 1520 periodically probes all the available paths and populates a path matrix (e.g., the path matrix 1210). The probe manager 1520 is configured with a number of probe packets per path and a probe timeout so as to retrigger the path matrix calculation. The probe manager 1520 then generates the specified number of probe packets per path. As the probe manager 1520 generates the packets to probe the paths and populate the path matrix according to the probes, the path analyzer 1530 identifies the best path among all paths by using the path matrix. The path analyzer 1530 then trigger the MOBIKE message to update the SA.

The path analyzer 1530 drives the selection of endpoints from among the multiple local endpoints configured for the IPsec session. The path analyzer 1530 can also take into consideration the link throughput, run time, traffic load, liveliness, route optimization, RTT, load balancing, and path MTU when determining a new path. The path analyzer 1530 also uses input from the traffic analyzer 1540 to influence path change decision based on traffic characteristics. Once the selection of the best path is made, the IKE MOBIKE extension 1515 in the IKE control stack 1510 is used to switch the VPN session (or SA) to a different endpoint address corresponding to the selected best path so that the IPsec tunnels datapath 1550 may start using the newly selected best path. In some embodiments, the path analyzer 1530 may trigger a path switch based on traffic characteristics (provided by the traffic analyzer 1540) or the QoS requirement.

The IPsec tunnels datapath 1550 performs the operations of the individual VPN tunnels, including encryption and authentication of payload based on the SA, which is maintained and updated by the IKE control stack 1510. For some embodiments, the IPsec tunnels datapath 1550 represents VPN data plane. The IPsec tunnels also provide traffic statistics regarding the VPN tunnels to the traffic analyzer 1540. In some embodiments, if the multiple local endpoints are configured with different uplinks (such as one direct connection and one internet) and have the same reachability, the IPsec tunnels datapath 1550 can trigger the path switch.

When an application uses the gateway to send certain application data in the VPN session, the IPsec tunnels datapath 1550 receives the application data at a routing interface VTI 1560. The application data is packaged as an inner packet 1565. An encryption module 1570 encrypts the inner packet into an IPsec encrypted packet 1575 according to the encryption parameters of the SA 1200 (specified in the SA information provided by the IKE control stack 1510). The encryption module 1570 also append other IPsec related fields based on the SA information (e.g., ESP header, ESP trailer, ESP authentication, new IP, etc.). An encapsulation module 1580 encapsulates the IPsec encrypted packet 1575 with the outer IP that correspond to the selected endpoint address. A data plane routing module 1590 then sends encapsulated packet 1585.

In some embodiments, the gateway steers IPsec VPN traffic through multiple paths that are made available by multiple active uplink interfaces, with load balancing performed over the multiple paths. The gateway also provides failover or redundancy among the multiple uplink interfaces, such that if one of the uplinks is down, traffic will fall back to another uplink without further overhead for synchronization or session renegotiation.

Figure 16:
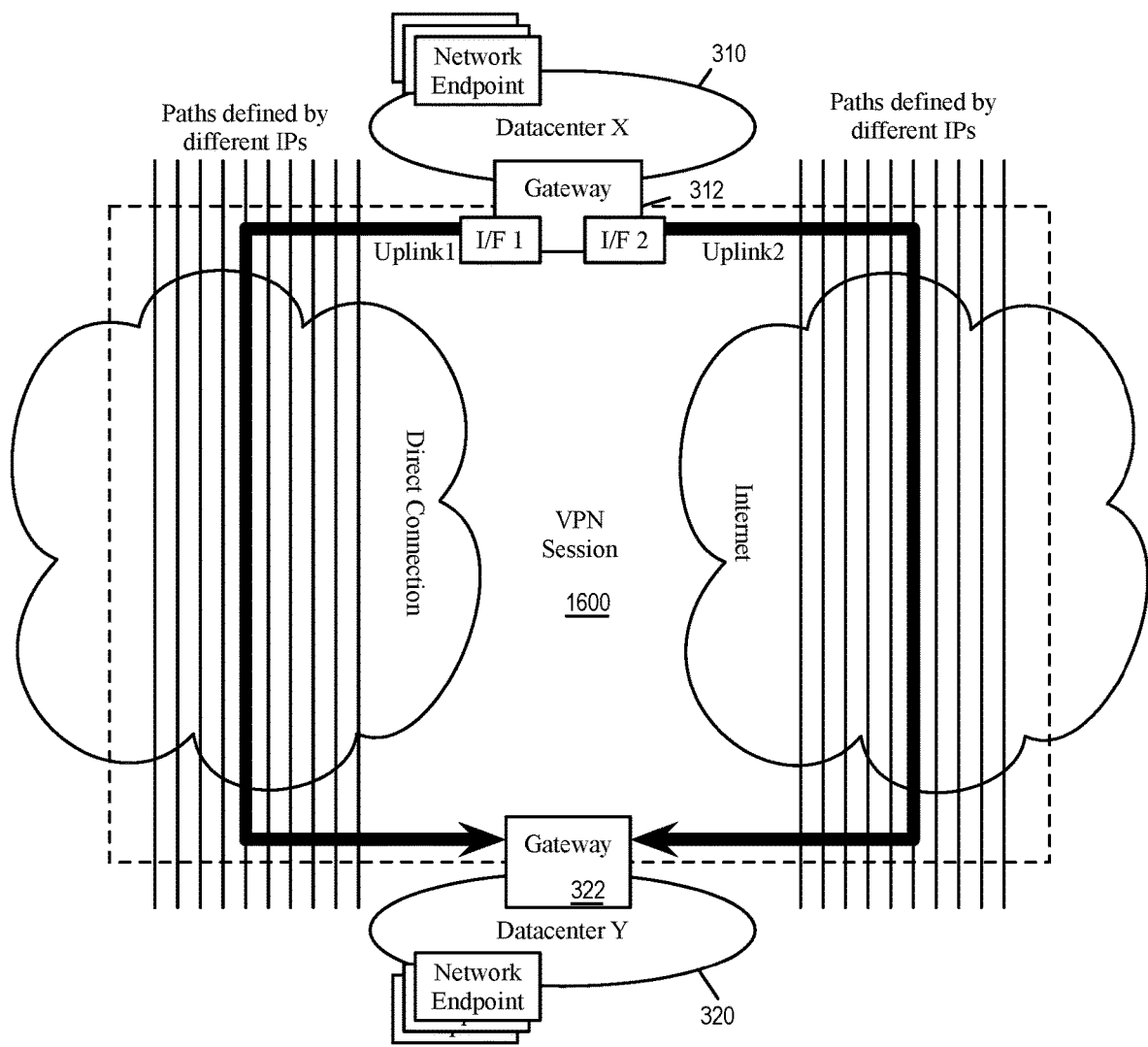
FIG. 16 conceptually illustrates a gateway using multiple active uplink interfaces to send IPsec data to its VPN peer.

FIG. 16 conceptually illustrates a gateway using multiple active uplink interfaces to send IPsec data to its VPN peer. As illustrated, the gateway 312 has established a VPN session 1600 with the gateway 322 for sending IPsec data from the datacenter 310 to the datacenter 320. The gateway 312 has a first interface 1612 to a first uplink 1610 that allows the gateway to access paths through direct connections between the two datacenters. The gateway 322 has a second interface 1622 to a second uplink 1620 that allows the gateway to access paths through the Internet.

Both the interfaces 1612 and 1622 are used to transmit IPsec packets that are encrypted according to a security association SA1. The same SA information is used for the multiple network paths behind different uplink interfaces. For IPsec traffic, the gateway 312 will load balance the VPN traffic on all available or active network paths while keeping the same SA. Thus, an application using the VPN session 1600 may use just one single virtual interface (VTI) for the SA while load balancing across multiple paths in multiple uplinks in the physical network underlay. As such, IKE Control packets can still use a single interface to send packets. However, at data plane, ESP packets can be sent over multiple interfaces. In the example of FIG. 16, there is one direct connect uplink and one Internet uplink. In some embodiments, the network topology may provide multiple direct connect uplinks and/or multiple Internet uplinks. In some embodiments, the network topology may provide a single uplink and the gateway may maintain multiple paths going through single uplink and provide load balancing across those paths.

By keeping a single VPN session across multiple uplinks, there will not be asymmetric routing issue as there is only one single VTI routing interface for the VPN session. Furthermore, the single VTI for the multi-uplink VPN session allows a stateful firewall to function without further changes. In some embodiments in which the software stack of the gateway includes a routing layer and an IPsec layer, the routing layer of the gateway sees only one SA, so load balancing does not choose from among multiple SAs. The load balancing over multiple uplink paths is managed by the IPsec layer, which keeps track of all the network paths over a single VPN tunnel. Load balancing single VPN tunnel traffic over multiple different uplinks or outer IP pairs also improves RSS throughput and performance. Thus, multiple CPU cores can be selected to process different traffic flows. It also utilizes available network bandwidth more efficiently by spreading IPsec traffic over multiple paths and helps overcoming flow control in some cloud network. Maintaining an IPsec setup over a single link can be fairly simple. But as the number of redundant or additional links grows, so does the number of SAs that must be negotiated and maintained. Maintaining multiple simultaneous IPsec connections to ensure reliable and secure communication results in significant networking overhead and managerial challenges. By Keeping a single VPN session across multiple links, only a single IKE SA, a single IPsec SA, and a single VTI need to be maintained thus less signaling and configuration overhead with optimal network control.

In some embodiments, the gateway 312 implements path-aware IPsec by probing path quality dynamics and choosing the best performing paths at run time for a VPN session. The gateway 312 is configured to send the traffic using all available best paths. The chosen best paths are identified as a pool of available best paths for the data plane. The paths chosen for inclusion in the path pool may include paths for both the first uplink interface 1612 and the second interface 1622. The gateway 312 may dynamically add paths to the path pool and/or remove paths from the path pool based on real-time path performance metrics collected from path probing. The gateway 312 in turn performs load balancing by selecting paths from the pool of paths to transmit IPsec packets. In some embodiments, the control to select and switch paths are driven by IPsec VPN without dependency on routing.

Figure 17:
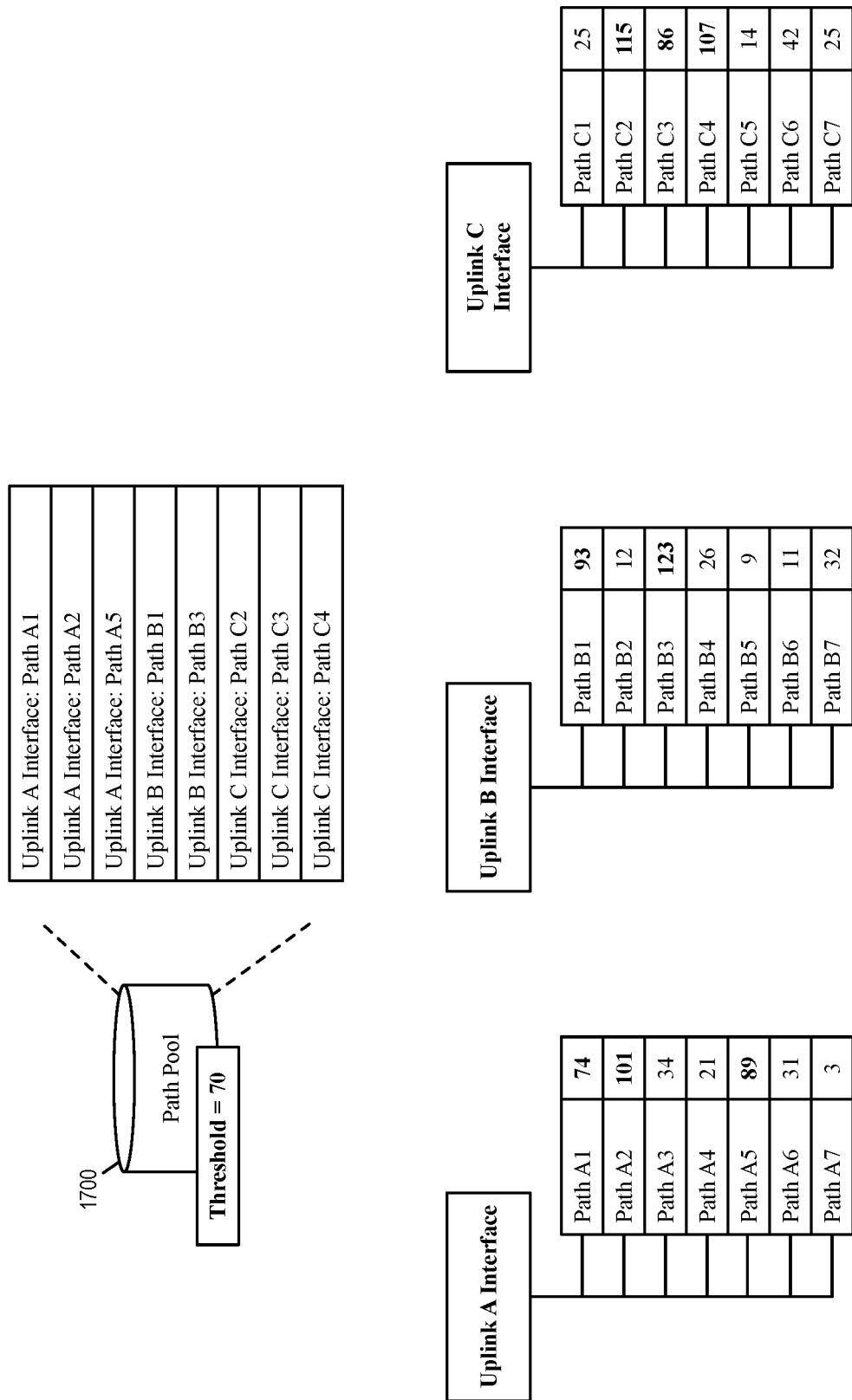
FIG. 17 conceptually illustrates a path pool that include paths of several different uplink interfaces.

FIG. 17 conceptually illustrates a path pool that include paths of several different uplink interfaces. As illustrated, a gateway (e.g., the gateway 312) has at least three uplink interfaces A, B, and C. Each interface allows the gateway to access several paths, specifically, uplink interface A can access paths A1-A7, uplink interface B can access paths B1-B7, and uplink C can access paths C1-C7.

The gateway obtains path quality dynamics of the paths of the three uplink interfaces, e.g., by probing the paths to obtain performance metrics for the paths. In the illustrated example, the performance metric for the path A1 is 74, the performance metric for the path A2 is 101, the performance metric for the path B1 is 93, etc. Based on these performance metrics, the gateway identifies several best performing paths to be part of a path pool 1710. In the example of FIG. 17, the paths A1, A2, A5, B1, B3, C2, C3, and C4 are identified as best performing paths and included in the path pool 1710. In some embodiments, paths having performance metrics above certain threshold value (70 in the example) are identified and included in the path pool 1710. The path pool 1710 therefore provides paths of multiple different uplink interfaces, and the gateway may use the path pool 1710 to load balance the transmission of IPsec packets across different uplink interfaces.

Figure 18:
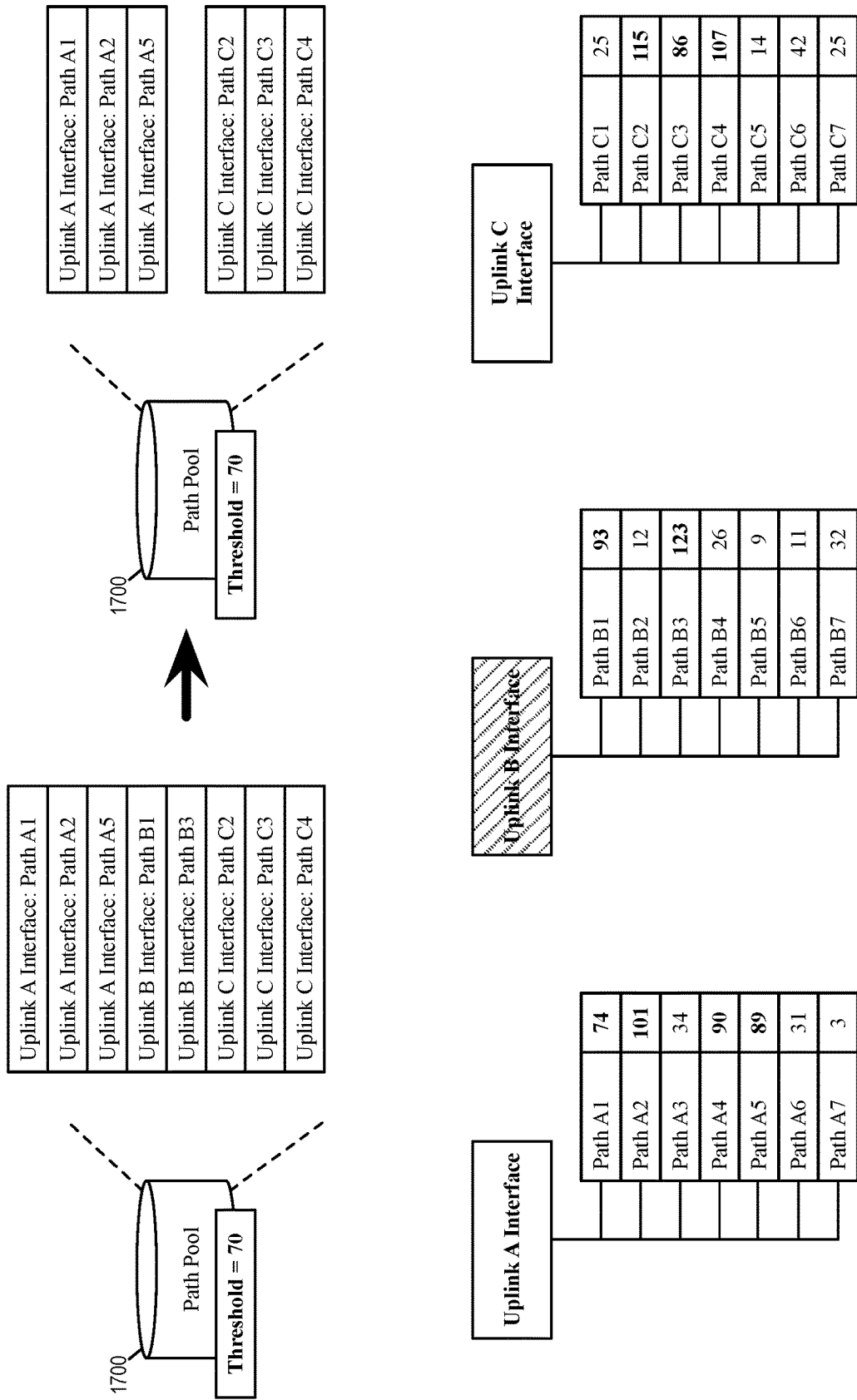
FIG. 18 conceptually illustrates removal of paths from the pool of paths when an uplink interface has failed.

In some embodiments, when one uplink interface is down, the gateway removes all the paths using that interface from the data plane by removing the paths of the failed interface from the path pool 1710. In other words, the paths of the failed interface will not be used for transmission. FIG. 18 conceptually illustrates removal of paths from the pool of paths when an uplink interface has failed. In the example of FIG. 18, the gateway has detected that interface B has failed. The gateway in turn removes all paths that uses interface B from the path pool 1710, specifically paths B1 and B3, and no path using interface B will be used for transmitting IPsec packets. Thus, if any one of the uplink interfaces is down, the VPN session continues by using the next available interface.

Figure 19:
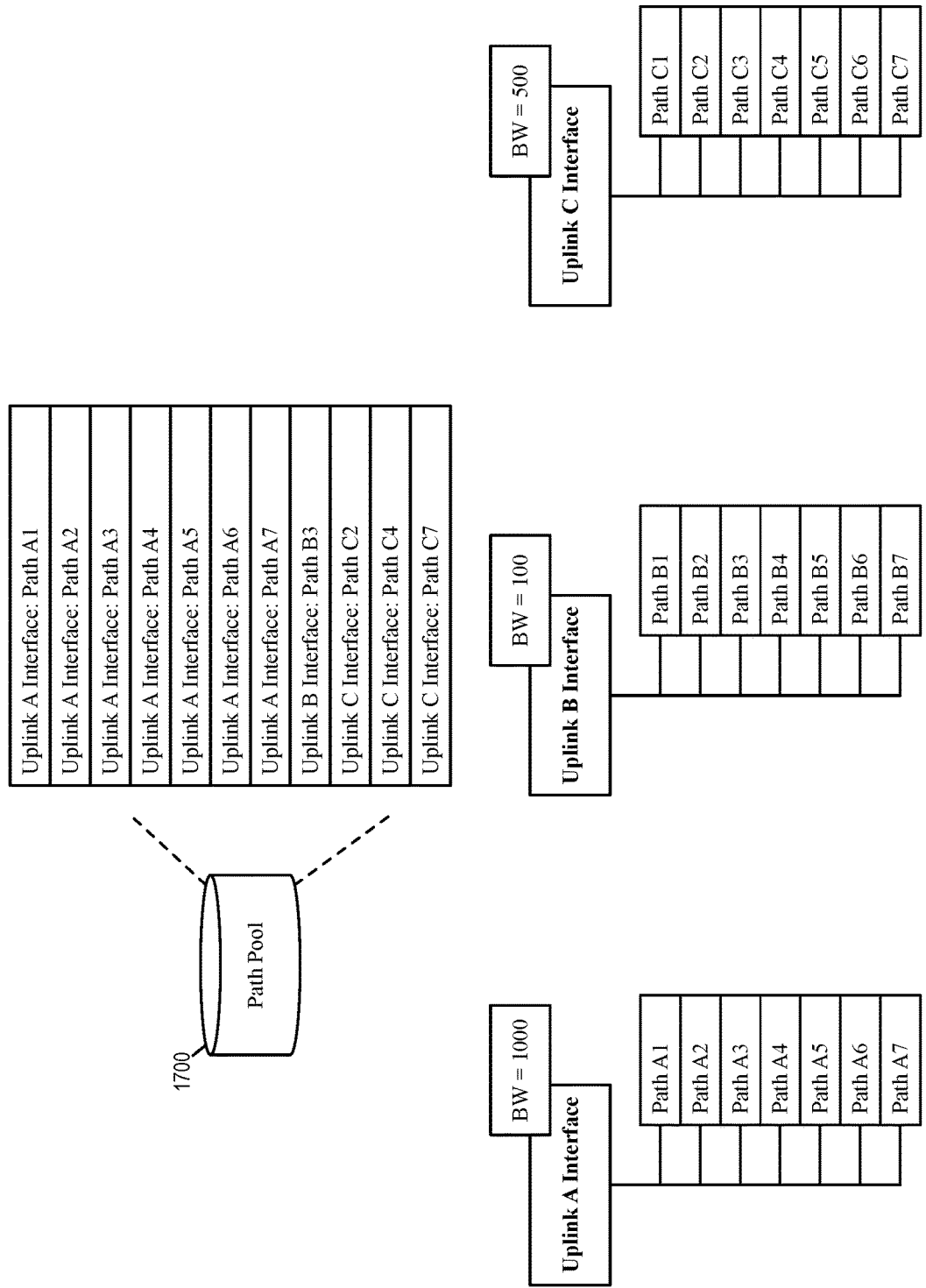
FIG. 19 conceptually illustrates identifying network paths for inclusion in the path pool based on bandwidth.

In some embodiments, path selection for load balancing is weighted based on the bandwidths of the different interfaces. For example, an interface of direct connection may have more network paths in the path pool than an interface for the Internet because direct connections have higher bandwidth than the Internet. FIG. 19 conceptually illustrates identifying network paths for inclusion in the path pool based on bandwidth. The gateway may measure the bandwidths of the different interfaces dynamically or rely on predefined bandwidth parameters. In the example of FIG. 19, the interface for uplink A has bandwidth metric of 1000, the interface for uplink B has bandwidth metric of 100, and the interface for uplink C has bandwidth metric of 500. Based on the bandwidth metrics of the interfaces A, B, and C, the gateway identifies seven network paths from interface A for inclusion in the path pool 1710, only one network path for inclusion from interface B, and three network paths from interface C. In other words, the number of paths included in the path pool 1710 is weighted or determined based on the bandwidths of different interfaces.

Figure 20:
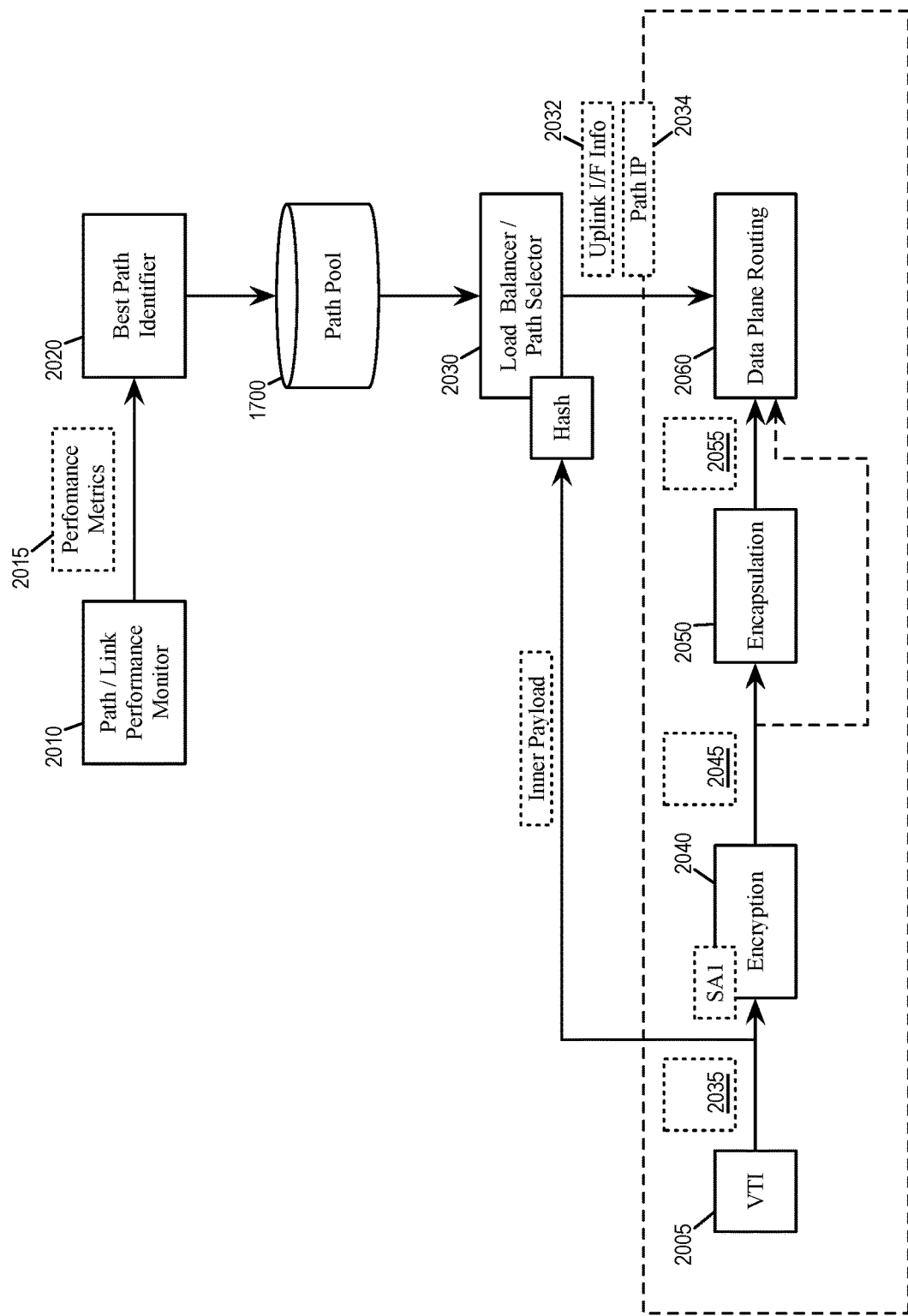
FIG. 20 illustrates the flow of data within the gateway for load balancing across multiple paths in multiple uplinks.

FIG. 20 illustrates the flow of data within the gateway for load balancing across multiple paths in multiple uplinks. The figure shows parts of a computing device that implements the gateway 312. The computing device may be a bare metal device or a host machine running virtualization software, with the gateway being implemented by a virtual machine.

The gateway includes several submodules in VPN control plane, including a path/link performance monitor 2010, a best path identifier 2020. The gateway also includes several submodules in the VPN data plane, including a routing interface (VTI) 2005, a load balancer/path selector 2030, an encryption module 2040, an encapsulation module 2050, and a routing module 2060.

As illustrated, the performance monitor 2010 obtains performance metrics 2015 for individual paths and uplink interfaces, by e.g., sending probe messages to those paths. The performance monitor 2010 may continue monitoring and provide up-to-date performance metrics for the paths and the uplink interfaces. The best path identifier 2020 uses the performance metrics 2015 to identify paths to be included in the path pool 1710. The best path identifier 2020 may favor an interface (e.g., to a direct connection) by including more network paths using the favored interface, or disfavor an interface (e.g., to Internet) by including less network paths using the disfavored interface. When an interface fails, the path identifier 2020 may remove all paths belonging to the failed interface from the path pool 1710 so that the path pool 1710 includes only good performing paths of active uplinks.

The path selector 2030 in turn selects paths from the path pool 1710 to send IPsec packets to the VPN peer. The path selector 2030 performs path selection based on a hash of specific fields of outgoing packets in order to achieve load balancing between the active paths. In some embodiments, the fields of outgoing packets being hashed for path selection may include inner IP address (e.g., 222) and/or inner port information (e.g., 224) of the inner packet 220 prior to encryption.

In some embodiments, loopback IPs can be used to support more network paths thereby to increase entropy in load balancing. The gateway executing the VPN session may listen on multiple loopback IPs rather than directly on uplinks. More entropy/network path can also be considered with multiple UDP ports per uplink paths.

When an application uses the gateway to send certain application data in the VPN session 1600, the application data is received at the routing interface VTI 2005 for the security association SA1. The VTI 2005 is the single VTI for the VPN session 1600. The application data is packaged as the inner packet 2035 (e.g., the inner packet 220) of an IPsec packet with inner IP and port information. The encryption module 2040 encrypts the inner packet into an IPsec encrypted packet 2045 according to the encryption parameters of the security association SA1 and append other IPsec related fields based on SA1. (e.g., ESP header, ESP trailer, ESP authentication, new IP, etc.)

In some embodiments, when NAT-T is enabled, an encapsulation module 2050 encapsulates the IPsec encrypted packet 2045 as UDP encapsulated packet 2055 with a UDP encapsulation header (e.g., UDP header 242), which may include UDP port information. In some embodiments, when NAT-T is not enabled, the IPsec encrypted inner packet will not be UDP encapsulated and will not include UDP port information.

The data plane routing module 2060 then sends the IPsec encrypted packet 2045 (or the UDP encapsulated packet 2055) using the path selected by the load balancer 2030. The load balancer 2030 indicates to the data plane routing module 2060 information regarding the selected path, including uplink interface information 2032 and IP addresses 2034 of the selected path. The uplink interface information 2032 may include parameters for accessing a particular type of physical medium, a next hop IP address, etc., for the uplink or the selected path. When the selected path is of a first uplink, the data plane routing module 2060 uses the interface of the first uplink to transmit the IPsec packet; and when the selected path is of a second uplink, the data plane routing module 2060 uses the interface of the second uplink.

Figure 21:
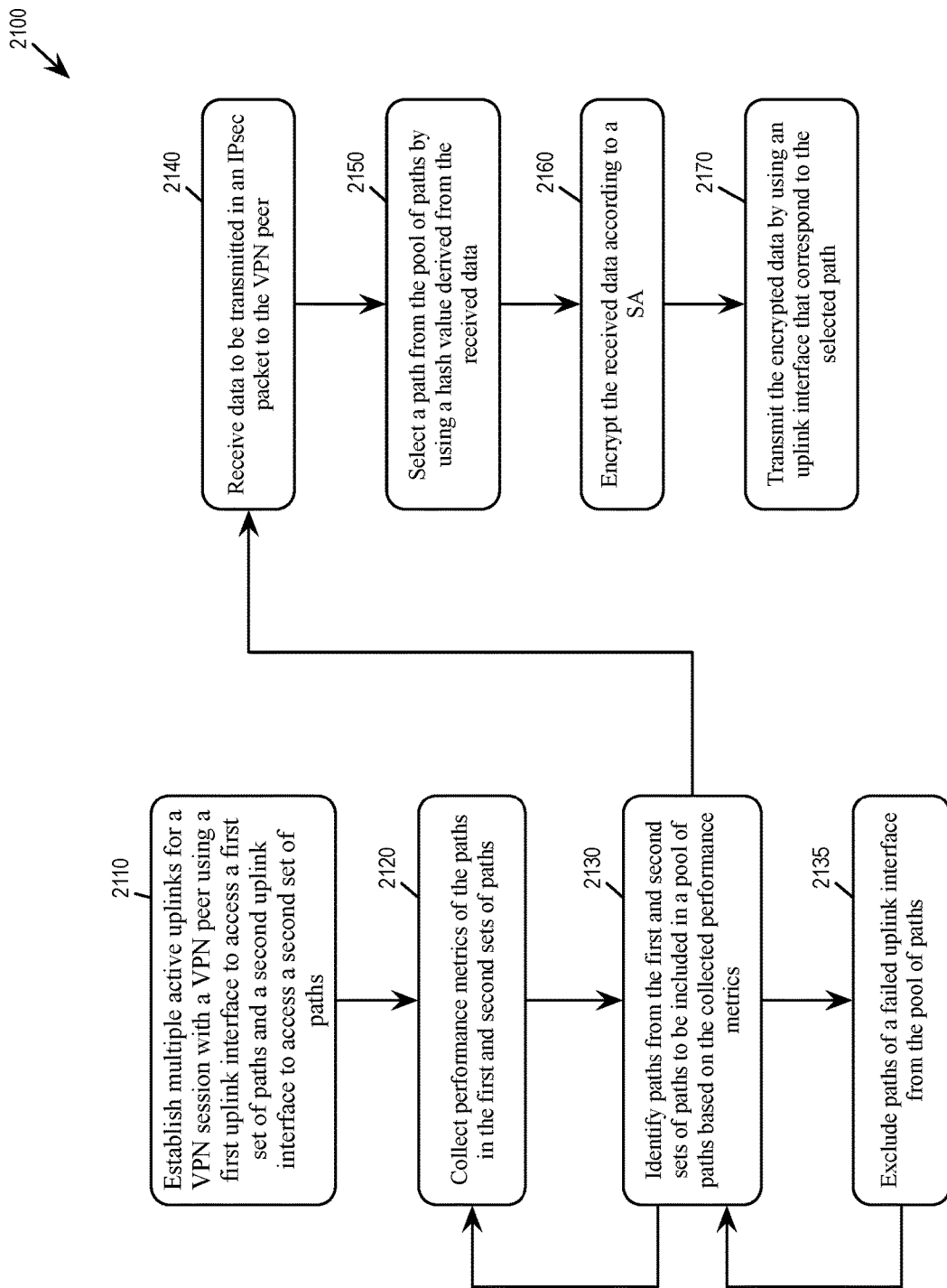
FIG. 21 conceptually illustrates a process for performing load balancing when sending IPsec packets across multiple active uplinks.

For some embodiments, FIG. 21 conceptually illustrates a process 2100 for performing load balancing when sending IPsec packets across multiple active uplinks. In some embodiments, a gateway of a first site performs the process 2100 when transmitting IPsec data to a second site. In some embodiments, one or more processing units (e.g., processor) of a computing device implementing the gateway 312 perform the process 2100 by executing instructions stored in a computer readable medium.

The gateway establishes (at 2110) a virtual private network (VPN) session with a VPN peer using multiple active uplinks having a first uplink interface to access a first set of paths and a second uplink interface to access a second set of paths. In some embodiments, a single VPN session with a single IKE SA and IPSec SA is used across multiple active uplink paths. In some embodiments, each path of the first set of paths is through direct direction and each path of the second set of paths is through the Internet.

The gateway collects (at 2120) performance metrics of paths in the first and second sets of paths. The gateway identifies (at 2130) paths from the first and second sets of paths to be included in a pool of paths based on the collected performance metrics. In some embodiments, paths in the pool of paths are identified based on bandwidths of the first and second uplink interfaces such that the pool of paths has more paths belonging a higher bandwidth uplink interface than paths belonging to lower bandwidth uplink interface. For example, the pool of paths may include more paths through the direct connection than paths through the Internet because the uplink interface to the direct connection has higher bandwidth than the uplink interface to the Internet. The process may return to 2120 to continue collecting performance metrics of paths and update the pool of paths. In some embodiments, when an uplink interface fails, the gateway excludes (at 2135) paths of the failed uplink interface from the pool of paths.

The gateway receives (at 2140) data to be transmitted in an IPsec packet to the VPN peer. In some embodiments, the VPN session uses one single virtual tunnel interface (VTI) for the SA to receive data for the first and second uplink interfaces. The gateway selects (at 2150) a path from the pool of paths by using a hash value derived from the received data. In some embodiments, the hash value is further derived from source port, destination port and protocol identifier of an inner payload. In some embodiments, the hash value may also be derived from source IP, destination IP, source port, destination port and protocol identifier of the inner payload. In some embodiments, NAT-T is not enabled, and the IPsec packet is not encapsulated by UDP.

The gateway encrypts (at 2160) the received data according to the SA. The gateway transmits (at 2170) the encrypted data by using an uplink interface that correspond to the selected path. For example, when the selected path is accessible by the first uplink interface, the gateway transmits the encrypted data as an IPsec packet using the first uplink interface; when the selected path is accessible by the second interface, the gateway transmits the encrypted data as an IPsec packet using the second uplink interface.

Receive Side Scaling (RSS) refers to distribution of network workload across multiple CPUs or processing cores. When RSS is enabled, data processing for a particular TCP connection is shared across multiple processors or processor cores. A hashing function is used to compute a hash value over a predetermined area or fields within the received network data. For an ESP packet, an RSS scheme for IPsec processing may hash fields such as source IP, destination IP, and SPI for determining which CPU to use for encryption or decryption, since these fields of the ESP packet are not encrypted.

As mentioned, in some embodiments, ESP packets are encapsulated with UDP header, and the UDP port identifiers in the UDP encapsulation are used to indicate path selection when multiple paths are available for sending IPsec data. In some embodiments, different traffic flows of ESP tunnel are given different UDP port identifiers, and the hash function for selecting a CPU or processing core considers the UDP port identifiers for better load balancing. In other words, when UDP port is changed to indicate a different network traffic flow and/or a different path, a different CPU or processing core may be selected. In some embodiments, a tuple of port numbers, source IP, destination IP, and SPI are used as flow identifiers, and the hash of the tuple of flow identifiers is used to select a CPU or processing core for IPsec processing.

Figure 22:
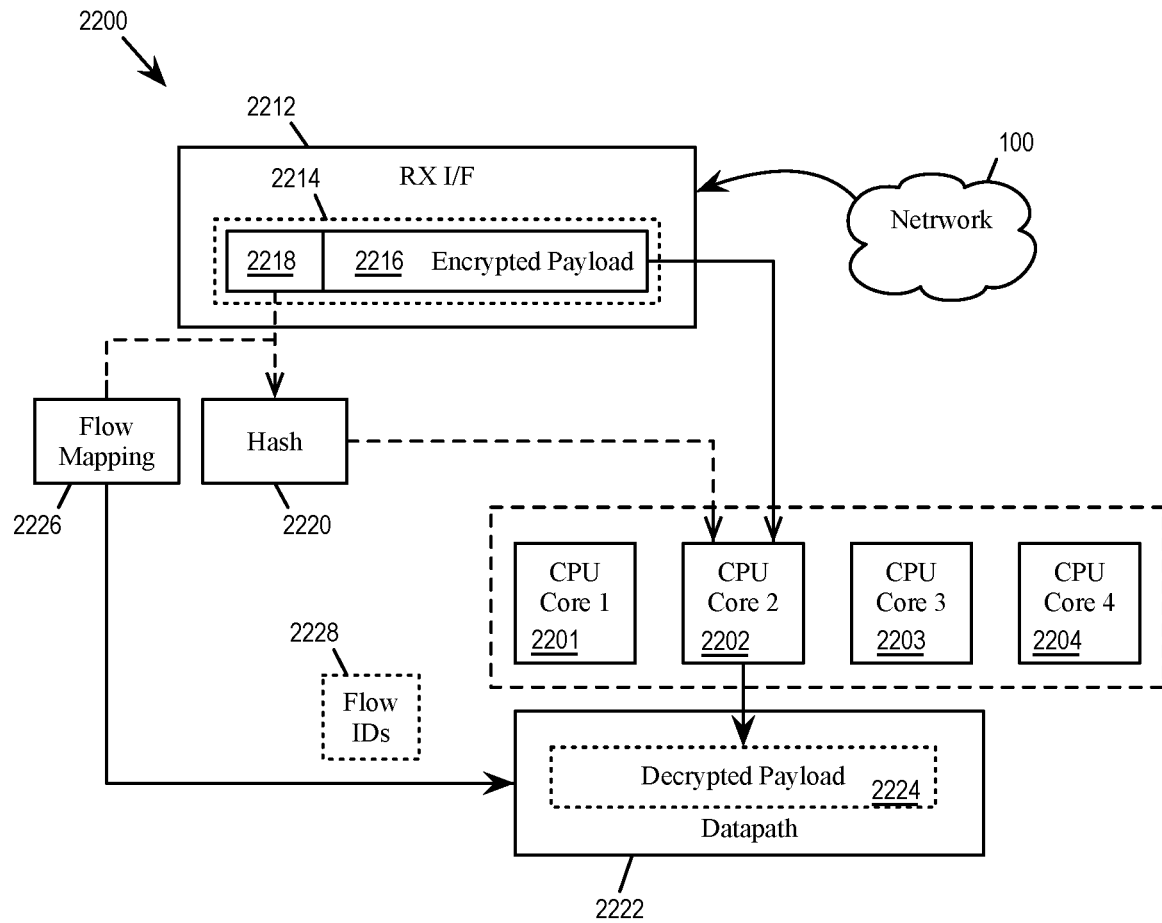
FIG. 22 conceptually illustrates an RSS scheme for assigning IPsec processing to processing cores.

FIG. 22 conceptually illustrates an RSS scheme for assigning IPsec processing to processing cores. The figures show parts of a computing device 2200 that implements the RSS scheme. The computing device 2200 may be a physical computing device, bare metal device, or a host machine running virtualization software. The computing device 2200 may also implement a gateway or edge appliance of a datacenter. The computing device has at least four CPUs or processing cores 2201-2204 that can perform computation independently.

As illustrated, the computing device 2200 receiving IPsec packets is using RSS to distribute authentication and decryption workload among multiple CPUs or processing cores. As illustrated, the computing device 2200 at a RX interface 2212 receives an IPsec packet 2214 from the network 100 for a VPN tunnel. The IPsec packet 2214 has encrypted payload 2216 as well as unencrypted header fields 2218 such as UDP port identifiers, source and destination IP addresses, and SPI. A hash function 2220 is applied to some of the unencrypted header fields, and the result of the hash is used to select one of the processing cores 2201-2204 (2202 in this example). The selected processing core decrypts the payload 2216 according to a SA into decrypted payload 2224. The decrypted data is provided to the data path 2222 for further processing, based on flow identifiers that are mapped from the unencrypted header fields 2218. The data path 2222 maybe other processing elements of the computing device 2200, or processing elements of another computing device that can be reached by the network 100. A flow mapping function 2226 maps the tuple of UDP port identifiers, source and destination IP addresses, and SPI in the unencrypted header fields 2218 into a flow identifier 2228 for the data path 2222, so the decrypted payload 2224 can be properly aggregated with data of the same flow.

Figure 23:
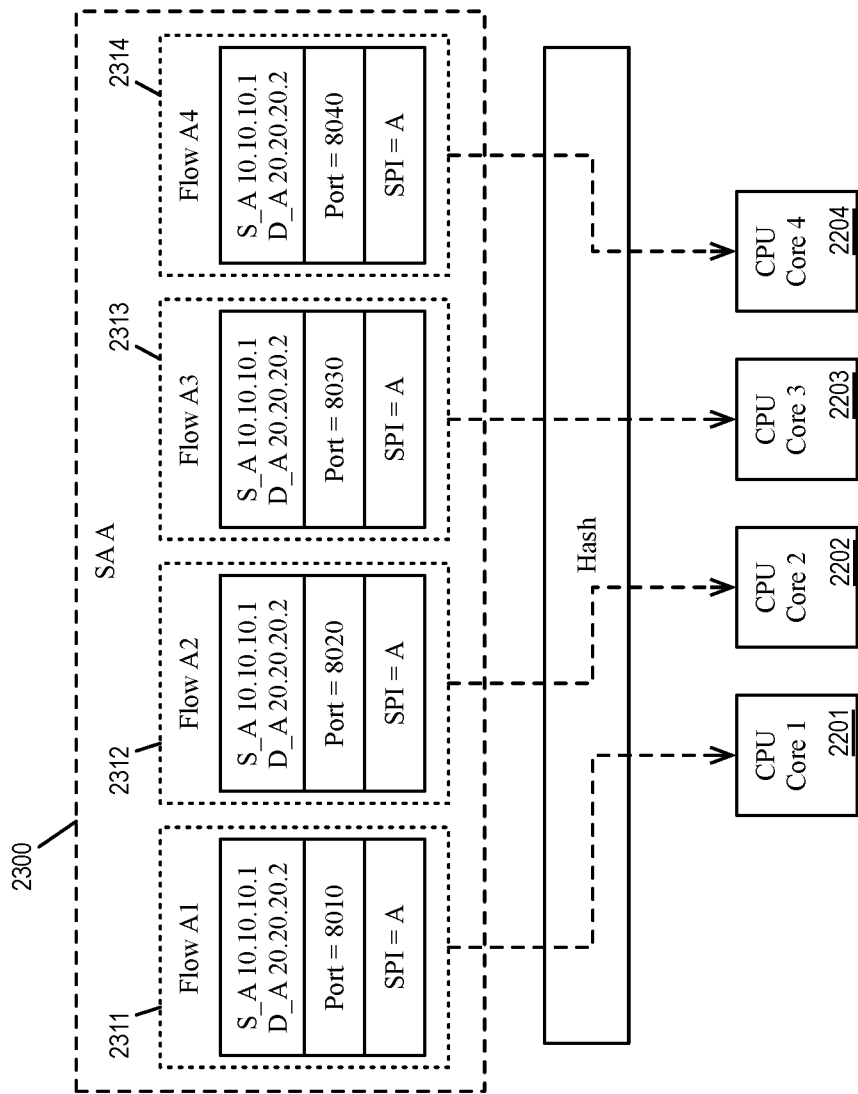
FIG. 23 conceptually illustrates different flows of a same SA being processed by different processing cores.

In some embodiments, different traffic flows of single SA are assigned different UDP port identifiers so the different flows can be processed by different cores. These different flows may have the same source and destination IP addresses and SPI. FIG. 23 conceptually illustrates different flows of a same SA being processed by different processing cores. The figure conceptually illustrates a SA 2300 (SA A) that has been established for a VPN session by the computing device 2200 as a VPN server or VPN client. The VPN session has at least four flows 2311-2314 that are encrypted according to the SA 2300. The packets of the four flows have the same source and destination IP addresses (10.10.10.1 and 20.20.20.2) and the same SPI. However, the four flows 2311-2314 have different UDP port identifiers, which are hashed to different processing cores. The packets of these flows are encrypted or decrypted at these cores according to the SA 2300.

Figure 24:
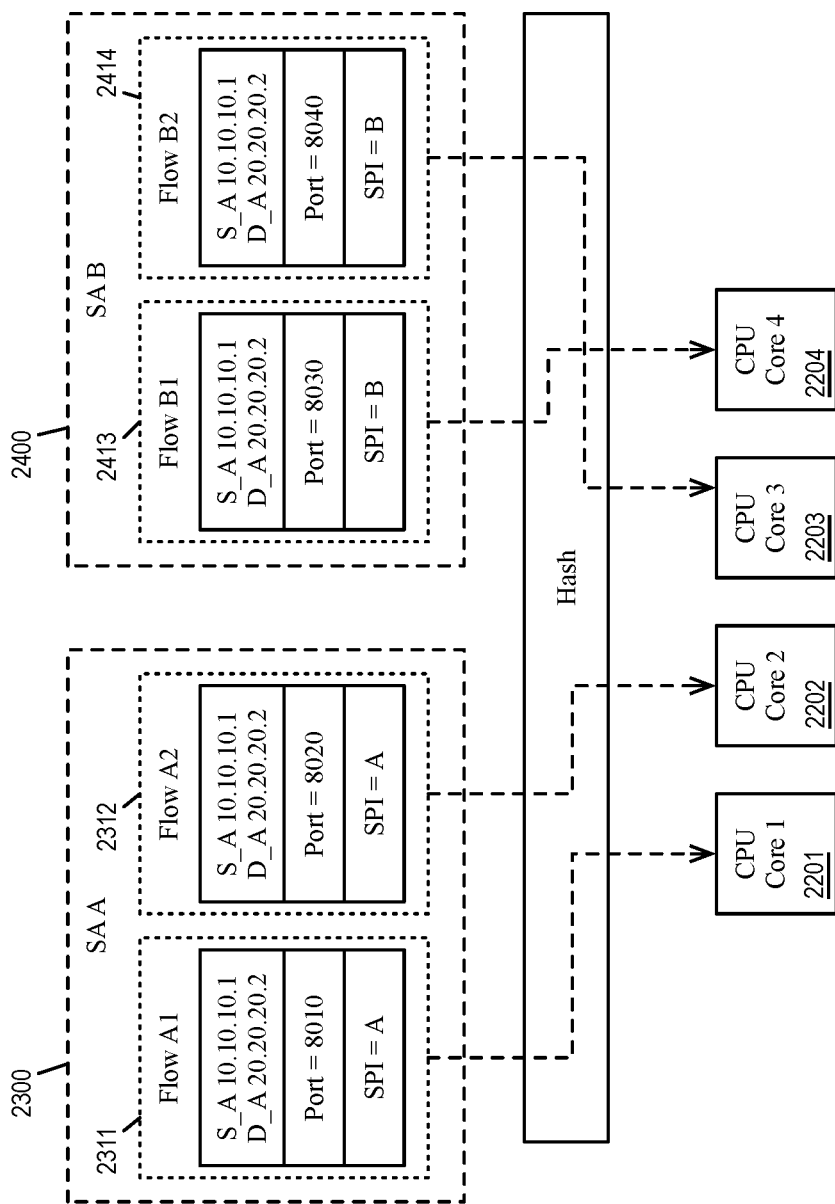
FIG. 24 conceptually illustrates flows of different SAs being processed by different processing cores.

In some embodiments, a computing device may encrypt or decrypt flows of IPsec packets belonging to different SAs. FIG. 24 conceptually illustrates flows of different SAs being processed by different processing cores. In the example, the SA 2300 (SA A) and a second SA 2400 (SA B) have been established for a VPN session by the computing device 2200 as a VPN server or VPN client. The VPN session has at least two flows 2311-2312 that are encrypted in SA 2300, and at least two flows 2413-2414 that are encrypted in SA 2400. The flows 2311 and 2312 have port identifiers 8010 and 8020 that are respectively hashed to processing cores 2201 and 2202, and the flows 2413 and 2414 have port identifiers 8030 and 8040 that are respectively hashed to processing cores 2203 and 2204.

Figure 25:
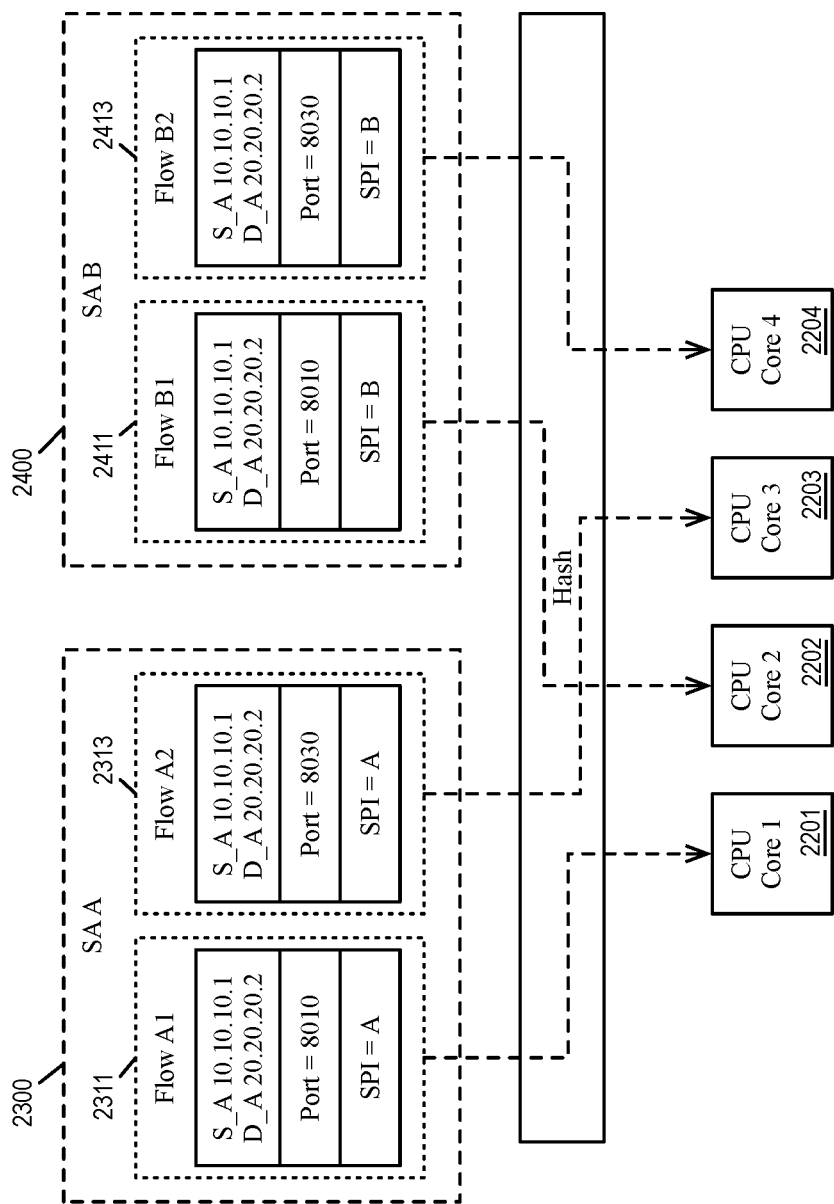
FIG. 25 conceptually illustrates flows of different SAs have the same port identifier being processed by different processing cores.

Flows of different SAs may have the same port number (e.g., because path selection selected the same path). In some embodiments, flows of different SAs are assigned different SPIs (since SPI uniquely identifies a SA), so the flows of different SAs can be hashed to different processing cores based on the different SPIs, even if they have the same port number. FIG. 25 conceptually illustrates flows of different SAs that have the same port identifier being processed by different processing cores.

In the example, at least two flows 2311-2313 are encrypted in the SA 2300, and at least two flows 2411 and 2413 are encrypted in the SA 2400. The flows 2311 and 2313 have port identifiers (8010 and 8030) that are the same as the port identifiers of the flows 2411 and 2413 (8010 and 8030). However, since the flows of SA 2300 have a different SPI than that of SA 2400 (SPI=A vs. SPI=B), flows of different SAs, despite having the same port number (e.g., because path selection selected the same path) and the same IP addresses, may nevertheless be assigned to different processing cores for encryption or decryption.

Figure 26:
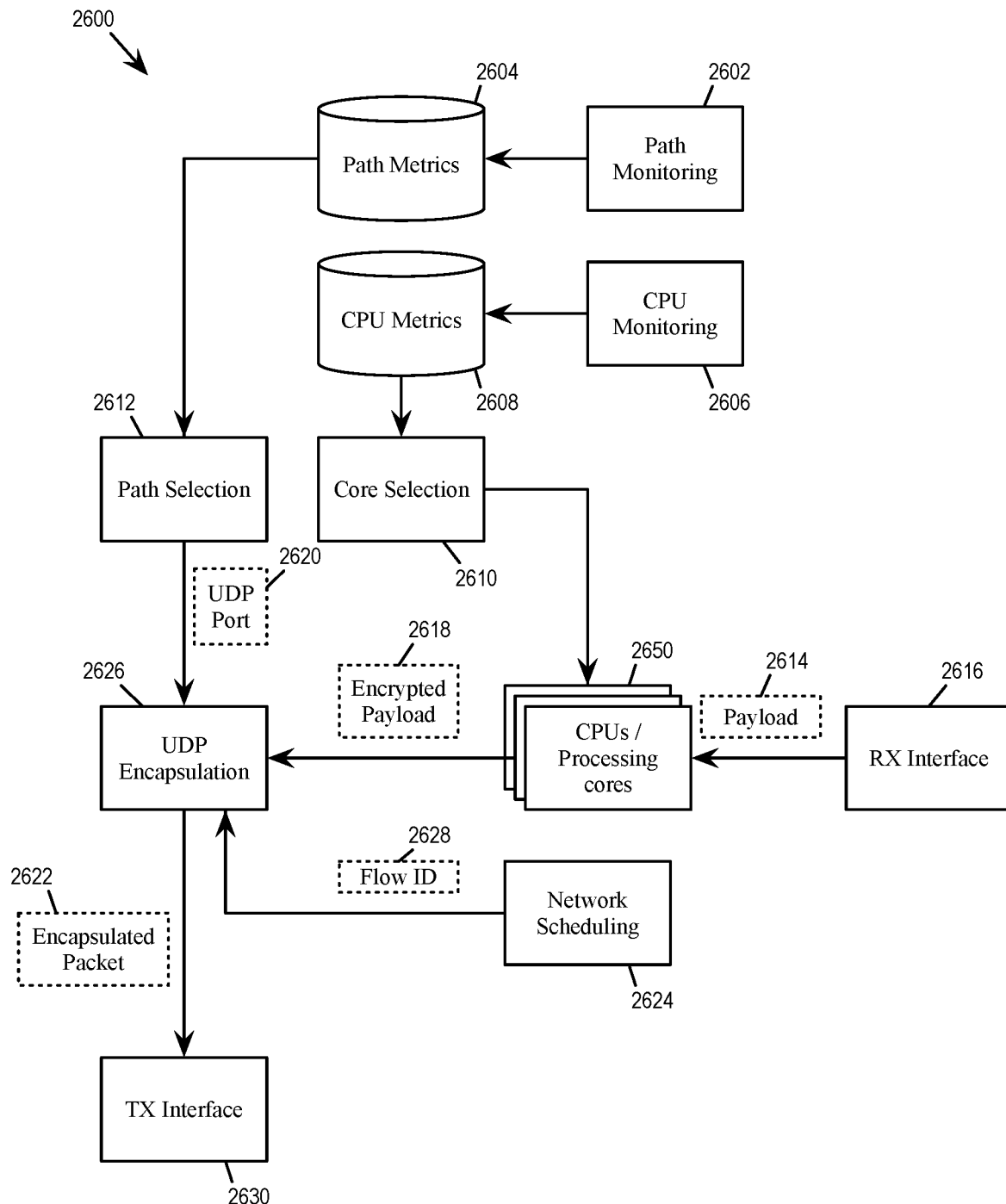
FIG. 26 illustrates the generation of IPsec packets in which identifiers such as port, IP addresses, and SPIs are set for load balancing among multiple CPUs or processing cores.

FIG. 26 illustrates the generation of IPsec packets in which identifiers such as port, IP addresses, and SPIs are set for load balancing among multiple CPUs or processing cores. The figure illustrates data flow between functional modules of a computing device 2600. The computing device 2600 may be a bare metal device or a host machine running virtualization software. The computing device may also implement a gateway or edge appliance of a datacenter, such as the gateway 312. The computing device has multiple CPUs or processing cores 2650 that can perform computation independently.

In the computing device 2600, a path monitoring module 2602 generates path metrics 2604 by probing different paths (as described by reference to FIG. 4 above). A CPU monitoring module 2606 monitors the CPUs 2600 to generates CPU metrics 2608, which may include current and predicted performance of the CPUs 2600. A core selection module 2610 uses the generated CPU metrics 2608 to select one of the processing cores in the CPUs 2600. A path selection module 2612 uses the generated path metrics 2604 to select a path and indicates the selected path as a UDP port number 2620. The CPUs 2600 receives payload 2614 from receive (RX) interface 2616 and uses the selected processing core to perform authentication and encryption to generate encrypted payload 2618. A UDP encapsulation module 2626 encapsulates the encrypted payload 2618 to create an encapsulated packet 2622, which includes a UDP header that includes the UDP port number 2620. A network scheduling module 2624 provides additional flow identifiers 2628 (e.g., IP addresses and SPI) to the UDP encapsulation module 2626 to be included in the packet 2622. A transmission interface 2630 then transmits the encapsulated packet 2622.

In some embodiments, the path monitoring module 2602, the CPU monitoring module 2606, the core selection module 2610, the path selection module 2612, the RX interface 2616, the network scheduling module 2624, the UDP encapsulation module 2626, and the TX interface 2630 are modules of software instructions being executed by one or more processing units (e.g., a processor) of a computing device. In some embodiments, the modules 2602, 2606, 2610, 2612, 2616, 2624, 2626, and 2630 are modules of hardware circuits implemented by one or more integrated circuits (ICs) of an electronic apparatus. Though the modules 2602, 2606, 2610, 2612, 2616, 2624, 2626, and 2630 are illustrated as being separate modules, some of the modules can be combined into a single module.

Figure 27:
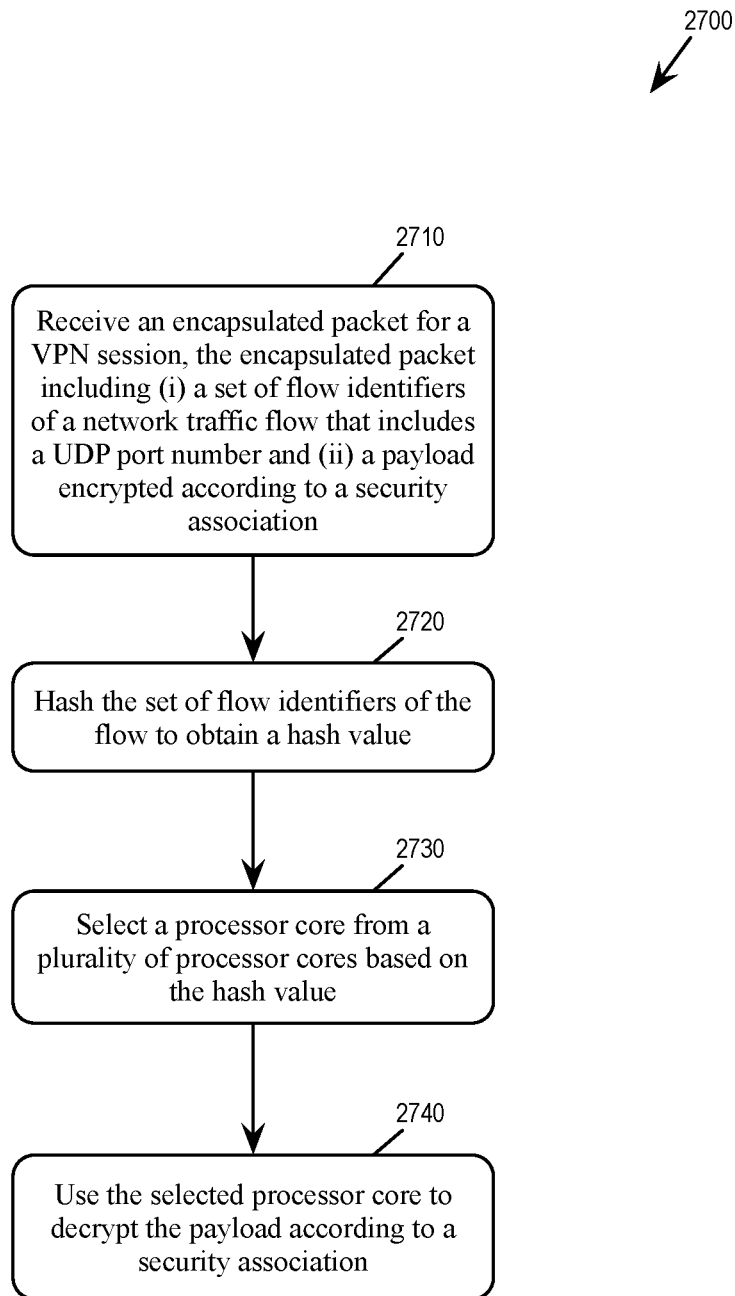
FIG. 27 illustrates a process for using flow identifiers to distribute IPsec workload among multiple processor cores.

For some embodiments, FIG. 27 conceptually illustrates a process 2700 for using flow identifiers to distribute IPsec workload among multiple processor cores. In some embodiments, a gateway of a first site performs the process 2700 when receiving IPsec data from a second site. In some embodiments, one or more processing units (e.g., processor) of a computing device implementing the gateway 312 perform the process 2700 by executing instructions stored in a computer readable medium.

The process 2700 begins when the gateway receives (at 2710) an encapsulated packet for a VPN session. The encapsulated packet includes (i) a set of flow identifiers of a network traffic flow that includes a UDP port number and (ii) a payload of encrypted according to a security association. The packet is encapsulated by a UDP header that includes the UDP port number. In some embodiments, the UDP port number is determined according to a random number. In some embodiments, the UDP port number is a NAT translated port when NAT-T is detected between VPN peers.

In some embodiments, the UDP port number corresponds to a path that is selected to send the packet from a VPN client to a VPN server, the path selected from multiple paths based on performance metrics of the paths that are computed from dynamic monitoring of the paths (e.g., by probing). In some embodiments, the UDP port number is adjusted according to congestion state information associated with different paths.

The gateway hashes (at 2720) the set of flow identifiers of the network traffic flow to obtain a hash value. The gateway selects (at 2730) a processor core from multiple processor cores based on the hash value. The gateway uses (at 2740) the selected processor core to decrypt the payload according to the security association (SA).

Different flows of a same SA may be processed by different processing cores. Specifically, a first set of flow identifiers of a first flow including a first UDP port number may be hashed to select a first processor core for decrypting the first packet, and a second set of flow identifiers of a second flow including a second UDP port number may be hashed to select a second, different processor core for decrypting the second packet. Flows of different SAs may also be processed by different processing cores, even when the flows have the same IP addresses and UDP ports. Specifically, a first set of flow identifiers of a first flow including a first SPI may be hashed to select a first processor core for decrypting the first packet, and a second set of flow identifiers of a second flow including a second, different SPI may be hashed to select a second, different processor core for decrypting the second packet.

Since the data of IPsec packets is encrypted, it is difficult to enforce specific QoS in an intermediate router. Outer IPsec headers (e.g., tunnel source IP and destination IP) provides limited visibility into network paths. However, in modern cloud datacenters, connectivity based on multiple network paths are often available for reaching the VPN peer, and the different available paths may have different QoS characteristics for sending encrypted data packets. The QoS of an application is dependent upon the network path that the application uses to send IPsec data to its peer. With the encrypted ESP payload, even if there are multiple network paths (ECMP routes) available, VPN traffic always take one of the paths based on outer ESP tunnel addresses and will end up in having the QoS specific to that particular network path for all the encrypted payload.

Some embodiments of the disclosure provide a mechanism for leveraging different QoS characteristics of the different paths in a multipath VPN environment. Specifically, an IPsec or VPN gateway classifies packets and paths based on bandwidth requirement of the packets and the network characteristics (e.g., jitter, delay, packet loss) of the paths. The VPN gateway have visibility over the network characteristics of multiple network paths by e.g., probing the paths to collect a set of performance metrics for each path. When applying or provisioning QoS, the IPsec gateway makes use of the network characteristics of the multiple paths and chooses a specific path for each packet based on the required QoS of the packet.

Figure 28:
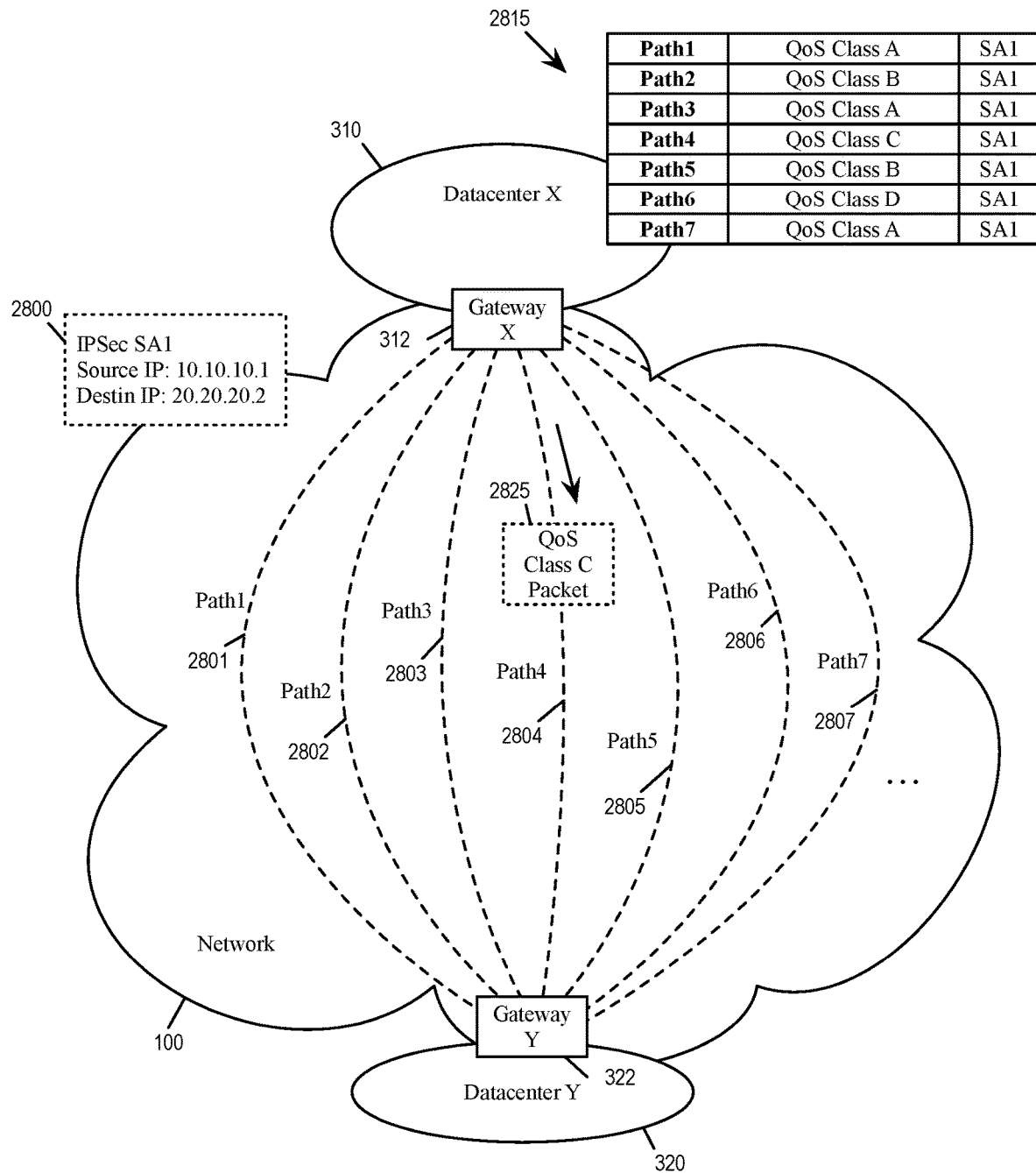
FIG. 28 conceptually a gateway that chooses a specific path for each packet based on the required QoS of the packet.

FIG. 28 conceptually illustrates a gateway that chooses a specific path for each packet based on the required QoS of the packet. The gateway classifies the data to be transmitted according to their QoS requirement. The gateway also classifies each path based on its network characteristics, specifically in term of QoS level the path can support.

As illustrated, the gateway 312 of the datacenter 310 is in a VPN session to send IPsec data to the gateway 322 of the data center 320. There are several paths that the gateway 312 can use to reach the gateway 322 for the VPN session, including paths 2801-2806 (labeled "Path 1" through "Path 6"). The gateway 312 uses these paths to send packets that are encrypted according to a security association 2800 (SA1).

The gateway collects performance metrics and other status regarding these paths by e.g., periodically sending probe messages through the different paths and obtain responses for the probe messages. The performance metric of a path may include connectivity, latency, drop rate, and jitter of the path. In some embodiments, the different paths are identified or defined by their source and/or destination IP addresses. In some embodiments, the different paths are identifiable by different port numbers (e.g., UDP port numbers.) Based on the performance metrics collected from probing the paths, the gateway classifies each path in terms of the level of QoS that the path can support. For example, a path having long latency, high drop rate, and low connectivity may be classified to support only network traffic having low QoS requirement, while a path having small latency and low drop rate may be classified to support network traffic having high QoS requirement. The gateway 312 uses network characteristics or performance metrics of the different paths to generate a path classification table 2815, in which each path is assigned a QoS class. According to the table 2815, "path1", "path3", and "path7" (paths 2801, 2803, 2807) are classified as QoS class A, "path2" and "path5" (paths 2802 and 2805) are classified as QoS class B, "path4" (path 2804) is assigned QoS class C, "path6" (path 2806) is assigned QoS class D, etc. In some embodiments, the gateway may assign two or more paths as same QoS class or category. In some embodiments, the gateway assigns each path a unique QoS class according to the path's specific network characteristics.

The gateway 312 also classifies packets based on their QoS requirements. Data for an application may have a set of specific quality of service requirement, such as guaranteed latency or guaranteed bandwidth. Such a requirement may be expressed as a differentiated services code point (DSCP) for the application or for data packets generated by the application. Data packets generated by the application have differentiated services code point (DSCP) values that are typically honored by intermediate routers between the VPN peers. DSCP is a means of classifying and managing network traffic and of providing QoS in Layer 3 IP networks. It uses the 6-bit Differentiated Services (DS) field in the IP header for the purpose of packet classification. In some embodiments, the gateway may determine the QoS requirement of a packet based on the type or priority level of the application that generates the packet. The gateway may also determine the QoS requirement of a packet based on the account information of a user that (runs the application that) generated the payload. In some embodiments, the QoS class of the packet is determined based on at least one of DSCP field, application type, and inner port. The gateway in turn selects a path that can meet the QoS requirement of the packet, e.g., having an assigned QoS class that matches the QoS class of the packet. In the example, a packet 2825 is classified as QoS class C based on the packet's QoS requirement. The gateway 312 correspondingly selects the path 2804 ("path4"), which is assigned QoS class C according to the path classification table 2815.

Figure 29:
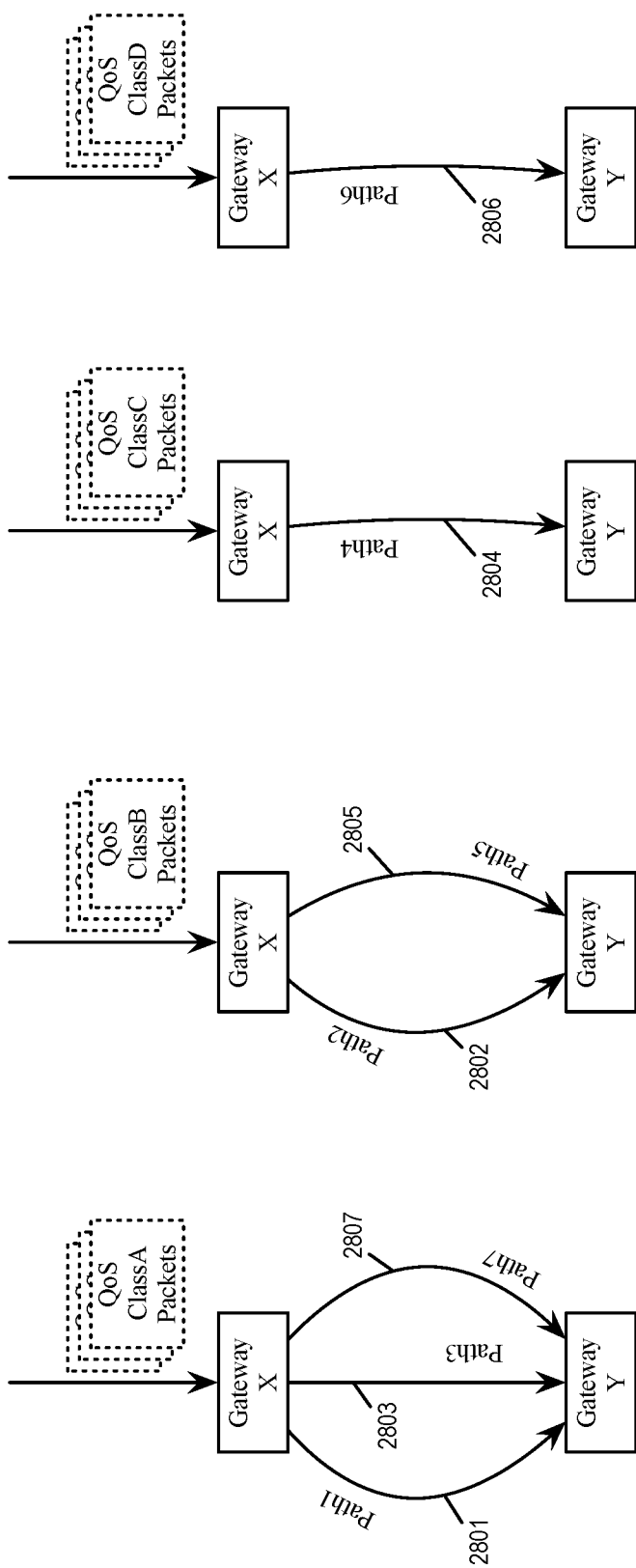
FIG. 29 shows load balancing among active paths of a same QoS class.

As mentioned, the gateway 312 uses multiple active paths for sending IPsec packets, and that the load balancing is performed across multiple active paths. In some embodiments, the gateway 312 performs load balancing for active paths of the same QoS class. FIG. 29 shows load balancing among active paths of a same QoS class. As illustrated, for QoS class A packets, the gateway 312 performs load balancing among active paths of QoS class A (paths 2801, 2803, and 2807); for QoS class B packets, the gateway performs load balancing between active paths of QoS class B (paths 2802 and 2805). For QoS class C packets, the gateway uses the only QoS class C path (path 2804). For QoS class D packets, the gateway uses the only active QoS class D path (path 2806). In some embodiments, the gateway may perform dynamic path addition based on the required QoS. For example, if the gateway determines that paths 2801, 2803, and 2807 are not performing well enough to sustain QoS class A, the gateway may dynamically add one or more paths to QoS class A load balancing so the VPN session may meet the QoS class A requirement.

In the example of FIG. 28, the different paths used to reach the VPN server are used by the same SA 2800 (SA1). In some embodiments, the gateway as a VPN client may establish multiple IPsec SAs with a VPN server. Each SA is for handling a specific QoS class. In some embodiments, each SA or QoS class is linked with a specific network path, such that there is a one-on-one mapping among SA, QoS class, and network path to give a particular QoS.

Figure 30:
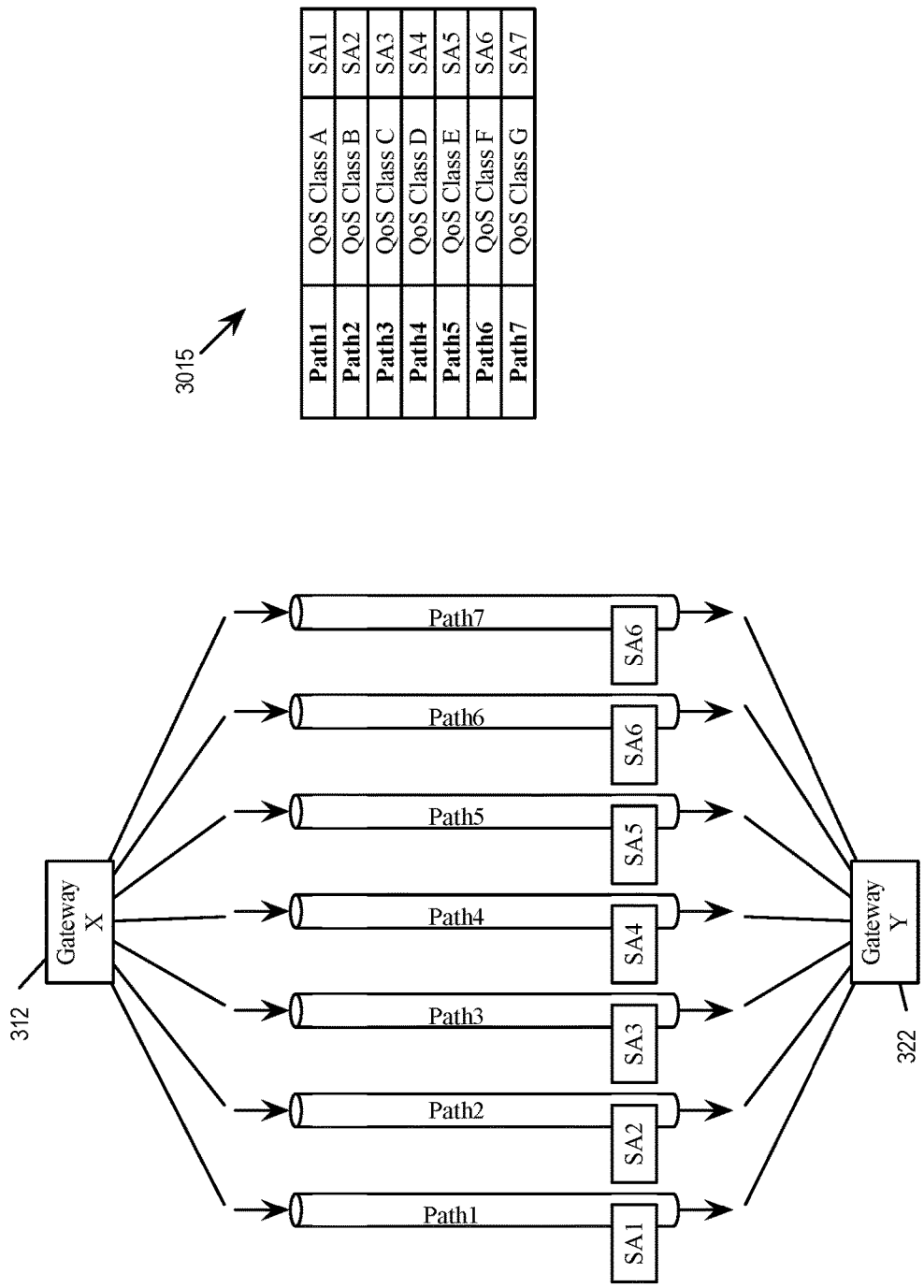
FIG. 30 illustrates a gateway that dispatches packets having different QoS requirements to paths having different SAs.

FIG. 30 illustrates a gateway that dispatches packets having different QoS requirements to paths having different SAs. As illustrated, there are at least 7 paths that the gateway 312 can use to reach the gateway 322, labeled "Path1" through "Path?". The gateway 312 has established a different security association for each of the paths (labeled "SA1" through "SA7") based on the endpoints of those paths. The gateway 312 has also assigned a QoS class to each of those paths based on their network characteristics, such that "Path1" is assigned QoS class A, "Path2" is assigned QoS class B, "Path3" is assigned QoS class C, etc. The mapping among SAs, paths, and QoS classes are stored in a path classification table 3015. Based on the path classification table 3015, a first packet having QoS requirement that is classified as QoS class E will be sent through "Path5" and encrypted according "SA5"; a second packet having QoS requirement that is classified as QoS class B will be sent through "Path2" and encrypted according "SA2".

Figure 31:
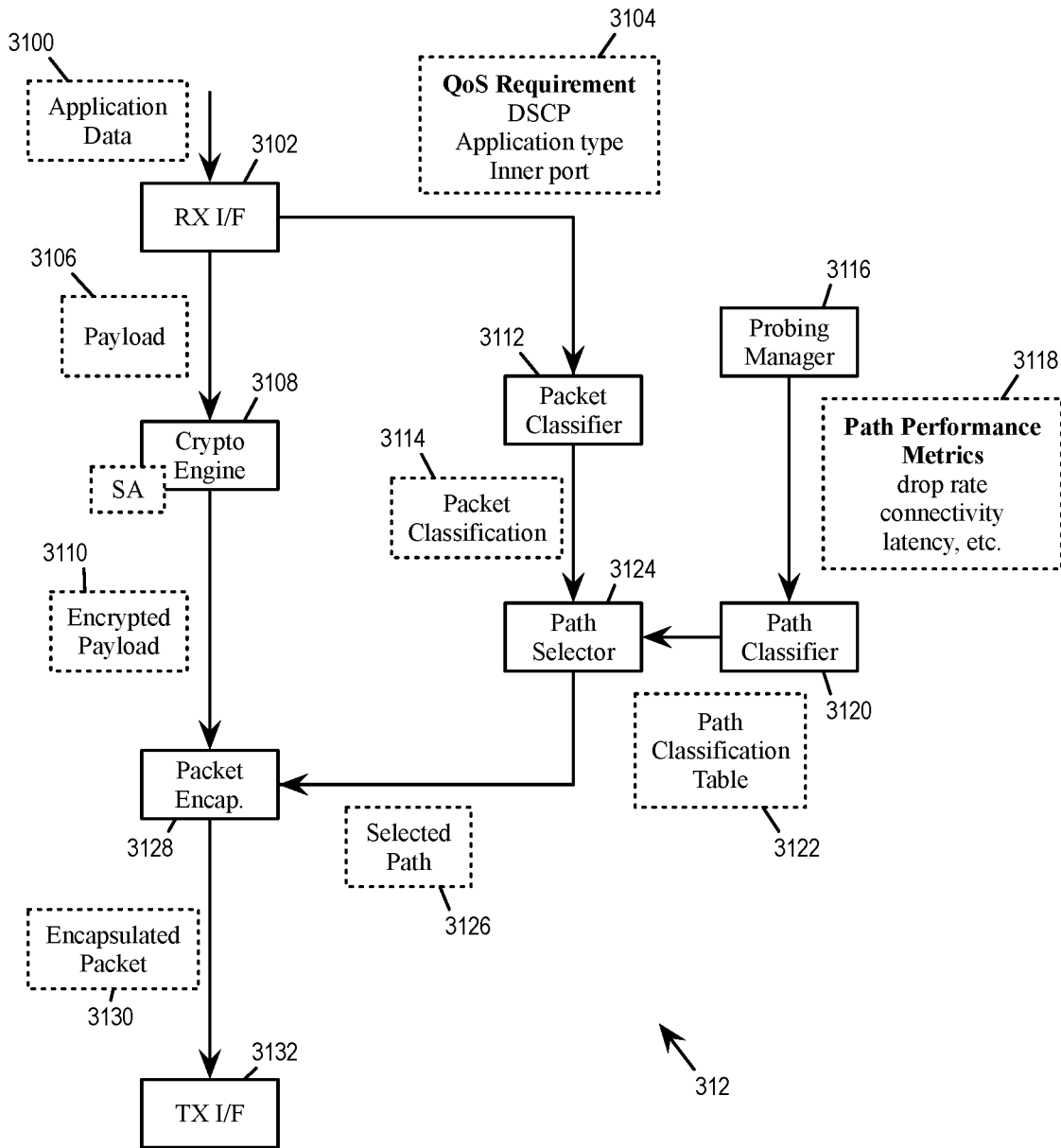
FIG. 31 illustrates the flow of data within the gateway for performing QoS provisioning in a multipath IPsec environment.

FIG. 31 illustrates the flow of data within the gateway for performing QoS provisioning in a multipath IPsec environment. The figure shows parts of a computing device that implements the gateway 312. The computing device may be a bare metal device or a host machine running virtualization software, with the gateway being implemented by a virtual machine.

As illustrated, the gateway 312 received application data 3100 at a receive (RX) interface 3102. The RX interface 3102 may refer to a network interface of the gateway that receives the application data from other network endpoints, or a software interface that receives data from processing or data path elements within a same computing device that hosts the gateway. The RX interface 3102 provides the application data 3100 as payload 3106 of a packet to a crypto engine 3108. The crypto engine 3108 in turn encrypts the payload 3106 according to a security association to create encrypted payload 3110.

The application data 3100 is associated with a set of QoS requirements 3104. The QoS requirements may include a DSCP value, an identifier of the application or the application type that generates the application data 3100, an inner port number, account information, and/or any information that may be used to determine the QoS requirement of the application data. A packet classifier 3112 uses the QoS requirement 3104 to assign a packet classification 3114, by e.g., using a look up table to map different QoS requirements to different QoS classes.

A probe manager 3116 collects path performance metrics for different paths that can be used to send the packet. The path performance metrics of a path may include packet drop rate, connectivity, latency, and other measures indicative of the level of service that the path may be capable of supporting. The probe manager 3116 may periodically send probe messages to different paths to obtain their updated path performance metrics. A path classifier 3120 uses the collected path performance metrics 3118 to classify the paths, such that each path that can be used to reach the VPN peer is assigned a QoS class. In some embodiments, a look up table is used to map different path performance metrics to different QoS classes.

The path classifier outputs a path classification table 3122 (e.g., the path classification table 2815 of FIG. 28) that lists the assigned QoS classes of the different paths. In some embodiments, as the probe manager 3116 continuously probe the paths to obtain new path performance metrics, the path classifier 3120 also continuously update the path classification table 3122 so that the QoS classes assigned to the paths are up-to-date.

The packet classification 3114 and the path classification table 3122 are provided to a path selector 3124 to select a path to use for transmitting the packet containing the application data 3100. Specifically, the path selector 3124 selects a path from the path classification table 3122 by identifying a path that has an assigned QoS class matching the QoS class of the packet as indicated in packet classification 3114. The path selector 3124 may indicate the selected path by a selected path identifier 3126. In some embodiments, the path selector 3124 performs load balancing for each QoS class by distributing packets of the QoS class among multiple active paths of that QoS class.

The gateway 312 in turn sends the encrypted payload 3110 by using the selected path. In some embodiments, the gateway 312 encapsulates the encrypted payload 3110 by an UDP header (at a packet encapsulation module 3128), which indicates the selected path by a UDP port number. The encapsulation results in an encapsulated packet 3130, which is transmitted to the network at a transmit (TX) interface 3132. In some embodiments, if the selected path is identified by an IP address pair, the gateway does not perform UDP encapsulation unless real NAT is detected.

In some embodiments, the RX interface 3102, the crypto engine 3108, the packet classifier 3112, the probing manager 3116, the path classifier 3120, the path selector 3124, the packet encapsulation module 3128, and the TX interface 3132 are modules of software instructions being executed by one or more processing units (e.g., a processor) of a computing device. In some embodiments, the modules 3102, 3108, 3112, 3116, 3120, 3124, 3128, and 3132 are modules of hardware circuits implemented by one or more integrated circuits (ICs) of an electronic apparatus. Though the modules 3102, 3108, 3112, 3116, 3120, 3124, 3128, and 3132 are illustrated as being separate modules, some of the modules can be combined into a single module. In some embodiments, the probing manager 3116, the path classifier 3120, the path performance metrics 3118, and the path classification table 3122 are components of VPN control plane, while the RX interface 3102, the crypto engine 3108, the packet classifier 3112, the path selector 3124, the packet encapsulation module 3128, and the TX interface 3132 are components of VPN data plane.

Figure 32:
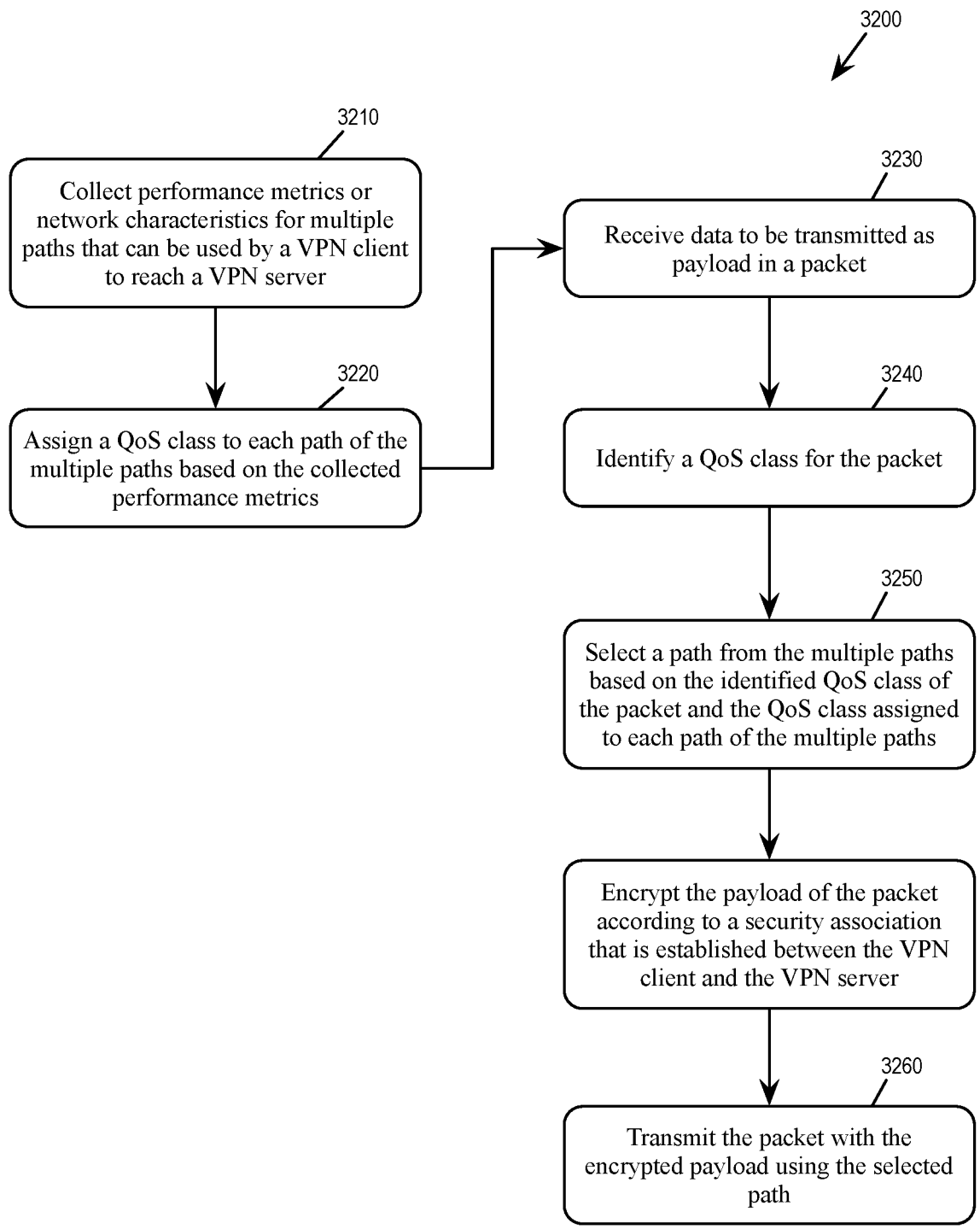
FIG. 32 conceptually illustrates a process for performing QoS provisioning in a multipath IPsec environment.

For some embodiments, FIG. 32 conceptually illustrates a process 3200 for performing QoS provisioning in a multipath IPsec environment. In some embodiments, a gateway of a first site performs the process 3200 when transmitting IPsec data to a second site. In some embodiments, one or more processing units (e.g., processor) of a computing device implementing the gateway 312 perform the process 3200 by executing instructions stored in a computer readable medium.

The gateway collects (at 3210) performance metrics or network characteristics for multiple paths that can be used by the gateway as a VPN client to reach a VPN server. In some embodiments, the gateway sends probe messages to the multiple paths and receives responses to the probe messages, and the gateway collects the performance metrics for the multiple paths based on the received responses to the probe messages. The performance metric of a path may be one or more of latency, packet drop rate, link capacity, and current bandwidth. The gateway assigns (at 3220) a QoS class to each path of the multiple paths based on the collected performance metrics. In some embodiments, the process continuously performs operations 3210 and 3220 in order to continuously update the path QoS assignments based on dynamic network characteristics.

The gateway receives (at 3230) data to be transmitted as payload in a packet. The gateway identifies (at 3240) a QoS class for the packet. In some embodiments, the QoS class of the packet is determined based on a differentiated services code point (DSCP) of the packet. The DSCP may be supplied by the application that generated the data to be transmitted. The QoS class of the packet may also be determined based on application type and an inner port value.

The gateway selects (at 3250) a path from the multiple paths based on the identified QoS class of the packet and the QoS class assigned to each path of the multiple paths. In some embodiments, the gateway selects a path that has an assigned QoS class that matches the QoS class of the packet, by e.g., using the path classification table 3122.

The gateway encrypts (at 3255) the payload of the packet according to a security association that is established between the gateway as the VPN client and the VPN server. In some embodiments, different QoS classes may use different SAs, or different paths may have different SAs. For example, a first packet having a first QoS class is encrypted according to a first security association of the VPN session and a second packet having a second QoS class is encrypted according to a second security association of the VPN session.

The gateway transmits (at 3260) the packet with the encrypted payload using the selected path. In some embodiments, the packet is encapsulated in a UDP header that includes a port number or identifier, and the port number is set to correspond to the selected path. In some embodiments, an IP address of the packet (e.g., an outer source IP address) is set to correspond to the selected path.

Figure 33:
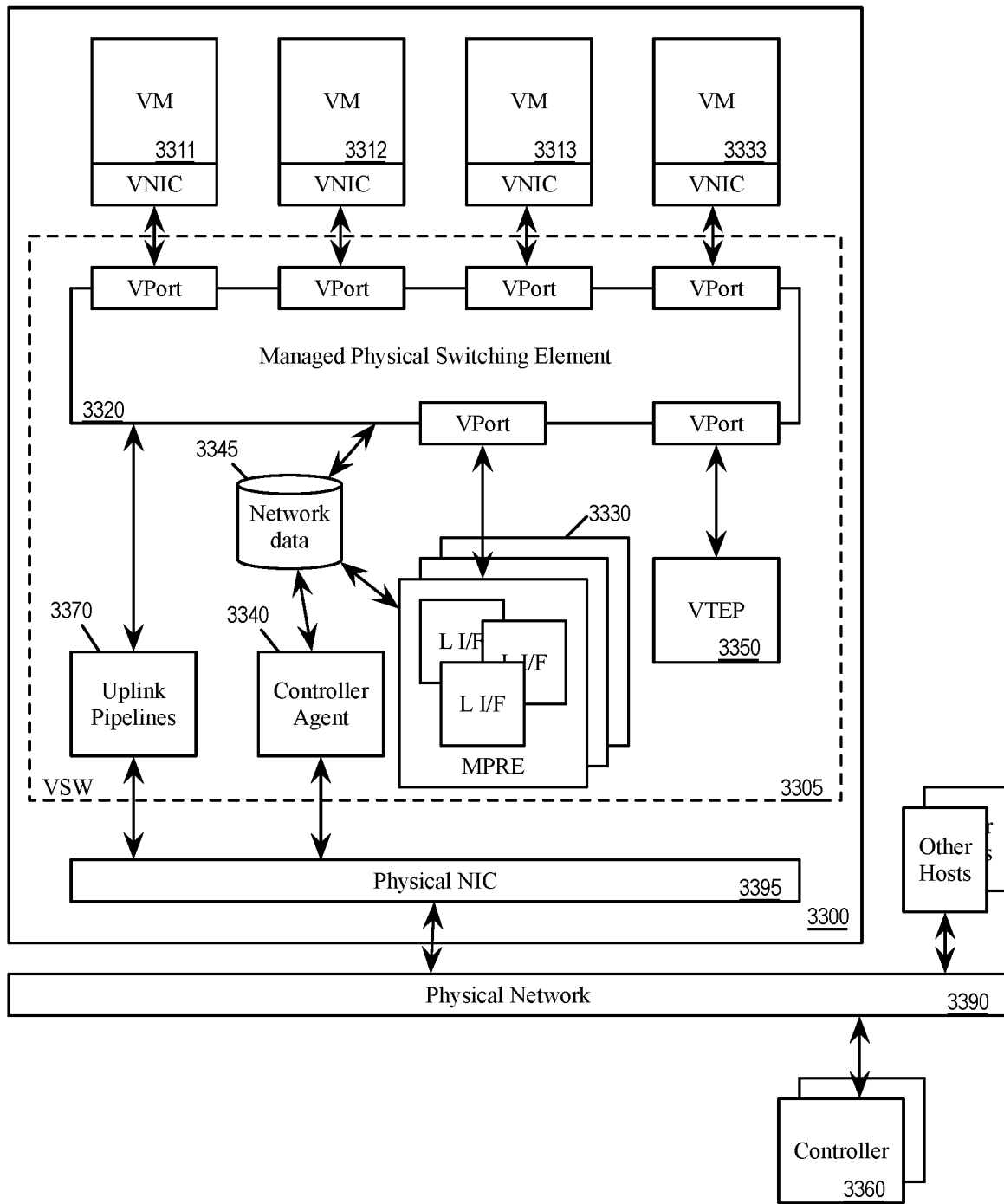
FIG. 33 illustrates a computing device that serves as a host machine that runs virtualization software FIG. 34 conceptually illustrates a computer system with which some embodiments of the invention are implemented.

In some embodiments, a gateway or edge appliance may be implemented by a host machine that is running virtualization software, serving as a virtual network forwarding engine. Such a virtual network forwarding engine is also known as managed forwarding element (MFE), or hypervisors. Virtualization software allows a computing device to host a set of virtual machines (VMs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE perform its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 33 illustrates a computing device 3300 that serves as a host machine that runs virtualization software for some embodiments of the invention.

As illustrated, the computing device 3300 has access to a physical network 3390 through a physical NIC (PNIC) 3395. The host machine 3300 also runs the virtualization software 3305 and hosts VMs 3311-3314. The virtualization software 3305 serves as the interface between the hosted VMs and the physical NIC 3395 (as well as other physical resources, such as processors and memory). Each of the VMs includes a virtual NIC (VNIC) for accessing the network through the virtualization software 3305. Each VNIC in a VM is responsible for exchanging packets between the VM and the virtualization software 3305. In some embodiments, the VNICs are software abstractions of physical NICs implemented by virtual NIC emulators.

The virtualization software 3305 manages the operations of the VMs 3311-3314, and includes several components for managing the access of the VMs to the physical network (by implementing the logical networks to which the VMs connect, in some embodiments). As illustrated, the virtualization software includes several components, including a MPSE 3320, a set of MPREs 3330, a controller agent 3340, a network data storage 3345, a VTEP 3350, and a set of uplink pipelines 3370.

The VTEP (VXLAN tunnel endpoint) 3350 allows the host machine 3300 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 3300 sends a data packet (e.g., an Ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 3370.

The controller agent 3340 receives control plane messages from a controller or a cluster of controllers. In some embodiments, these control plane message includes configuration data for configuring the various components of the virtualization software (such as the MPSE 3320 and the MPREs 3330) and/or the virtual machines. In the example illustrated in FIG. 33, the controller agent 3340 receives control plane messages from the controller cluster 3360 from the physical network 3390 and in turn provides the received configuration data to the MPREs 3330 through a control channel without going through the MPSE 3320. However, in some embodiments, the controller agent 3340 receives control plane messages from a direct data conduit (not illustrated) independent of the physical network 3390. In some other embodiments, the controller agent receives control plane messages from the MPSE 3320 and forwards configuration data to the router 3330 through the MPSE 3320.

The network data storage 3345 in some embodiments stores some of the data that are used and produced by the logical forwarding elements of the host machine 3300, logical forwarding elements such as the MPSE 3320 and the MPRE 3330. Such stored data in some embodiments include forwarding tables and routing tables, connection mapping, as well as packet traffic statistics. These stored data are accessible by the controller agent 3340 in some embodiments and delivered to another computing device that is operating the troubleshooting system (e.g., 150).

The MPSE 3320 delivers network data to and from the physical NIC 3395, which interfaces the physical network 3390. The MPSE also includes a number of virtual ports (vPorts) that communicatively interconnects the physical NIC with the VMs 3311-3314, the MPREs 3330, and the controller agent 3340. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 3390 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 3330 perform L3 routing on data packets received from a virtual port on the MPSE 3320. In some embodiments, this routing operation entails resolving L3 IP address to a next-hop L2 MAC address and a next-hop VNI (i.e., the VNI of the next-hop's L2 segment). Each routed data packet is then sent back to the MPSE 3320 to be forwarded to its destination according to the resolved L2 MAC address. This destination can be another VM connected to a virtual port on the MP SE 3320, or a reachable L2 network element on the physical network 3390 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 3330 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 3370 relays data between the MPSE 3320 and the physical NIC 3395. The uplink module 3370 includes an egress chain and an ingress chain that each performs a number of operations. Some of these operations are pre-processing and/or post-processing operations for the MPRE 3330.

As illustrated by FIG. 33, the virtualization software 3305 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 3320, and hence a same L2 MAC address (vMAC or pMAC). In some other embodiments, each different MPRE belonging to a different tenant has its own port to the MPSE.

The MPSE 3320 and the MPRE 3330 make it possible for data packets to be forwarded amongst VMs 3311-3314 without being sent through the external physical network 3390 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 3300 (and its virtualization software 3305) is able to direct packets of different logical networks to their correct destinations and effectively segregates traffic of different logical networks from each other.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 34:
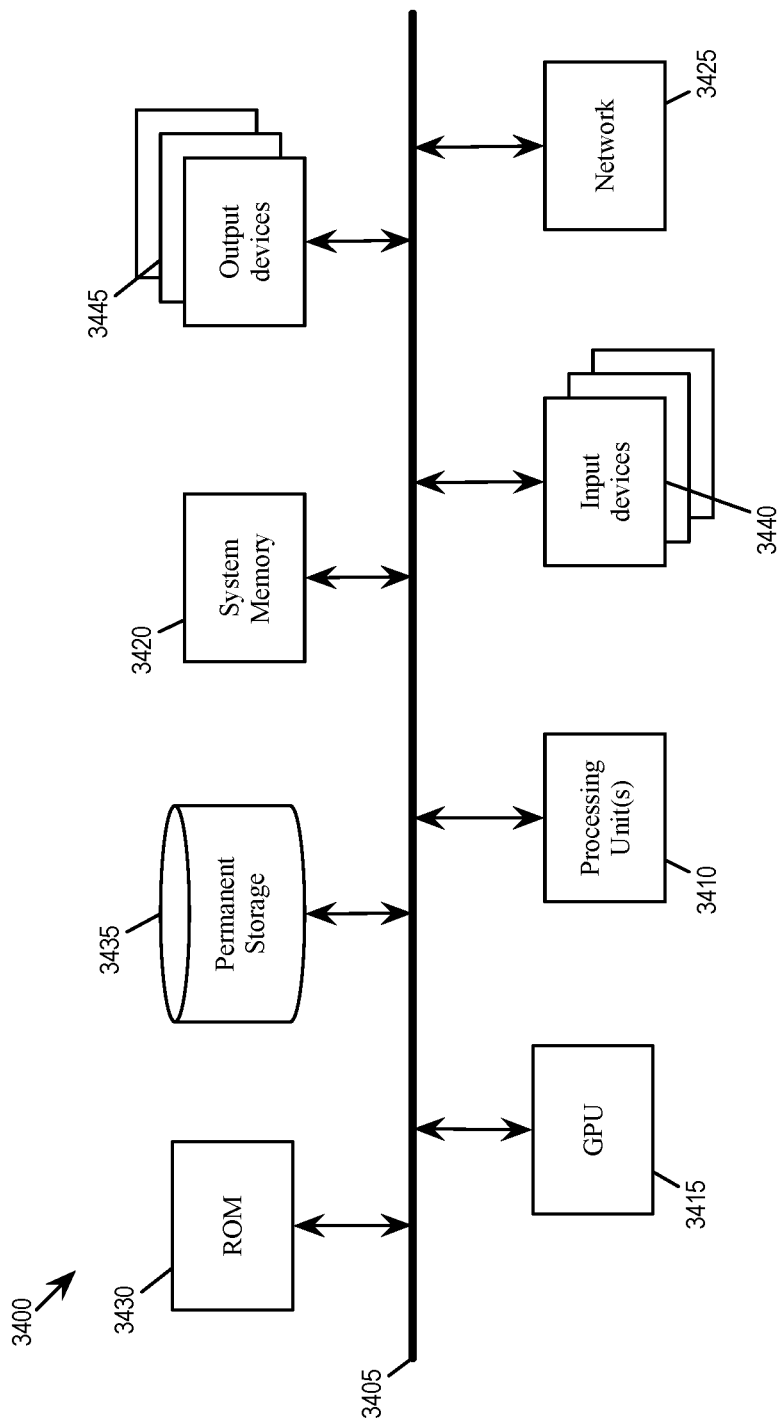

FIG. 34 conceptually illustrates a computer system 3400 with which some embodiments of the invention are implemented. The computer system 3400 can be used to implement any of the above-described hosts, controllers, and managers. As such, it can be used to execute any of the above described processes. This computer system includes various types of non-transitory machine readable media and interfaces for various other types of machine readable media. Computer system 3400 includes a bus 3405, processing unit(s) 3410, a system memory 3425, a read-only memory 3430, a permanent storage device 3435, input devices 3440, and output devices 3445.

The bus 3405 collectively represents all system, peripheral, and chipset buses that communicatively connect the numerous internal devices of the computer system 3400. For instance, the bus 3405 communicatively connects the processing unit(s) 3410 with the read-only memory 3430, the system memory 3425, and the permanent storage device 3435.

From these various memory units, the processing unit(s) 3410 retrieve instructions to execute and data to process in order to execute the processes of the invention. The processing unit(s) may be a single processor or a multi-core processor in different embodiments. The read-only-memory (ROM) 3430 stores static data and instructions that are needed by the processing unit(s) 3410 and other modules of the computer system. The permanent storage device 3435, on the other hand, is a read-and-write memory device. This device is a non-volatile memory unit that stores instructions and data even when the computer system 3400 is off. Some embodiments of the invention use a mass-storage device (such as a magnetic or optical disk and its corresponding disk drive) as the permanent storage device 3435.

Other embodiments use a removable storage device (such as a floppy disk, flash drive, etc.) as the permanent storage device. Like the permanent storage device 3435, the system memory 3425 is a read-and-write memory device. However, unlike storage device 3435, the system memory is a volatile read-and-write memory, such a random access memory. The system memory stores some of the instructions and data that the processor needs at runtime. In some embodiments, the invention's processes are stored in the system memory 3425, the permanent storage device 3435, and/or the read-only memory 3430. From these various memory units, the processing unit(s) 3410 retrieve instructions to execute and data to process in order to execute the processes of some embodiments.

The bus 3405 also connects to the input and output devices 3440 and 3445. The input devices enable the user to communicate information and select commands to the computer system. The input devices 3440 include alphanumeric keyboards and pointing devices (also called "cursor control devices"). The output devices 3445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 34, bus 3405 also couples computer system 3400 to a network 3465 through a network adapter (not shown). In this manner, the computer can be a part of a network of computers (such as a local area network ("LAN"), a wide area network ("WAN"), or an Intranet, or a network of networks, such as the Internet. Any or all components of computer system 3400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
   identifying a plurality of paths between a first site and a second site, wherein a security association (SA) is established for transmitting encrypted payload from the first site to the second site in a virtual private network (VPN) session;
   selecting a path from the plurality of paths based on metrics that are obtained for the plurality of paths, the selected path defined by a first endpoint address of the first site and a second endpoint address of the second site;
   sending a message from the first site to the second site to update the SA to switch from using an original path to using the selected path, the message indicating the first and second endpoint addresses, and the SA being associated with a shared security attribute between the first site and the second site; and
   transmitting a packet comprising a payload that is encrypted according to the updated SA.

2. The method of claim 1, wherein only one path in one link is active at a time.

3. The method of claim 2, wherein the only one active path has a best path metric among the plurality of paths.

4. The method of claim 1, wherein sending the message to update the SA to use the selected path does not interrupt or re-establish the SA.

5. The method of claim 1 further comprising sending probe messages and receiving responses to the probe messages, wherein the obtained metrics for the identified paths are determined based on the received responses to the probe messages.

6. The method of claim 1, wherein outer addresses of the packet are updated according to the first and second endpoint addresses while addresses and other traffic selectors used for routing the packet inside a VPN tunnel remain unchanged.

7. The method of claim 1 further comprising exchanging a first list of endpoint addresses of the first site and a second list of endpoint addresses of the second site for the SA, wherein the first list of endpoint addresses comprises the first endpoint address and the second list of endpoint addresses comprises the second endpoint address.

8. The method of claim 7, wherein the obtained metrics are stored in a path matrix that is specified based on the first and second lists of endpoint addresses.

9. The method of claim 1, wherein the metric of a path is determined based on at least one of connectivity, latency, drop rate, jitter of the path.

10. The method of claim 1, wherein Equal-cost multi-path (ECMP) routing is performed based on the first and second endpoint addresses that define the selected path.

11. A non-transitory machine-readable medium storing a program for execution by at least one processing unit, the program comprising sets of instructions for:
    identifying a plurality of paths between a first site and a second site, wherein a security association (SA) is established for transmitting encrypted payload from the first site to the second site in a virtual private network (VPN) session;
    selecting a path from the plurality of paths based on metrics that are obtained for the plurality of paths, the selected path defined by a first endpoint address of the first site and a second endpoint address of the second site;
    sending a message from the first site to the second site to update the SA to switch from using an original path to using the selected path, the message indicating the first and second endpoint addresses, and the SA being associated with a shared security attribute between the first site and the second site; and
    transmitting a packet comprising a payload that is encrypted according to the updated SA.

12. The non-transitory machine-readable medium of claim 11, wherein only one path in one link is active at a time and the only one active path has a best path metric among the plurality of paths.

13. The non-transitory machine-readable medium of claim 11, wherein sending the message to update the SA to use the selected path does not interrupt or re-establish the SA.

14. The non-transitory machine-readable medium of claim 11, wherein the program further comprises a set of instructions for sending probe messages and receiving responses to the probe messages, wherein the obtained metrics for the identified paths are determined based on the received responses to the probe messages.

15. A computing device comprising:
a set of processing units; and
non-transitory machine-readable medium storing a program for execution by at least one of the processing units, the program comprising sets of instructions for:
identifying a plurality of paths between a first site and a second site, wherein a security association (SA) is established for transmitting encrypted payload from the first site to the second site in a virtual private network (VPN) session;
selecting a path from the plurality of paths based on metrics that are obtained for the plurality of paths, the selected path defined by a first endpoint address of the first site and a second endpoint address of the second site;
sending a message from the first site to the second site to update the SA to switch from using an original path to using the selected path, the message indicating the first and second endpoint addresses, and the SA being associated with a shared security attribute between the first site and the second site; and
transmitting a packet comprising a payload that is encrypted according to the updated SA.

16. The computing device of claim 15, wherein the program further comprises a set of instructions for exchanging a first list of endpoint addresses of the first site and a second list of endpoint addresses of the second site for the SA, wherein the first list of endpoint addresses comprises the first endpoint address and the second list of endpoint addresses comprises the second endpoint address.

17. The computing device of claim 16, wherein the obtained metrics are stored in a path matrix that is specified based on the first and second lists of endpoint addresses.

18. The computing device of claim 15, wherein the metric of a path is determined based on at least one of connectivity, latency, drop rate, jitter of the path.

19. The computing device of claim 15, wherein Equal-cost multi-path (ECMP) routing is performed based on the first and second endpoint addresses that define the selected path.

20. The method of claim 1, wherein the SA comprises at least one of a mutually agreed-upon key, a secure protocol, or a security parameter index (SPI) value identifying the SA.

* * * * *